(12) United States Patent
Kang et al.

(10) Patent No.: US 9,176,660 B2
(45) Date of Patent: Nov. 3, 2015

(54) MOBILE TERMINAL AND METHOD OF CONTROLLING APPLICATION EXECUTION IN A MOBILE TERMINAL

(75) Inventors: Rae Hoon Kang, Seoul (KR); Seung Hyun Woo, Seoul (KR); Min Jeong Lee, Seoul (KR); Hyun Ho Jee, Incheon-si (KR); Dong Gwan Im, Seoul (KR); Choon Jae Lee, Gwangju-si (KR)

(73) Assignee: LG ELECTRONICS INC., Seoul (KR)

( * ) Notice: Subject to any disclaimer, the term of this patent is extended or adjusted under 35 U.S.C. 154(b) by 781 days.

(21) Appl. No.: 12/830,235

(22) Filed: Jul. 2, 2010

(65) Prior Publication Data

US 2011/0080356 A1  Apr. 7, 2011

(30) Foreign Application Priority Data

Oct. 5, 2009 (KR) .......................... 10-2009-0094259

(51) Int. Cl.

| G06F 3/041 | (2006.01) |
| G06F 3/0486 | (2013.01) |
| G06F 3/0488 | (2013.01) |
| G06F 9/54 | (2006.01) |

(52) U.S. Cl.
CPC .......... *G06F 3/0486* (2013.01); *G06F 3/04883* (2013.01); *G06F 9/543* (2013.01)

(58) Field of Classification Search
CPC ..... G06F 3/041; G06F 3/0416; G06F 3/0488; G06F 3/04883; G06F 3/04886; G06F 2203/04803
USPC ............ 345/173; 709/204; 715/764, 769, 770
See application file for complete search history.

(56) References Cited

U.S. PATENT DOCUMENTS

| 5,598,524 | A | * | 1/1997 | Johnston et al. ............. 715/769 |
| 5,923,328 | A | * | 7/1999 | Griesmer ...................... 715/854 |
| 6,002,402 | A | * | 12/1999 | Schacher ...................... 715/810 |
| 6,191,807 | B1 | | 2/2001 | Hamada et al. |
| 7,650,575 | B2 | * | 1/2010 | Cummins et al. ............. 715/769 |
| 2005/0108351 | A1 | * | 5/2005 | Naick et al. ................... 709/207 |
| 2006/0031775 | A1 | * | 2/2006 | Sattler et al. ................. 715/769 |
| 2007/0150834 | A1 | * | 6/2007 | Muller et al. ................. 715/810 |
| 2008/0299960 | A1 | * | 12/2008 | Lockhart et al. ............. 455/418 |
| 2009/0079699 | A1 | * | 3/2009 | Sun ............................... 345/173 |
| 2009/0098910 | A1 | * | 4/2009 | Roh et al. ...................... 455/566 |
| 2009/0187842 | A1 | | 7/2009 | Collins et al. |
| 2009/0228831 | A1 | * | 9/2009 | Wendker et al. ............. 715/808 |

FOREIGN PATENT DOCUMENTS

JP 2005-301647 10/2005

OTHER PUBLICATIONS

European Patent Office Application Serial No. 10013317.2, Search Report dated Nov. 11, 2013, 8 pages.

* cited by examiner

*Primary Examiner* — Jonathan Horner
(74) *Attorney, Agent, or Firm* — Lee, Hong, Degerman, Kang & Waimey

(57) ABSTRACT

A mobile terminal and application execution controlling method in a mobile terminal are provided. The present invention includes executing a first application and a second application, displaying an execution picture of the first application and an execution notification indicator of the second application, receiving a touch and drag action from the execution notification indicator of the second application to the execution picture of the first application, displaying information provided by the second application during the touch and drag action, and adding the information provided by the second application to information of the first application corresponding to an execution status of the first application.

6 Claims, 54 Drawing Sheets

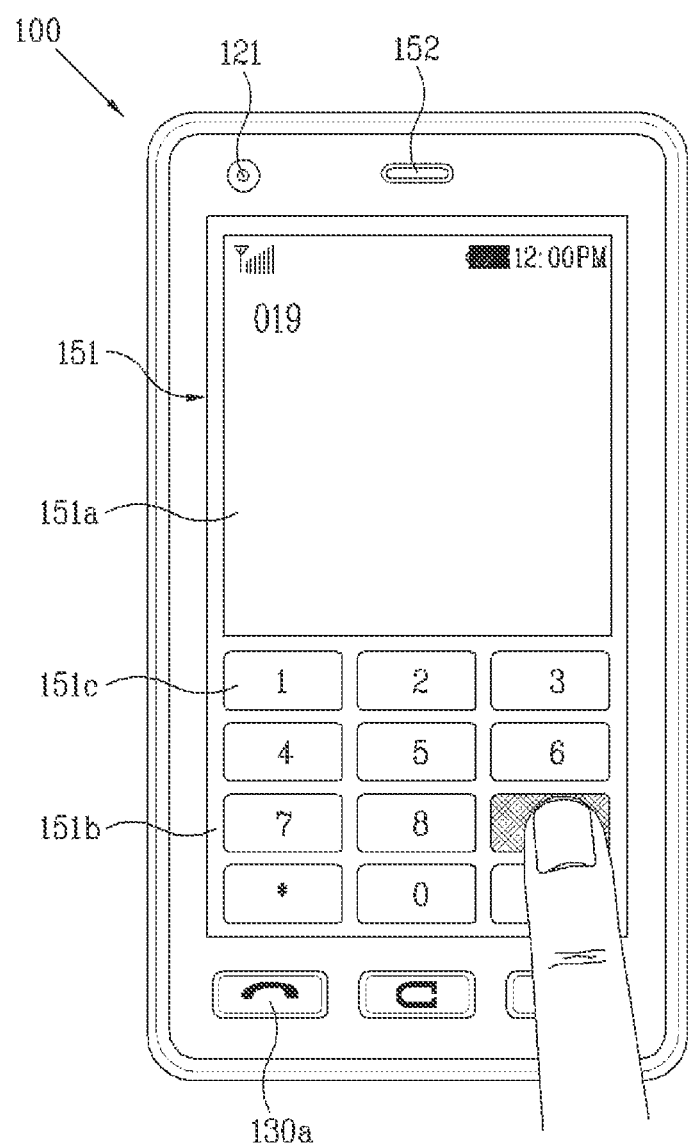

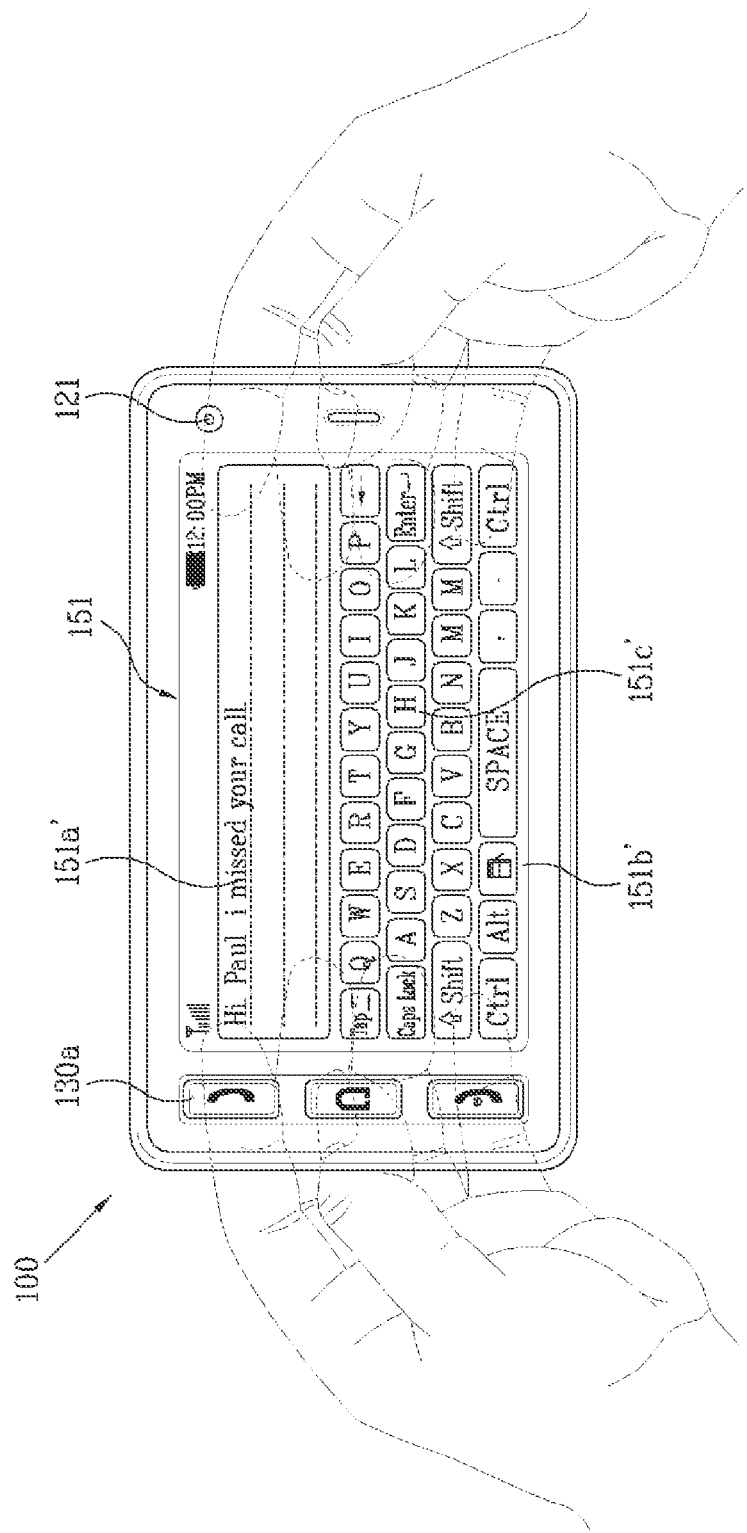

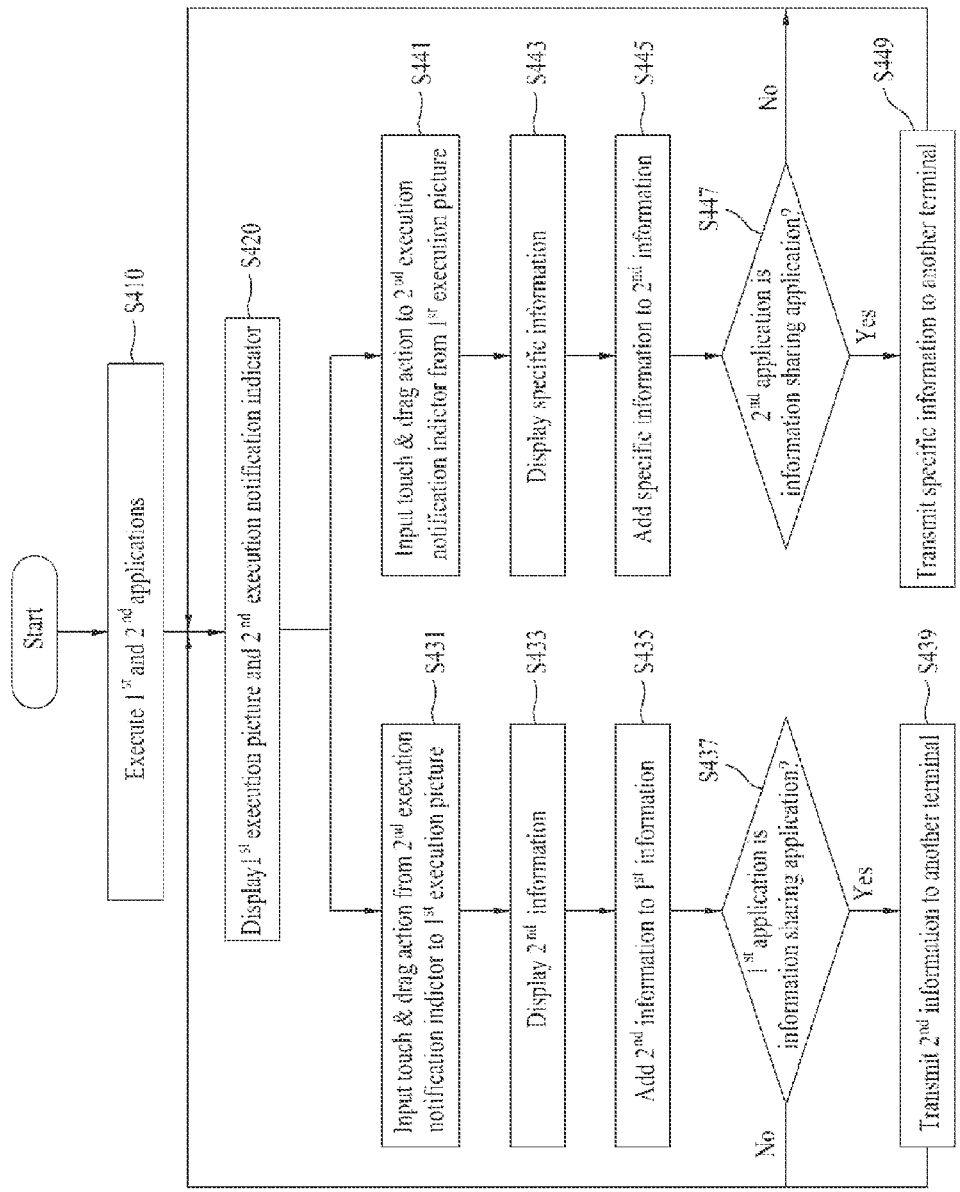

FIG. 5B
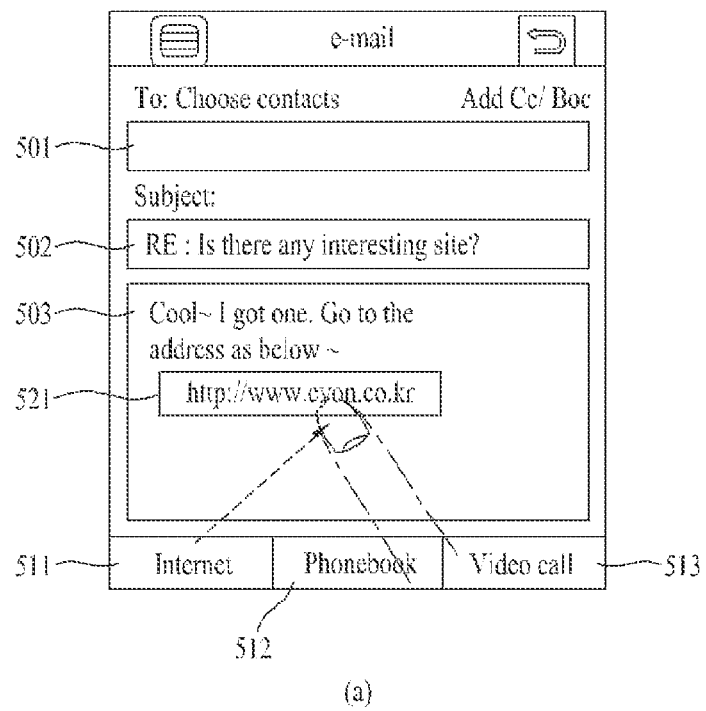
(a)
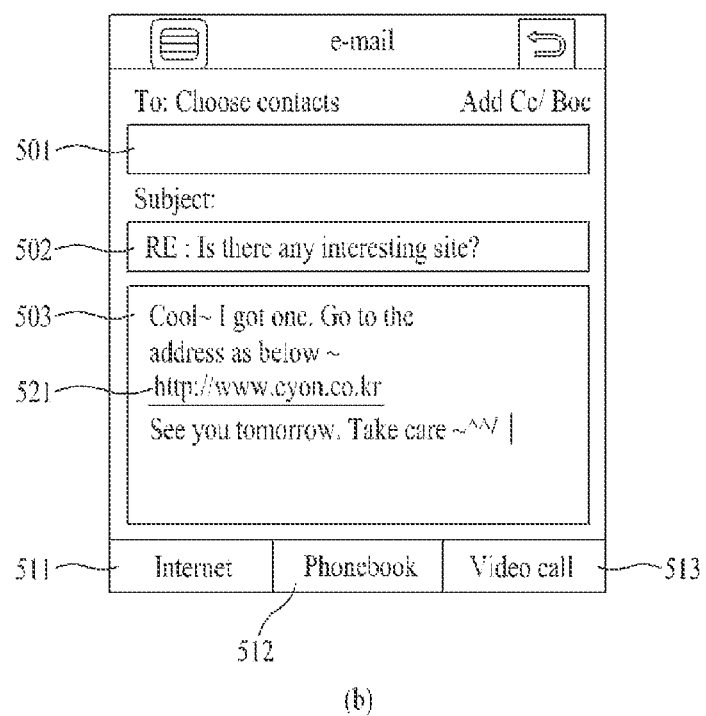
(b)

FIG. 5C
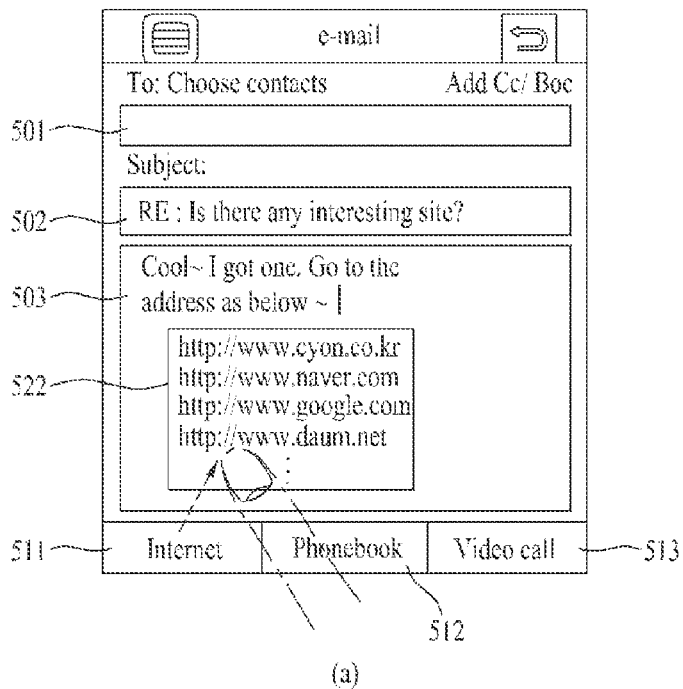
(a)
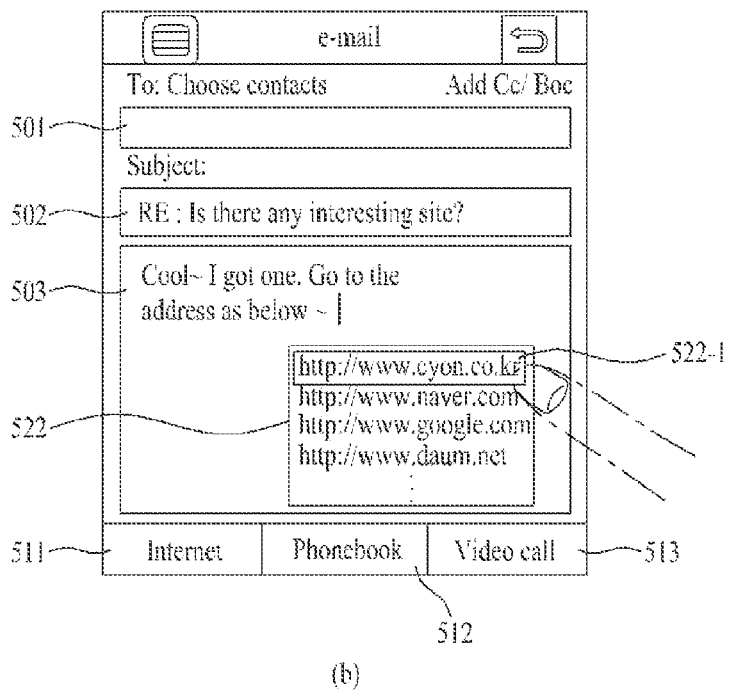
(b)

FIG. 6B
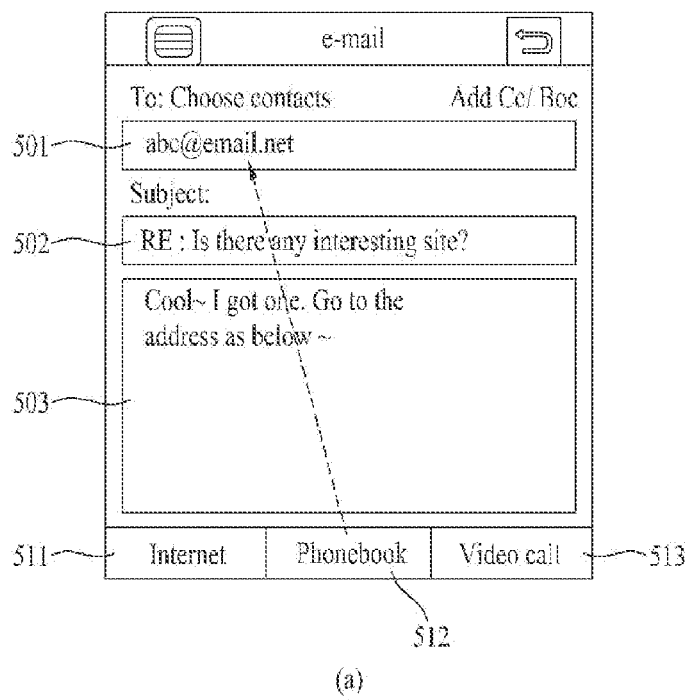
(a)
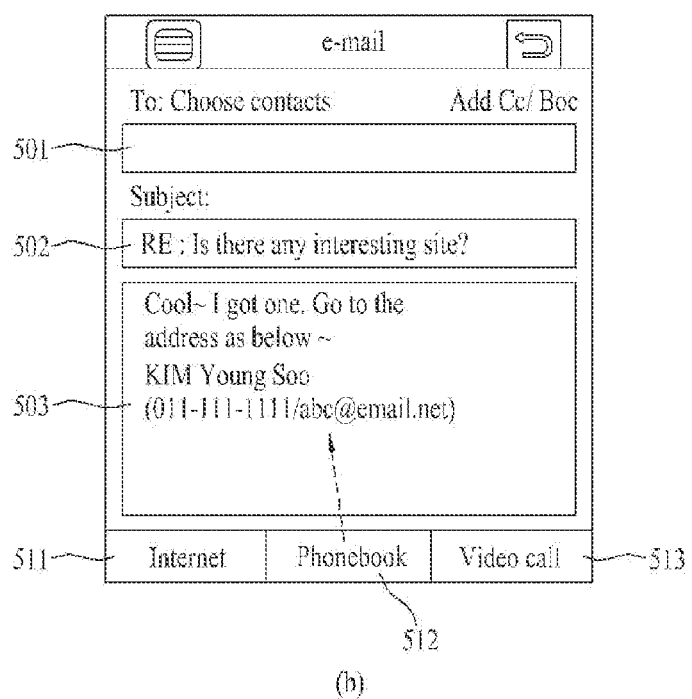
(b)

FIG. 6D
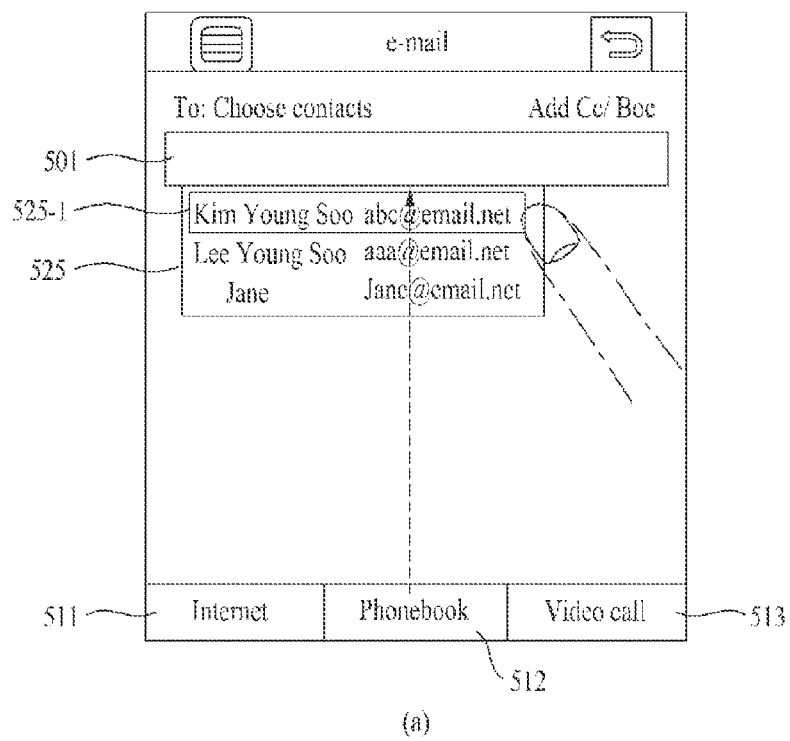
(a)
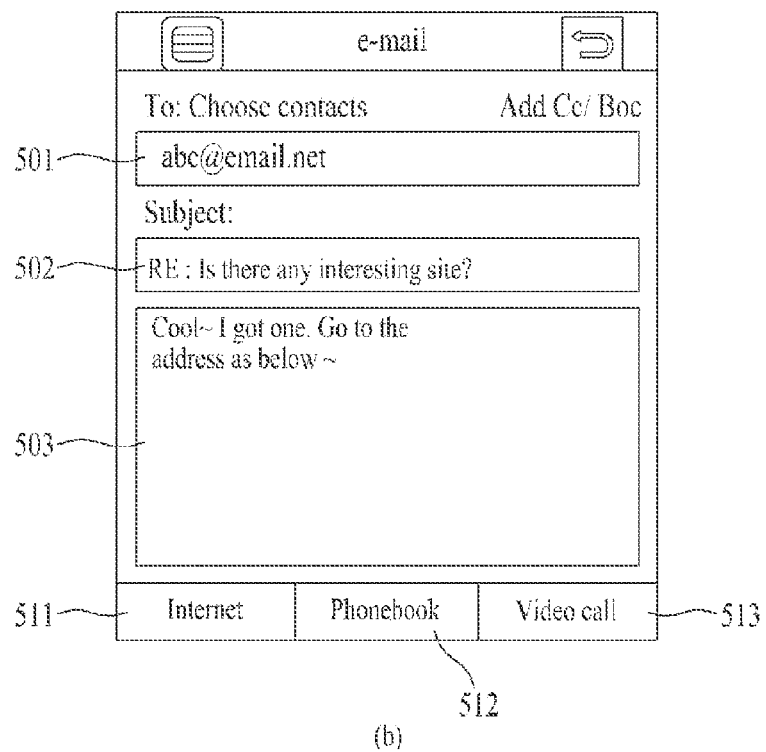
(b)

FIG. 7A
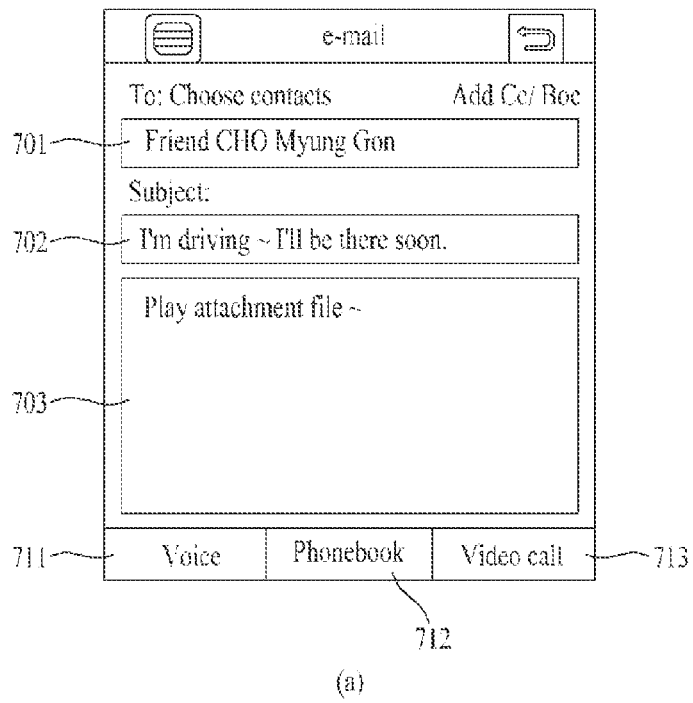
(a)
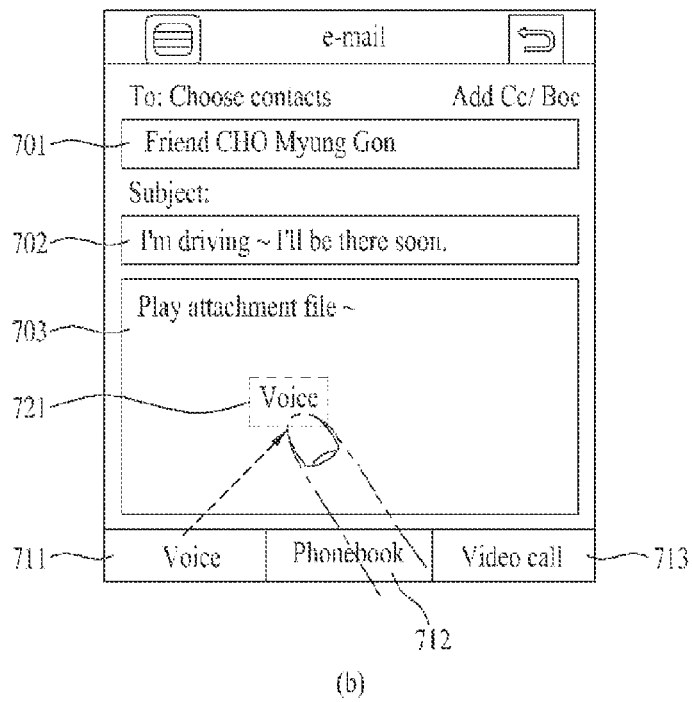
(b)

FIG. 7B
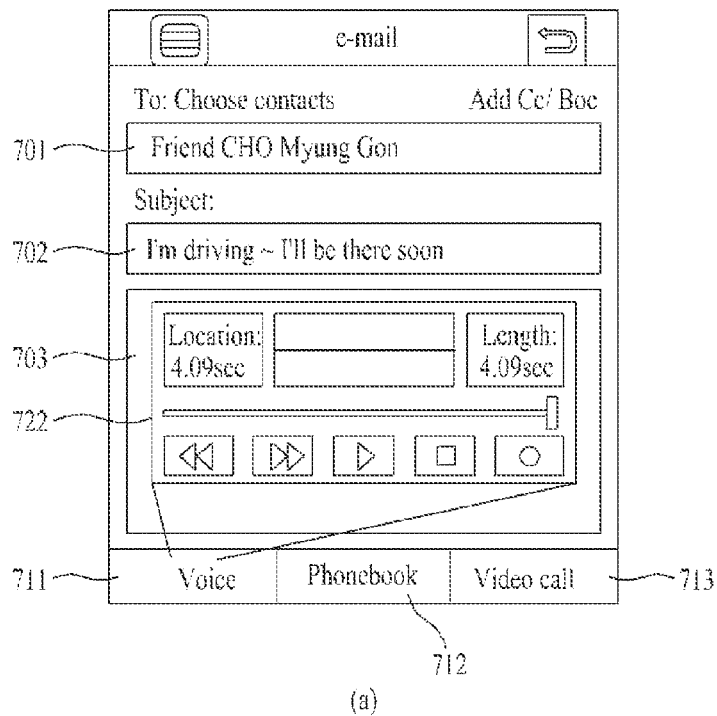
(a)
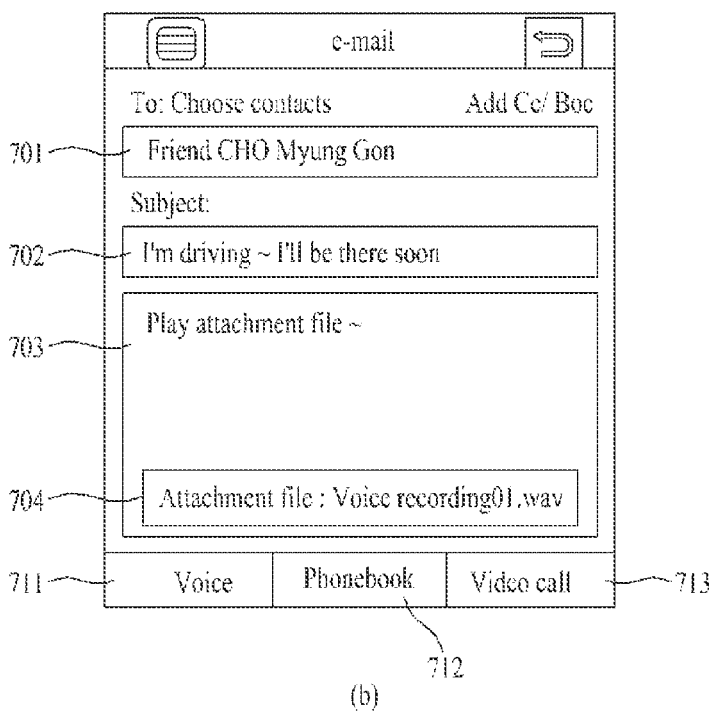
(b)

FIG. 8B
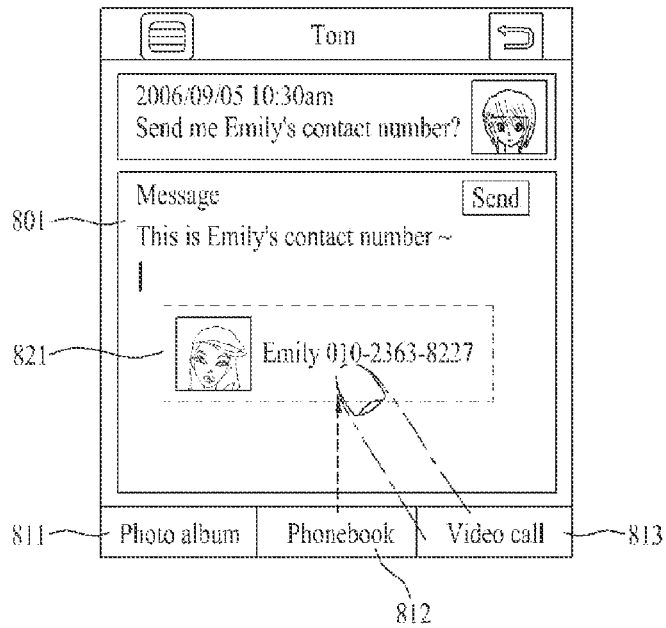
(a)
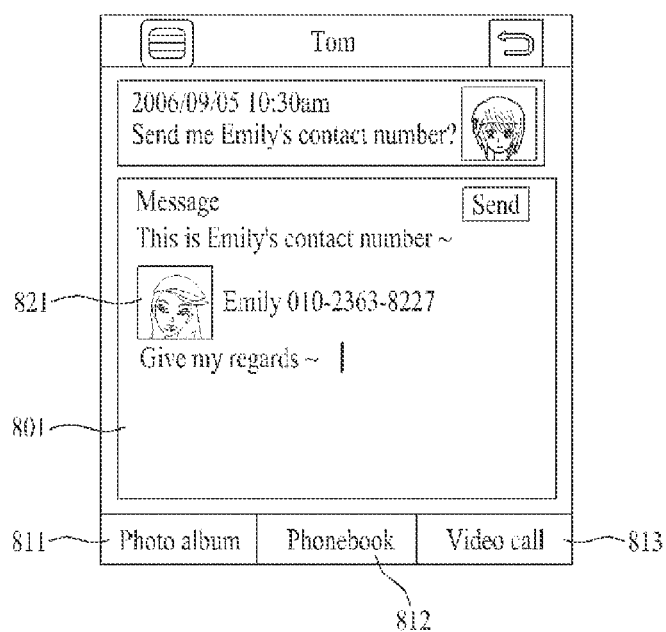
(b)

FIG. 8C
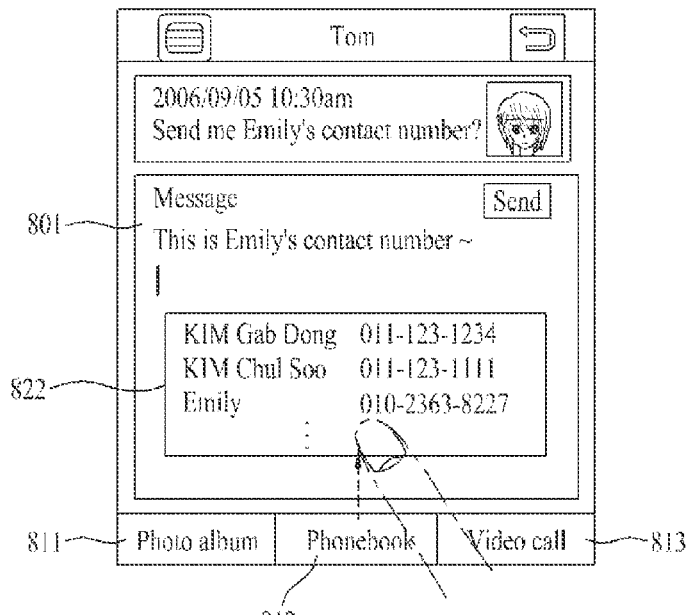
(a)
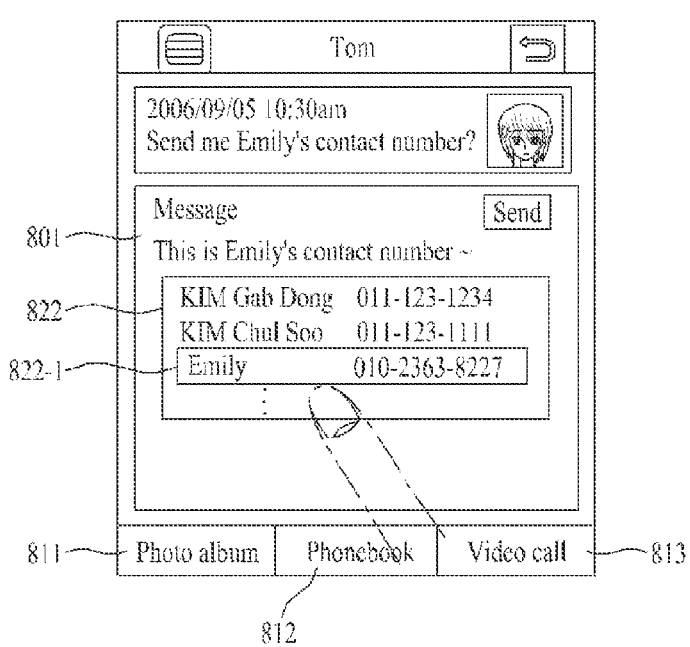
(b)

FIG. 9B
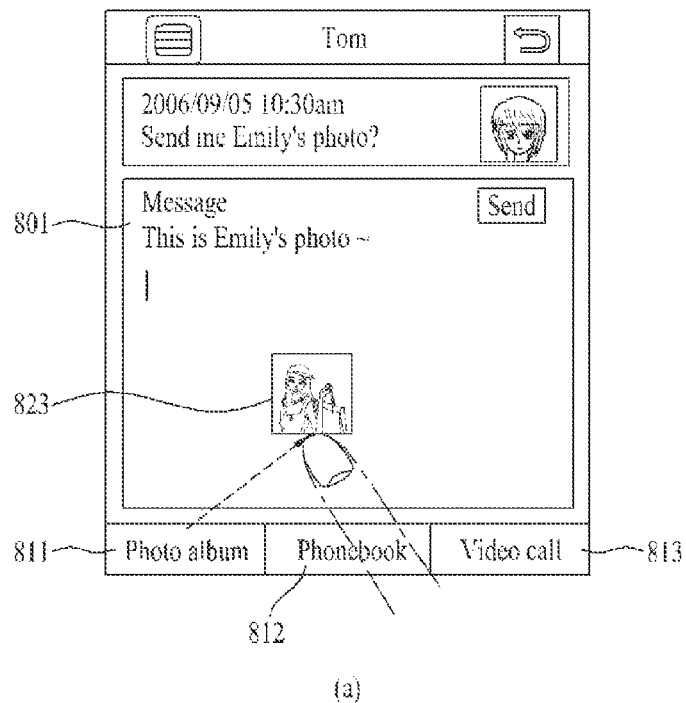
(a)
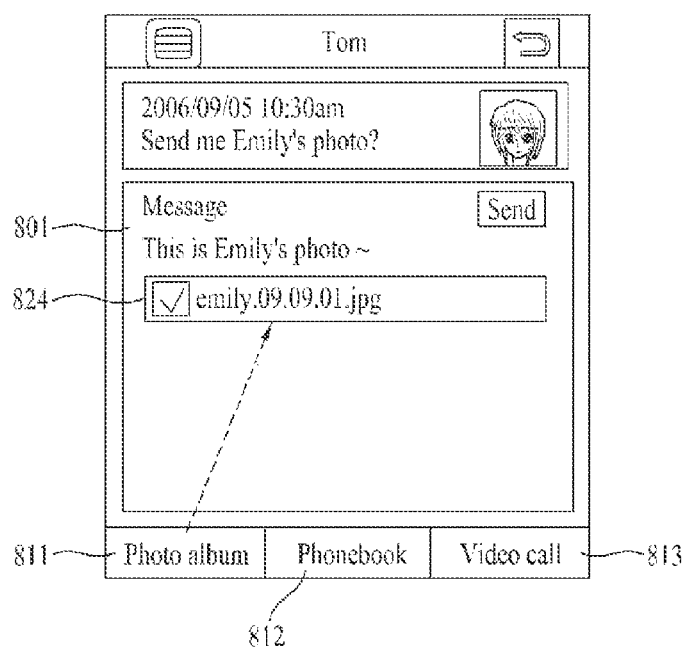
(b)

FIG. 9C
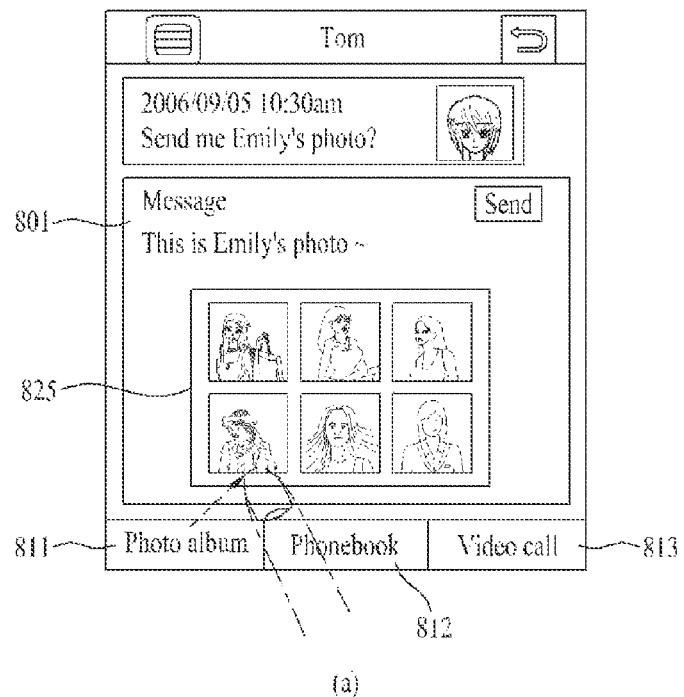
(a)
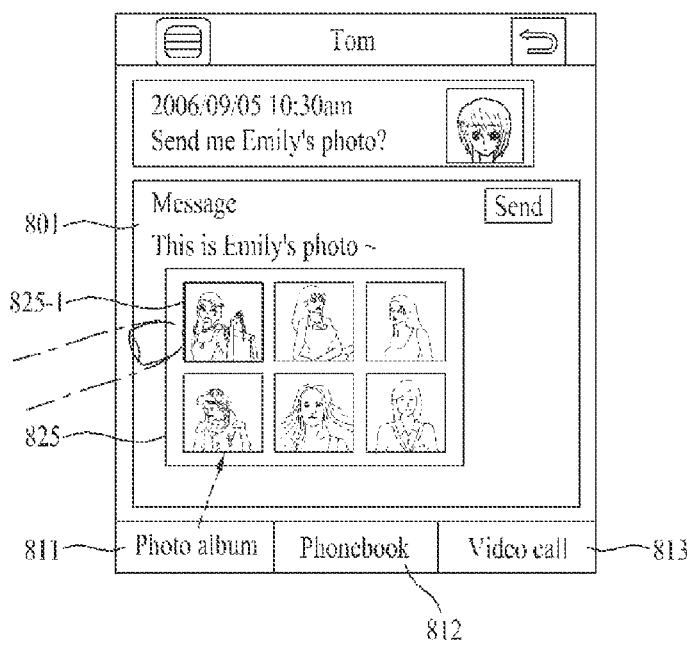
(b)

FIG. 10A
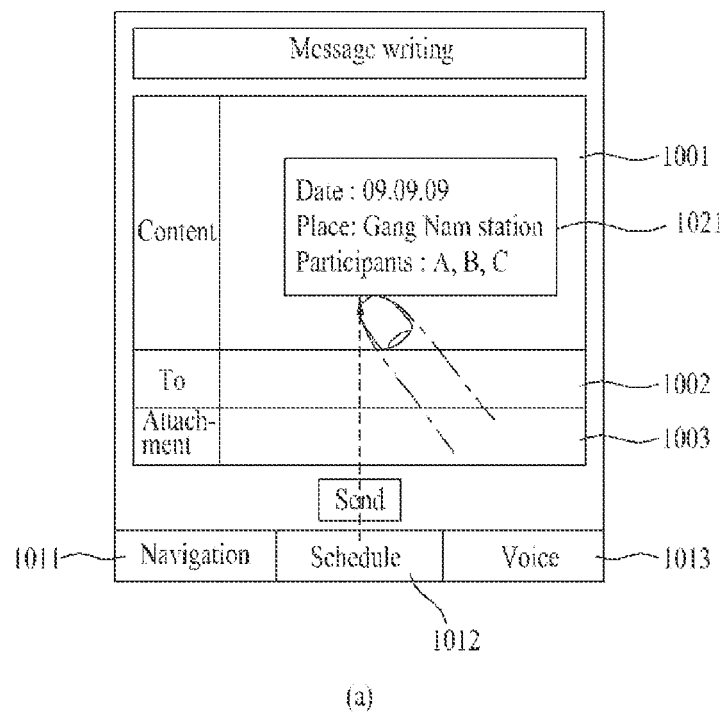
(a)
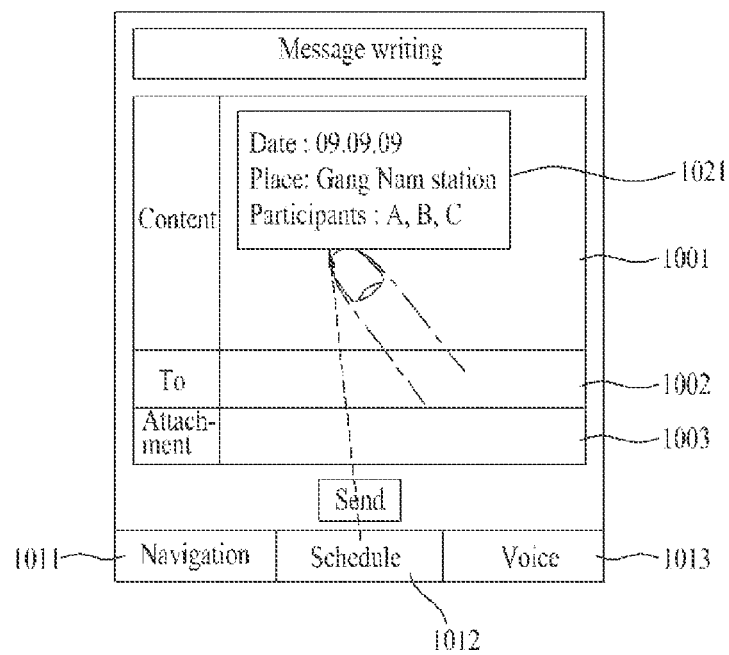
(b)

FIG. 10C
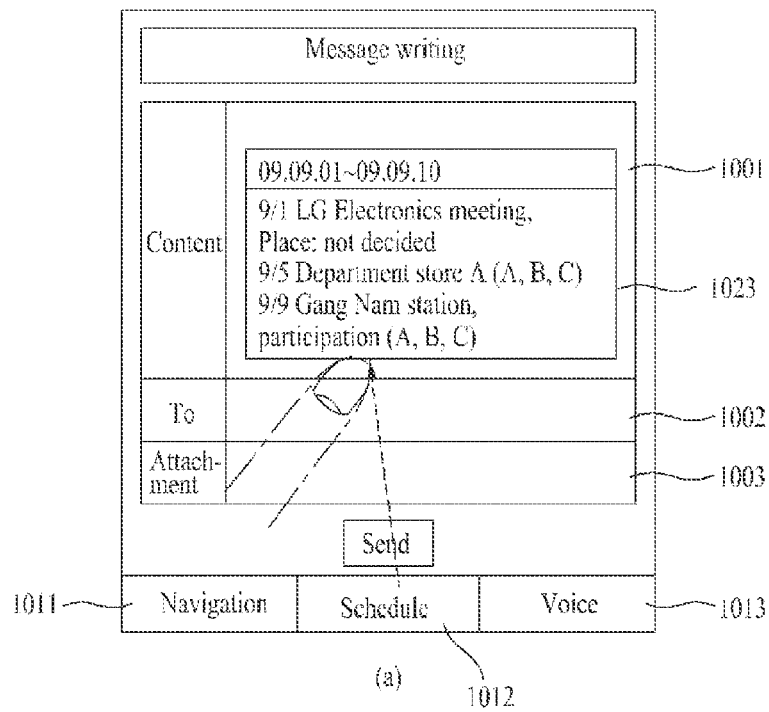
(a)
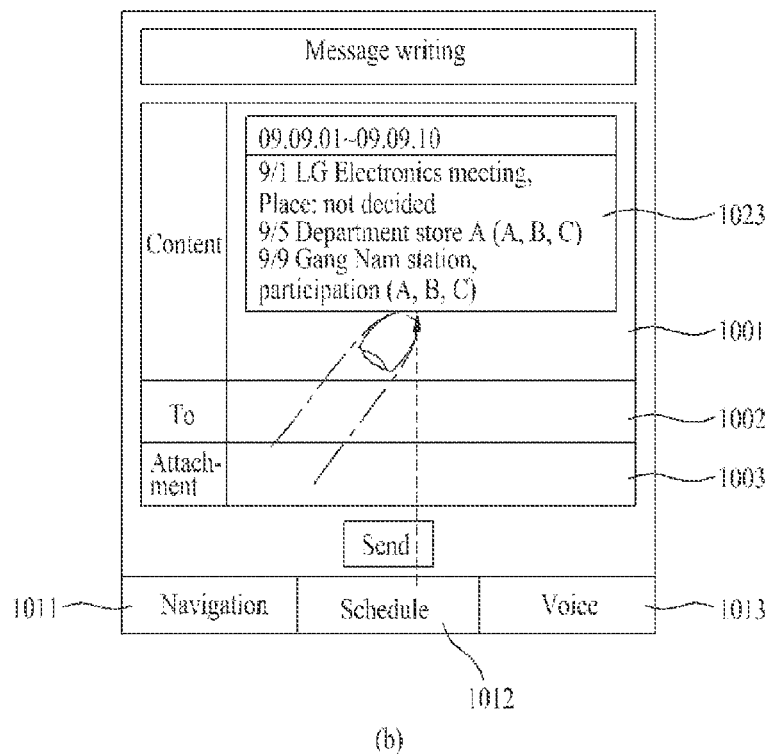
(b)

FIG. 11A
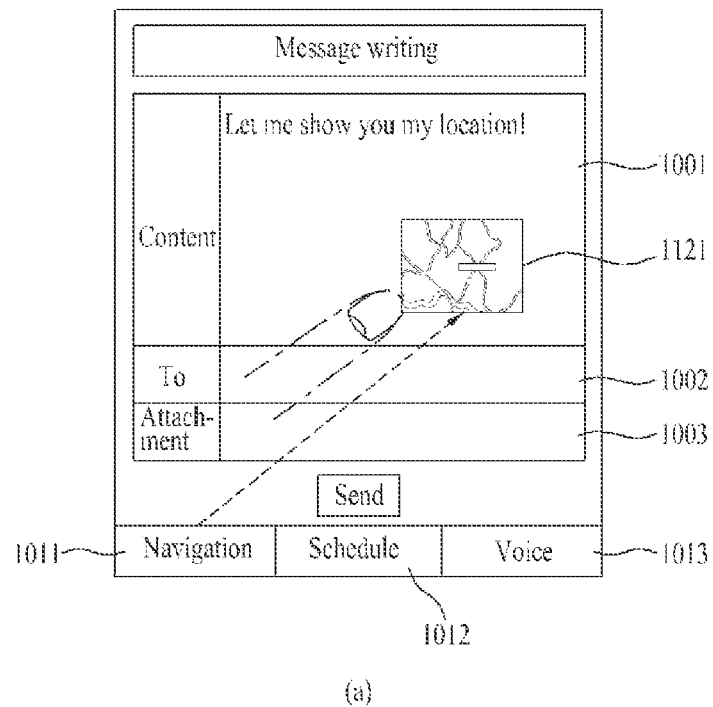
(a)
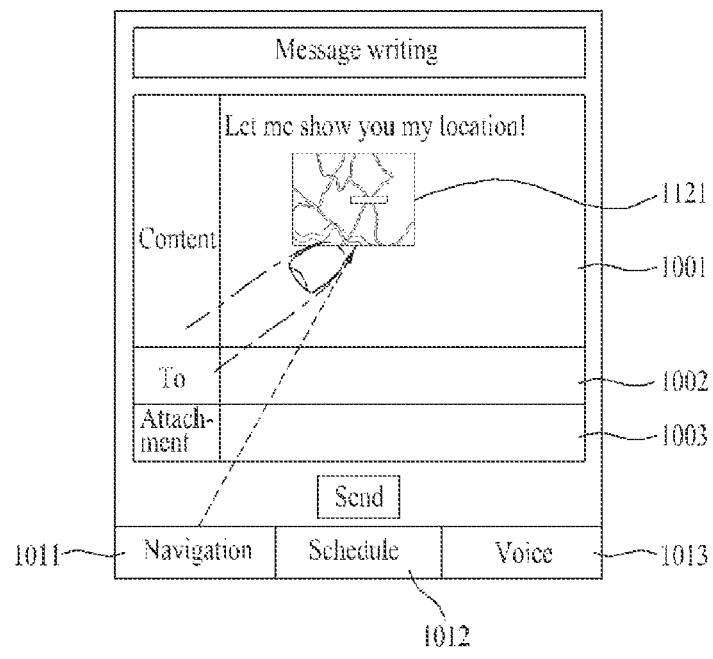
(b)

FIG. 11C
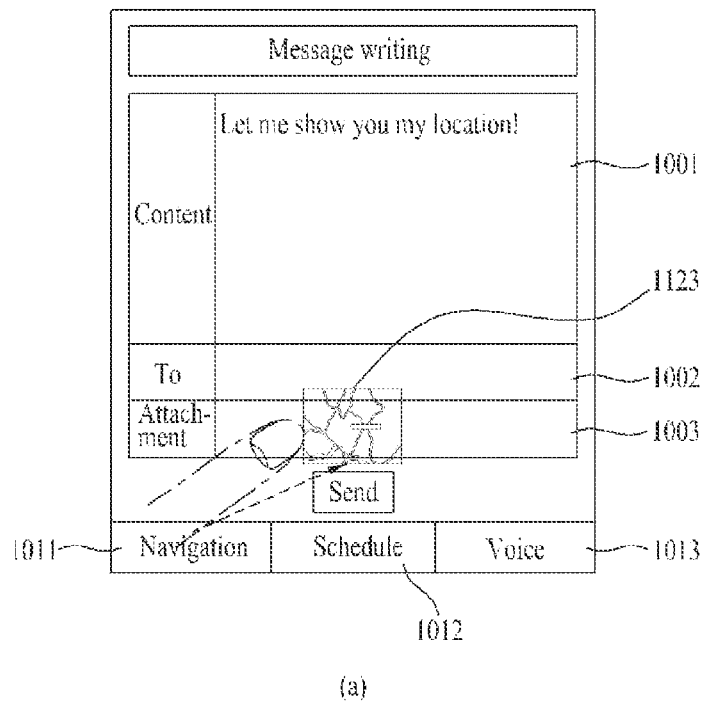
(a)
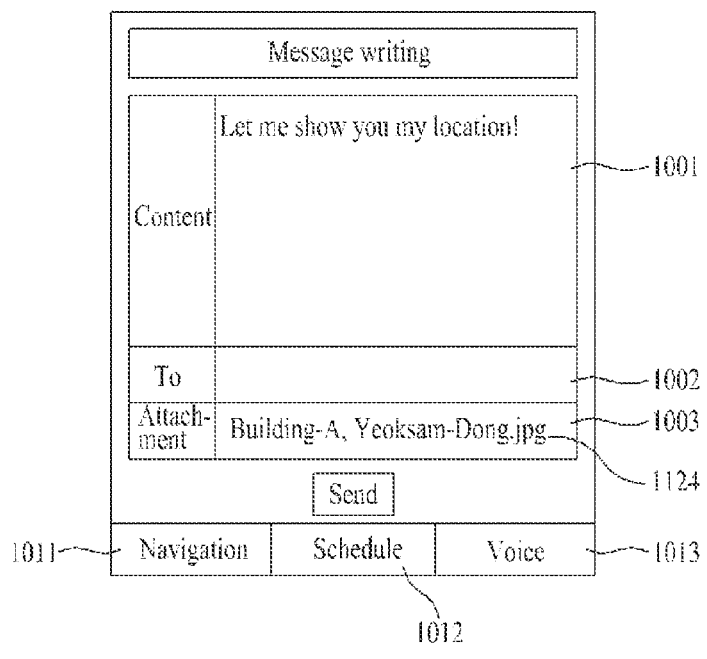
(b)

FIG. 11D
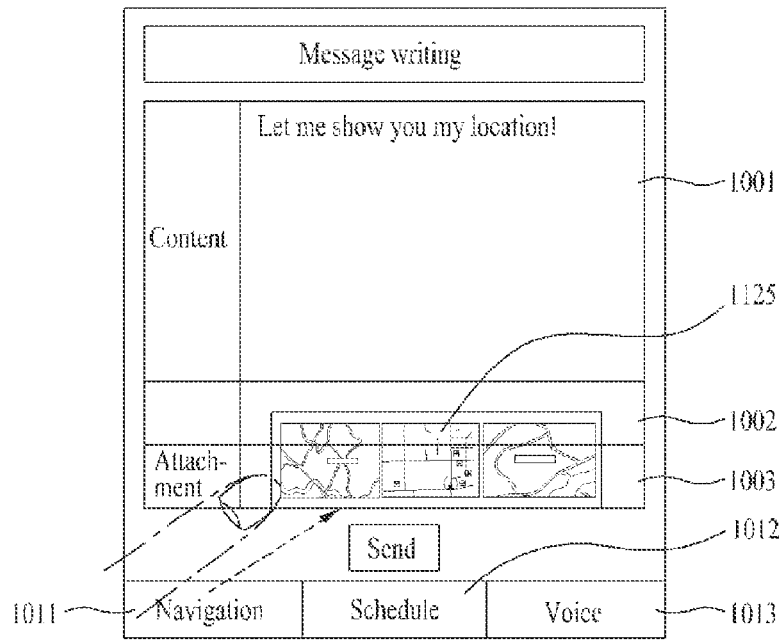
(a)
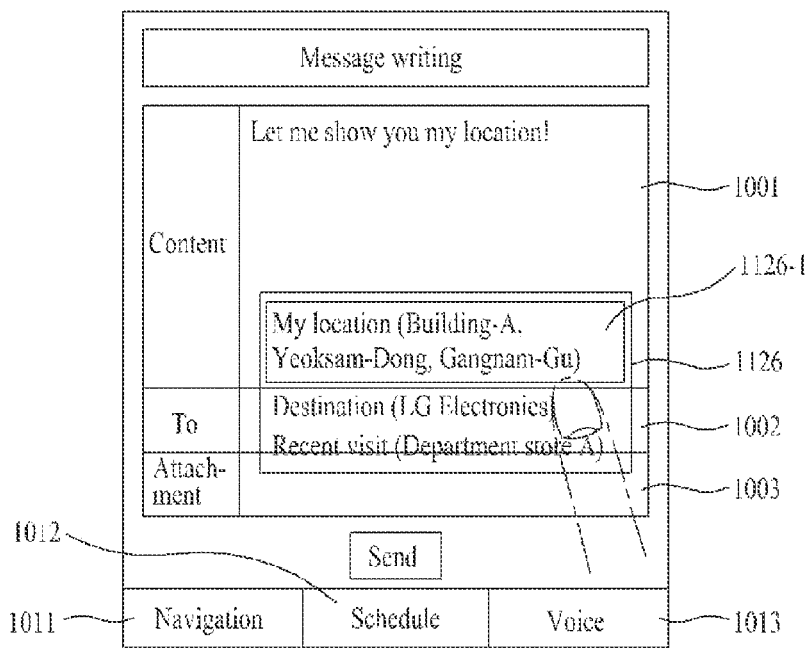
(b)

FIG. 12A
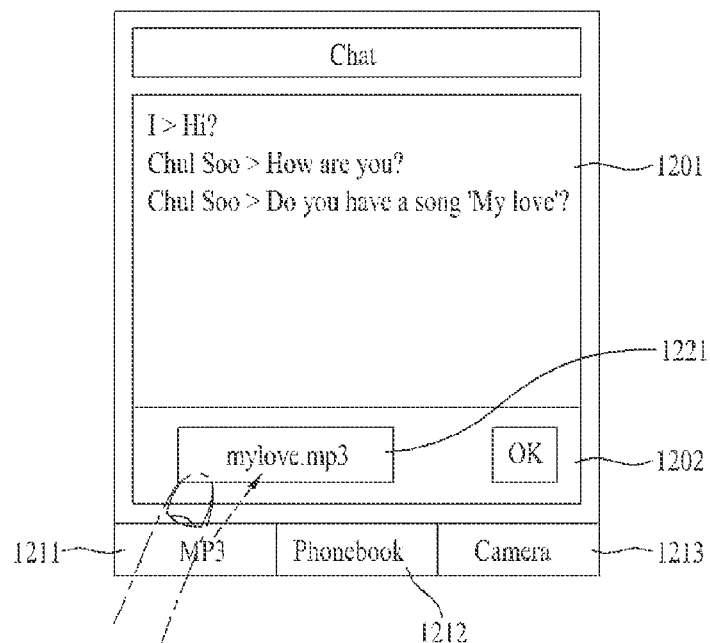
(a)
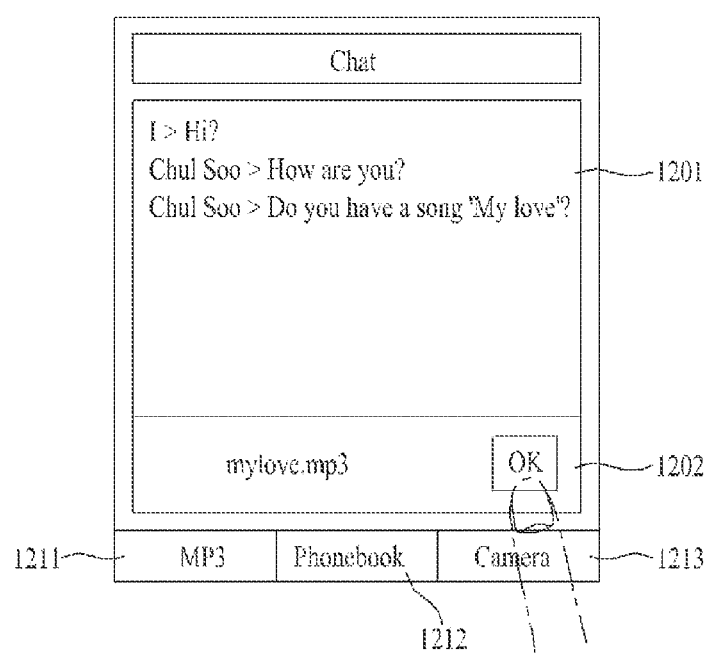
(b)

FIG. 12C
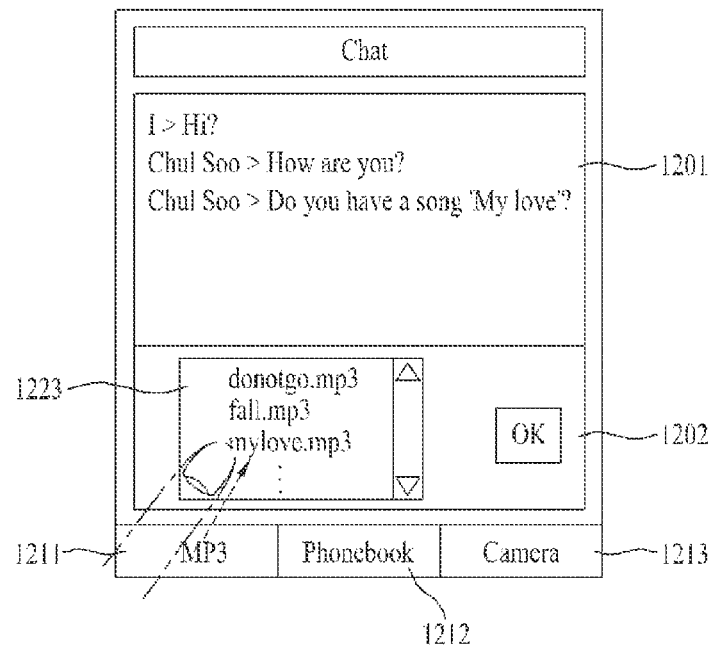
(a)
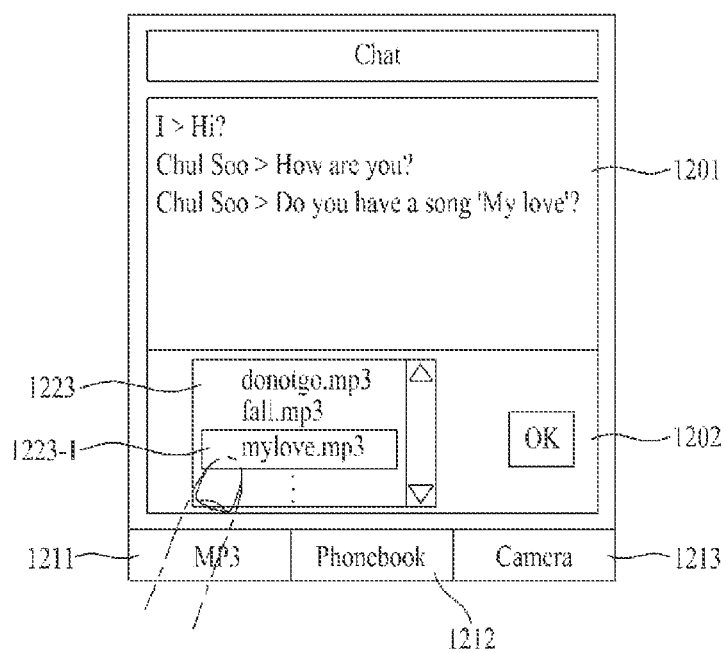
(b)

FIG. 13A
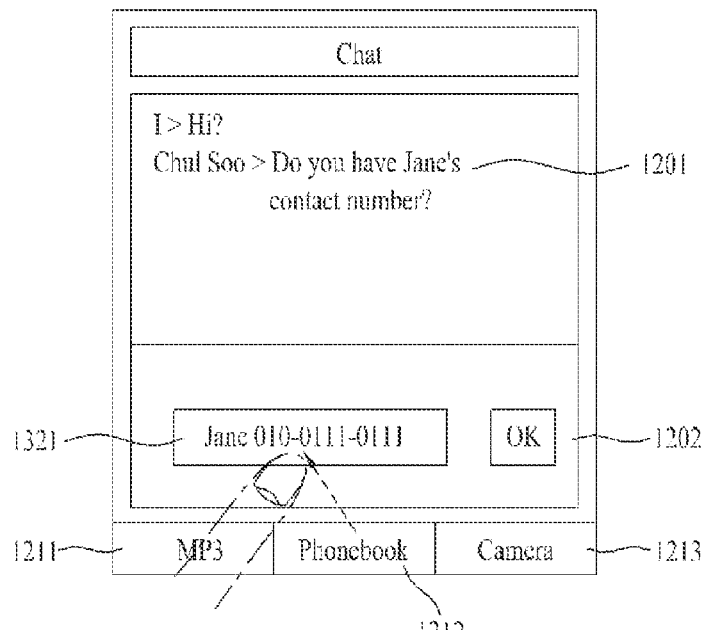
(a)
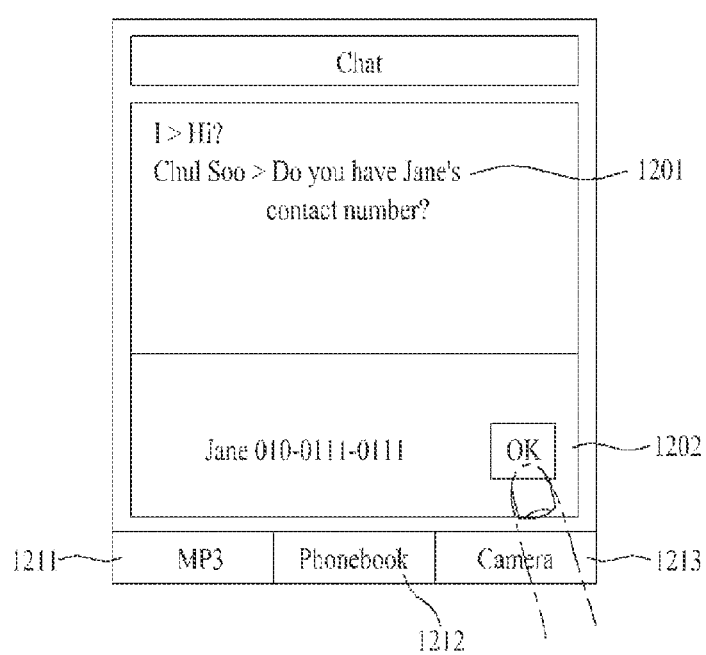
(b)

FIG. 13C
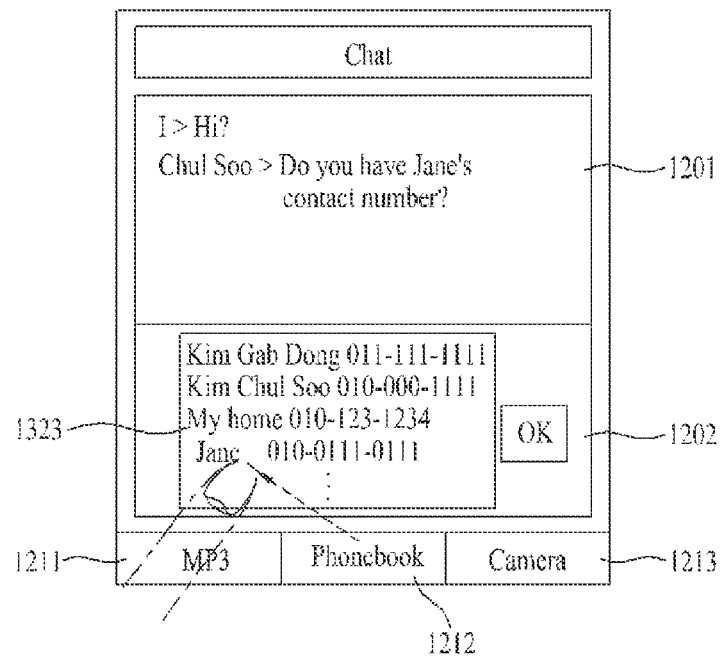
(a)
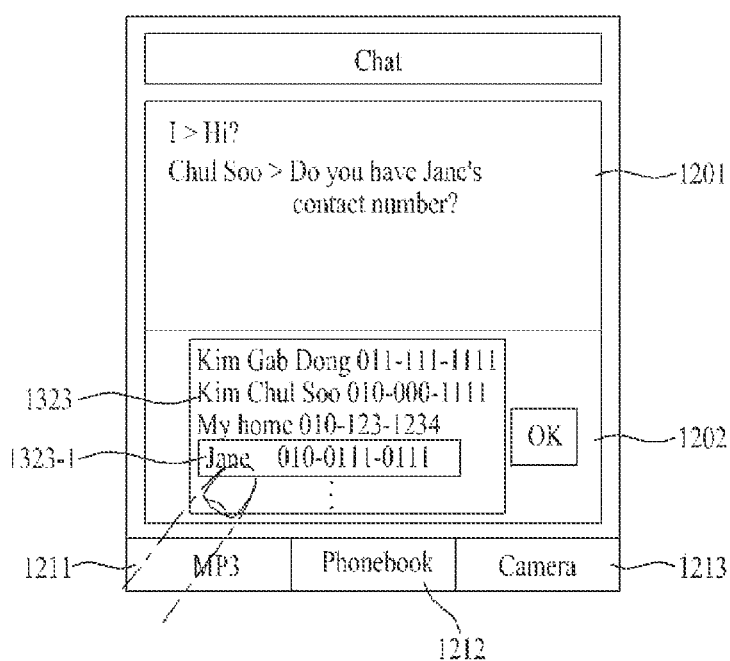
(b)

FIG. 14A
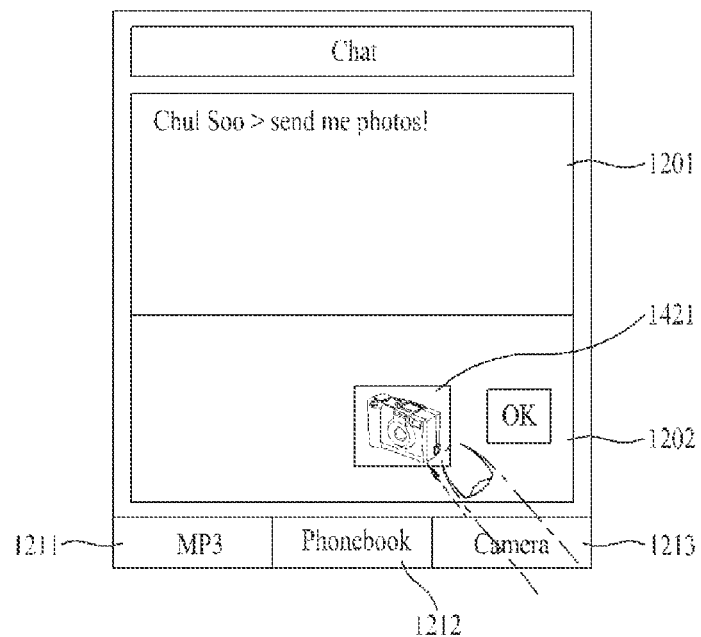
(a)
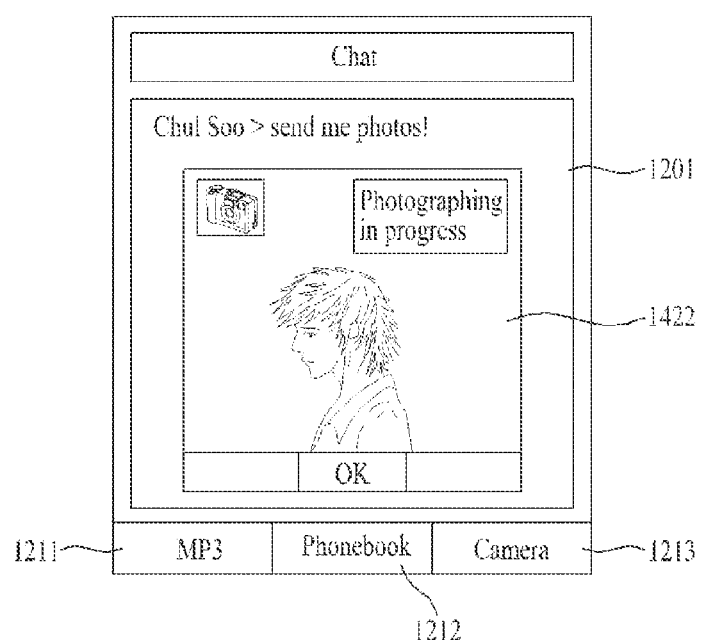
(b)

FIG. 14B
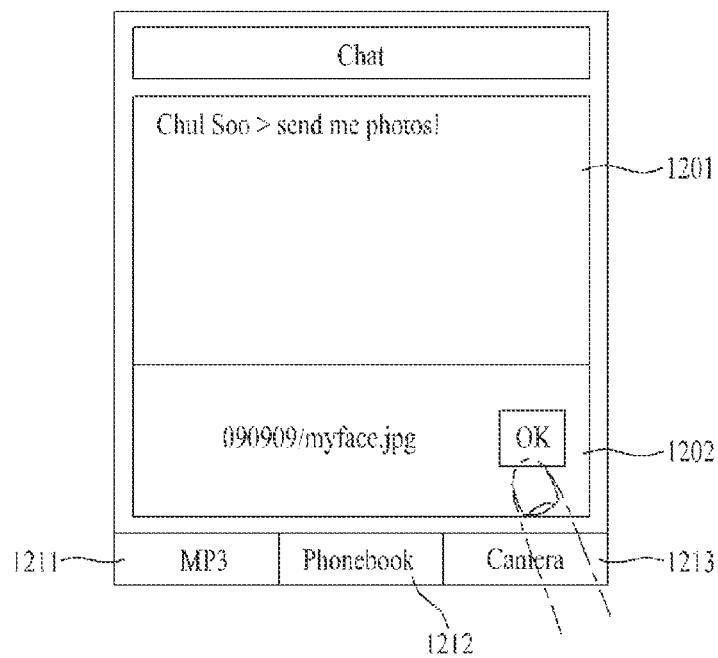
(a)
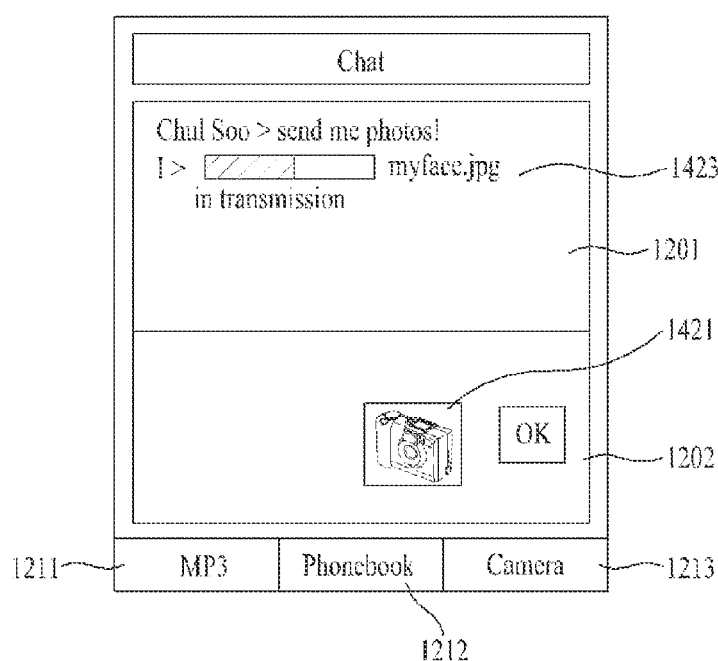
(b)

FIG. 15A
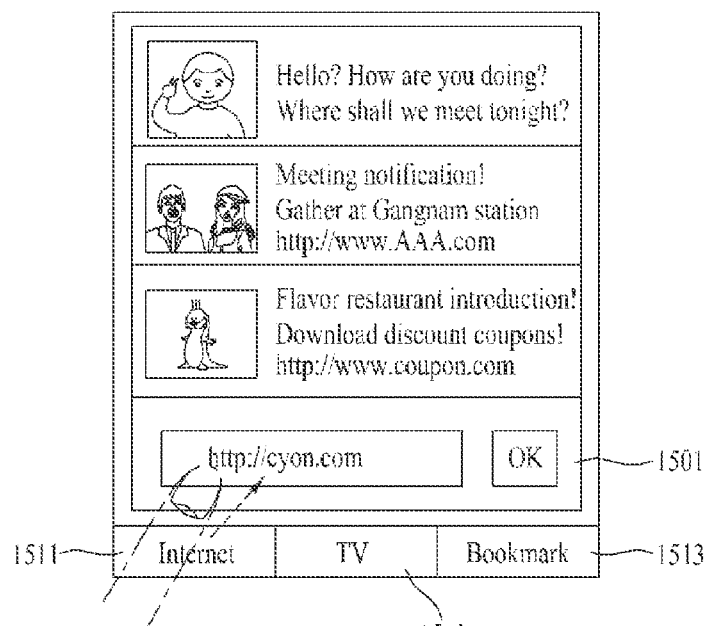
(a)
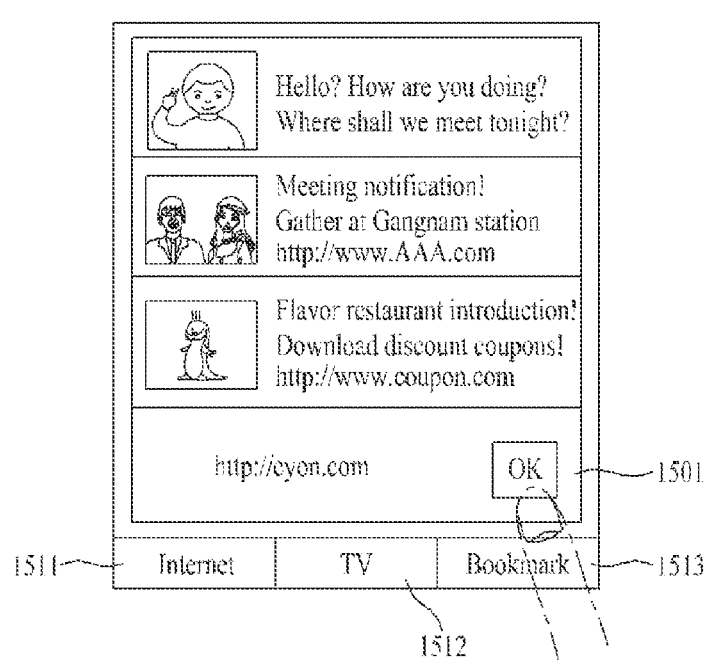
(b)

FIG. 16A
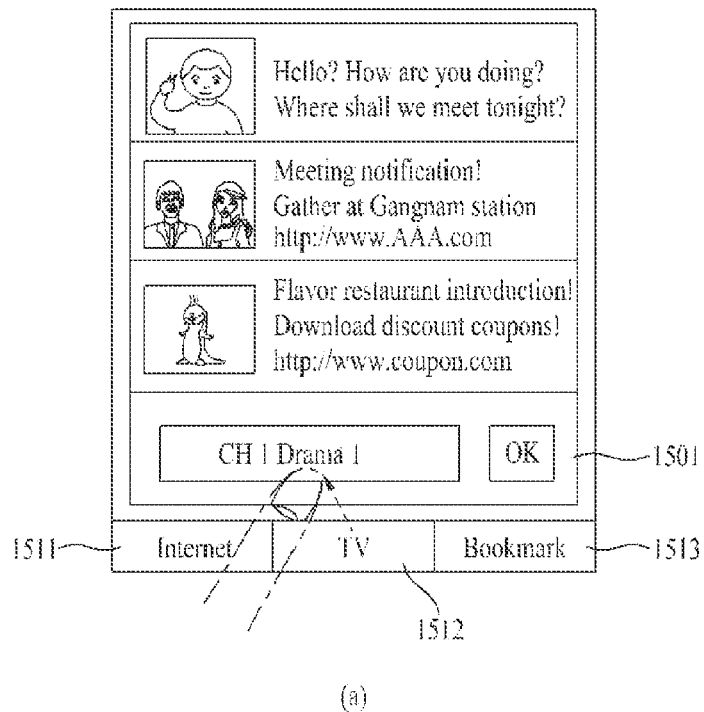
(a)
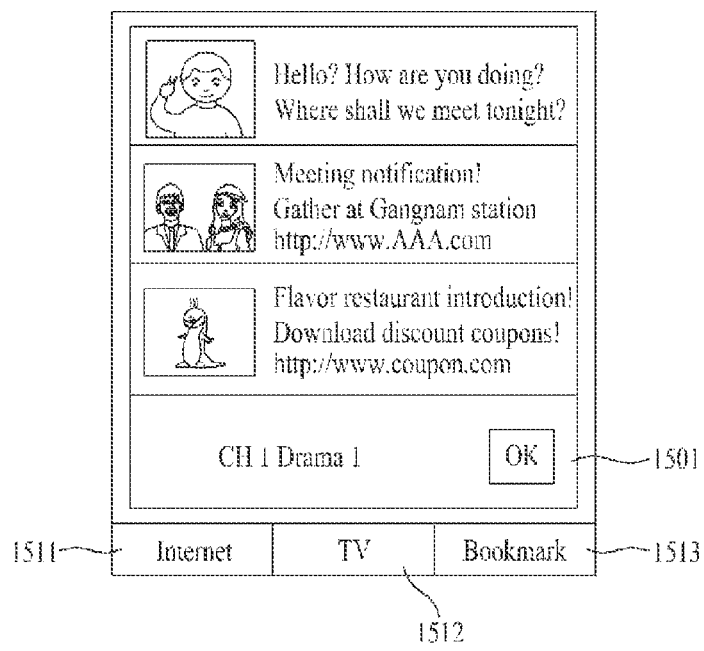
(b)

FIG. 17A
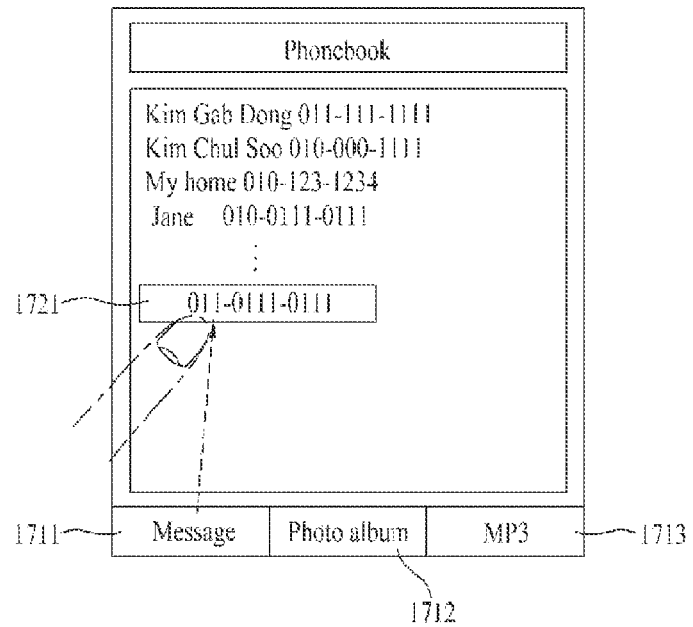
(a)
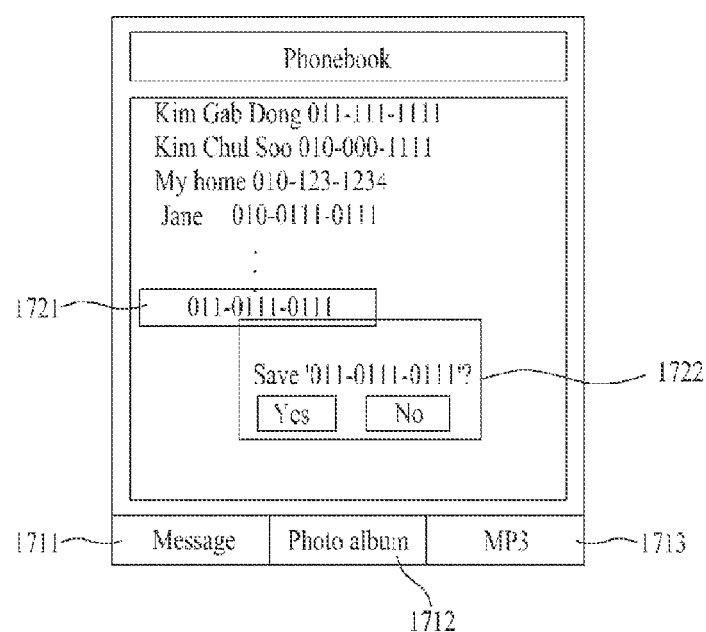
(b)

FIG. 17B
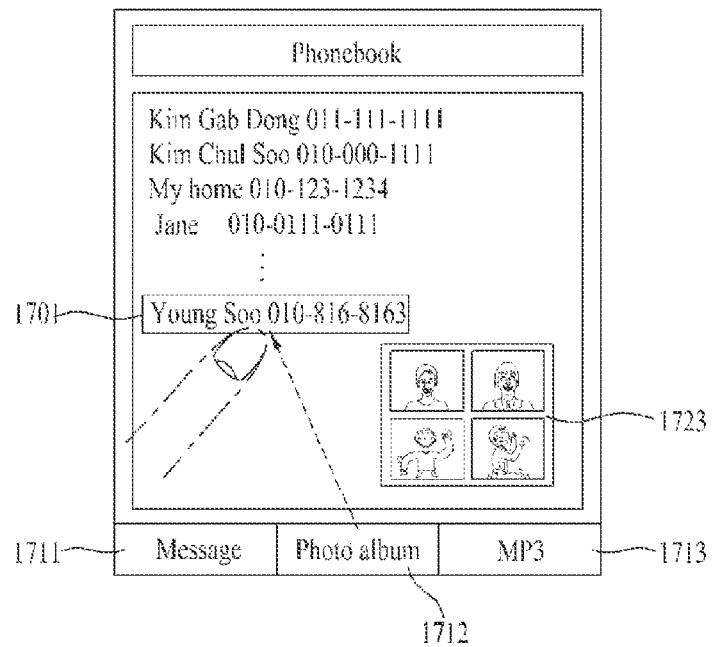
(a)
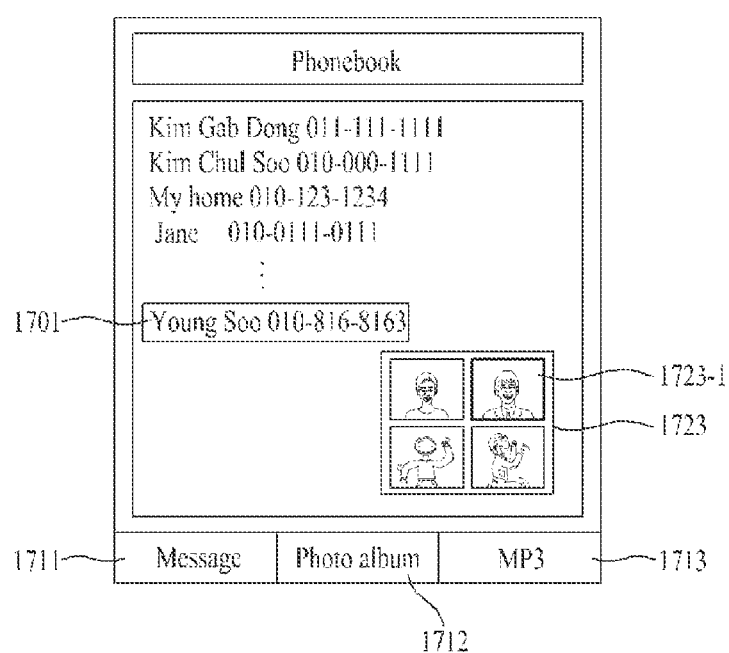
(b)

FIG. 18A
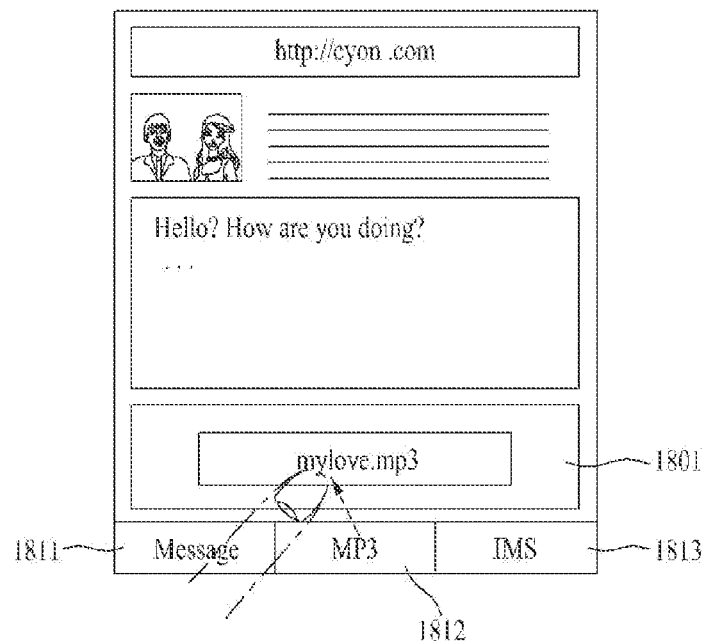
(a)
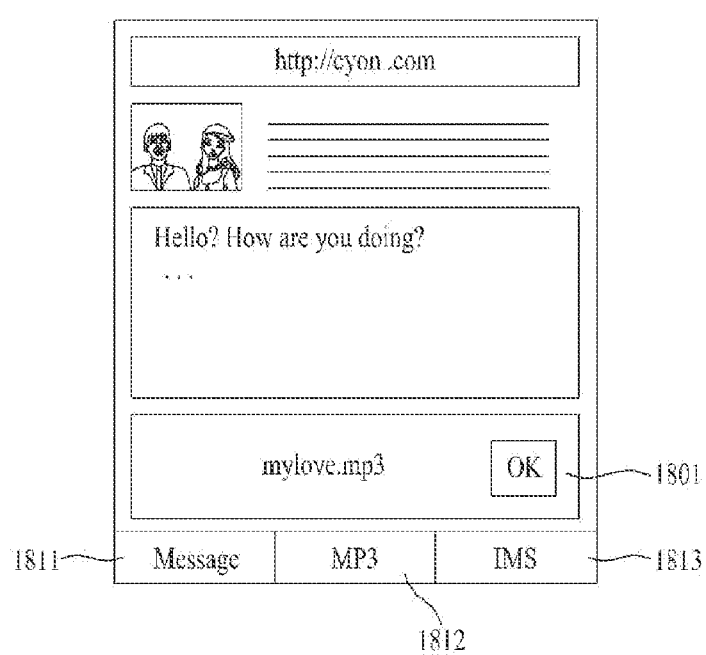
(b)

FIG. 19B
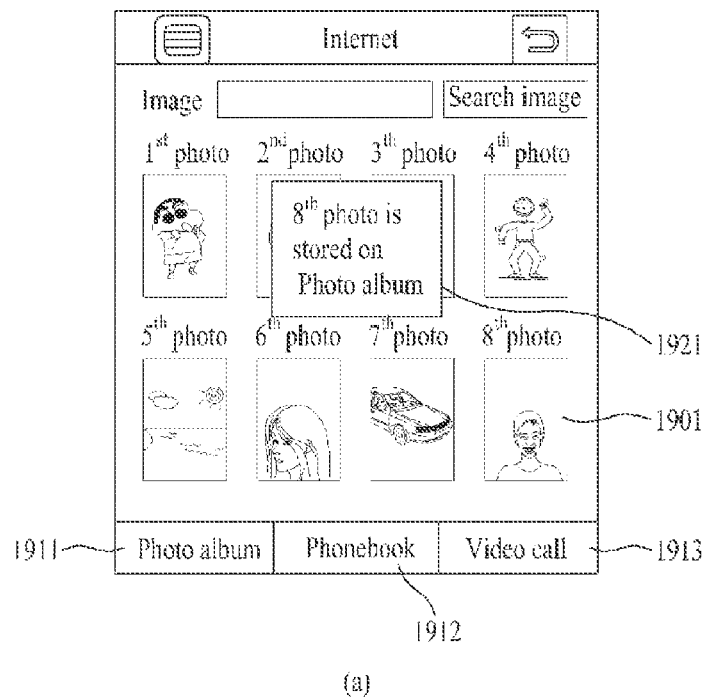
(a)
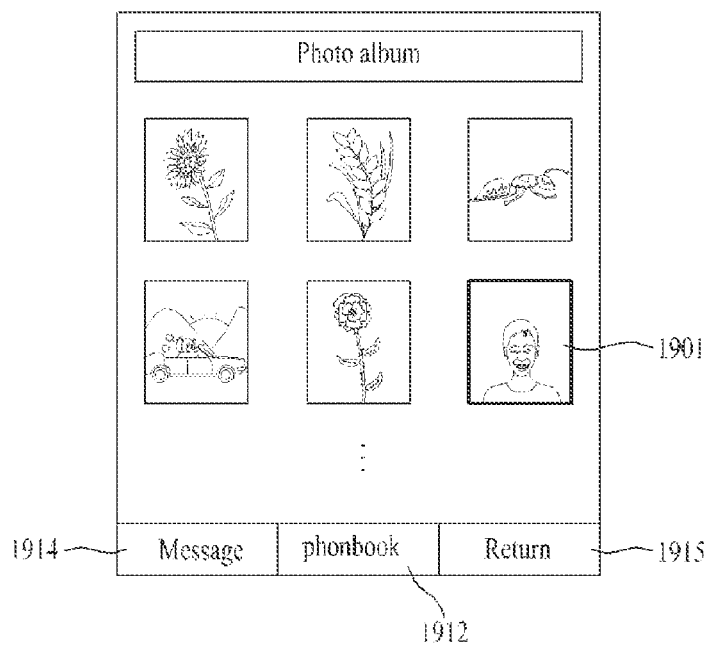
(b)

FIG. 21B
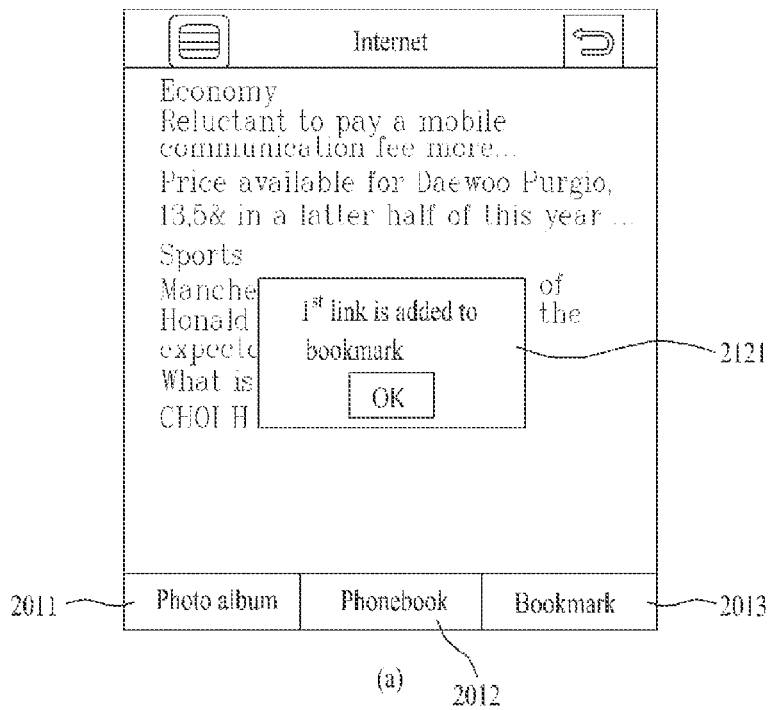
(a)
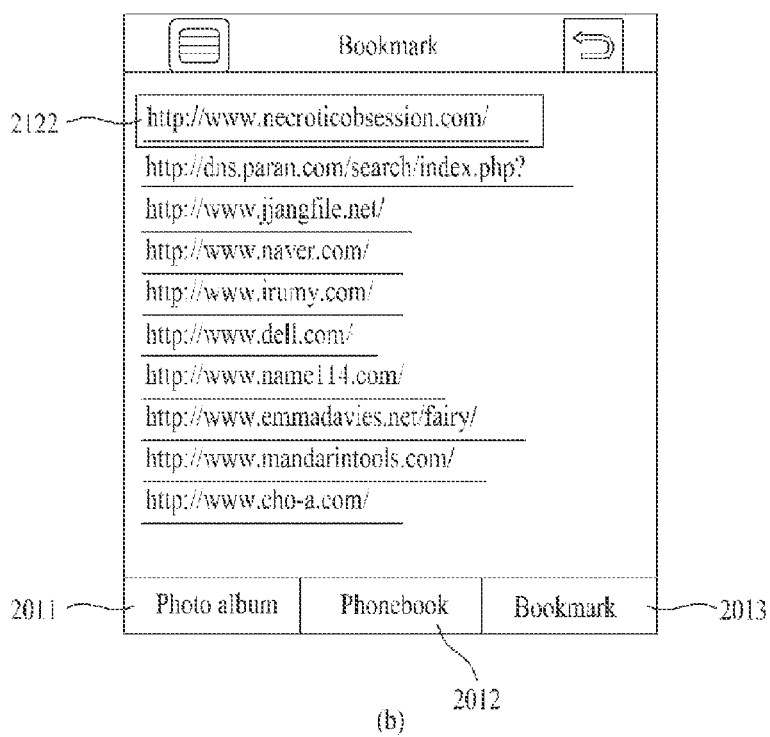
(b)

FIG. 23A
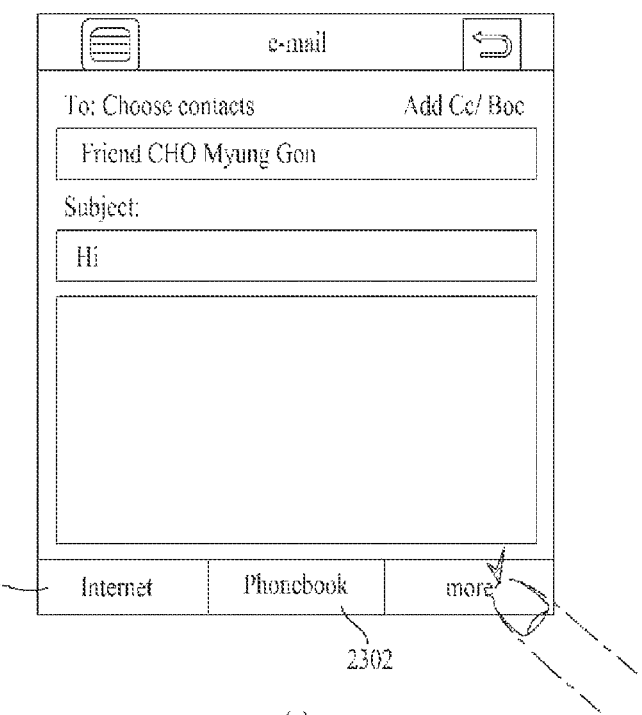
(a)
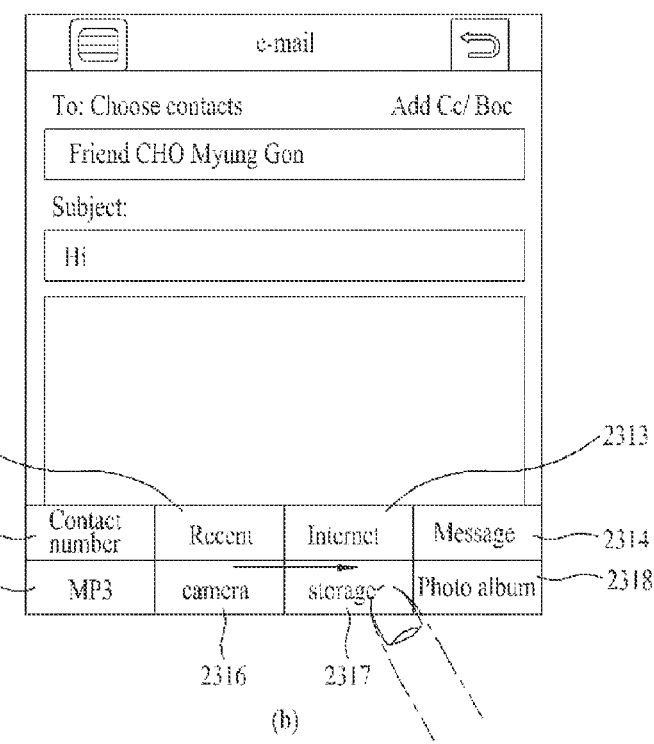
(b)

FIG. 23B
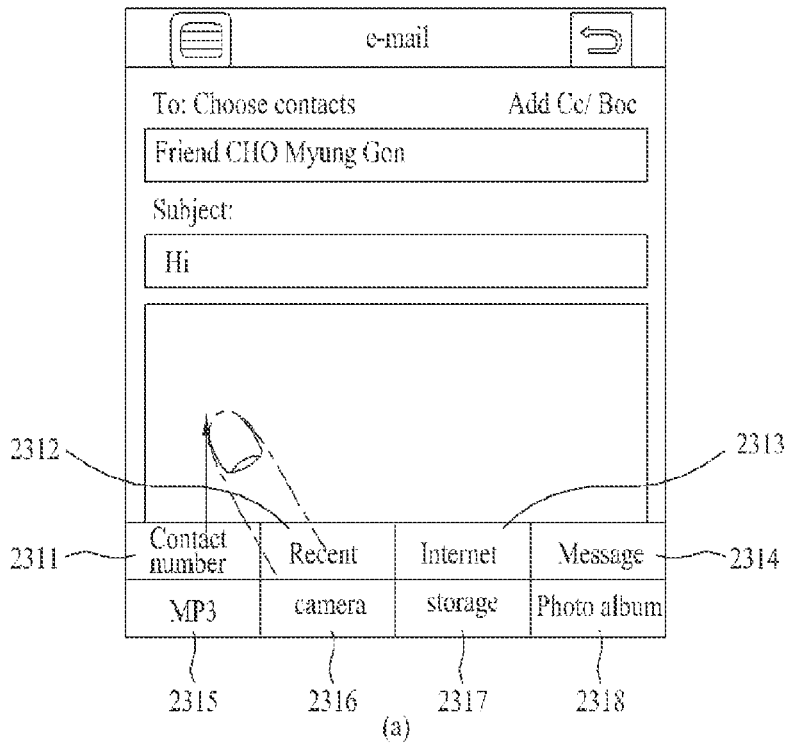
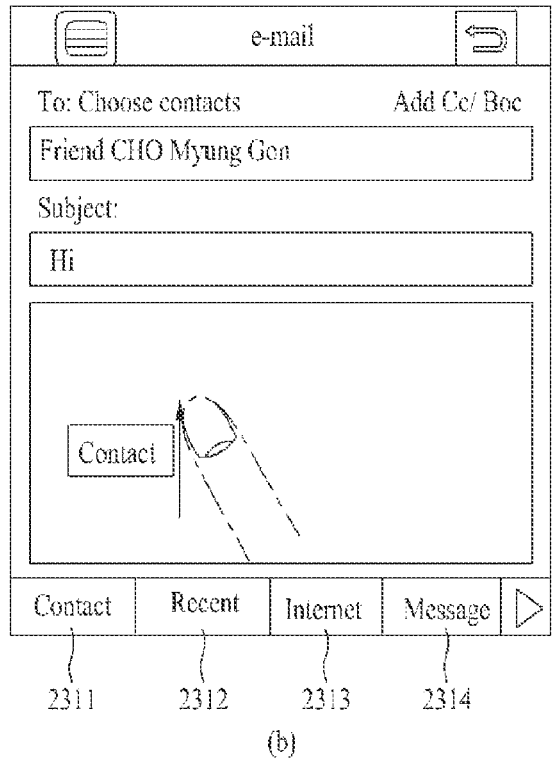

FIG. 23C
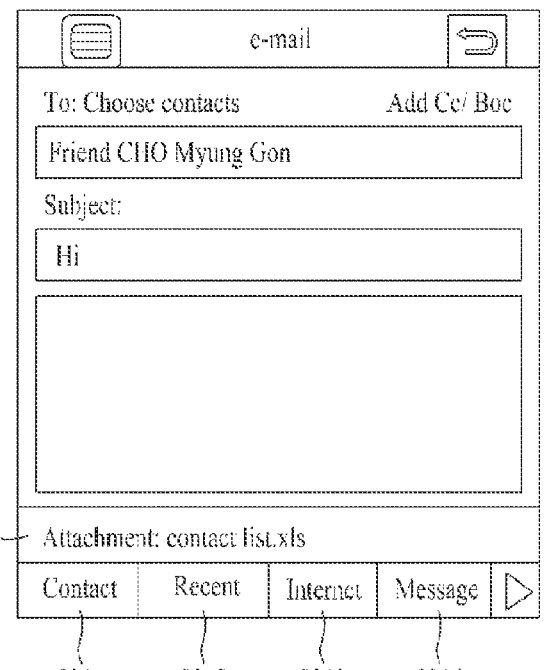
(a)
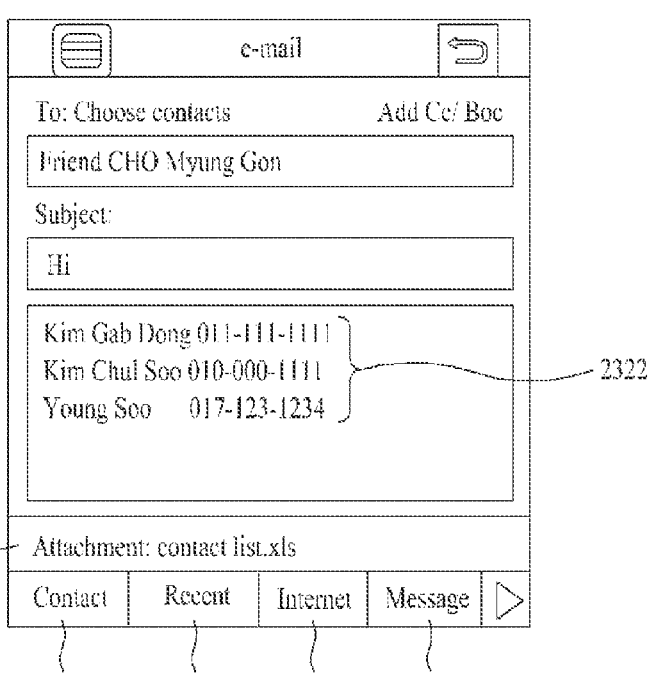
(b)

FIG. 23D
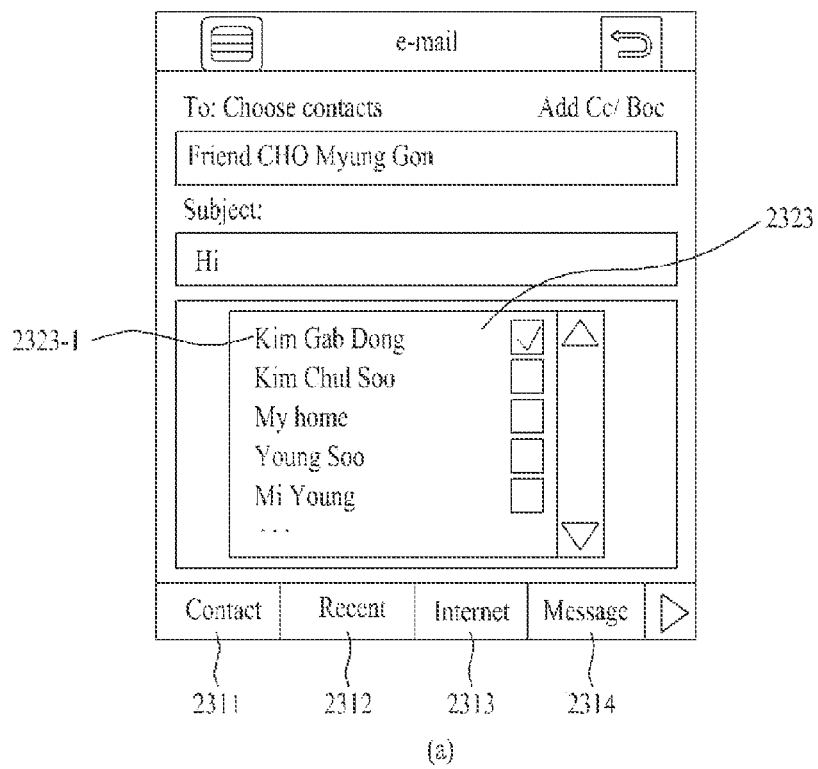
(a)
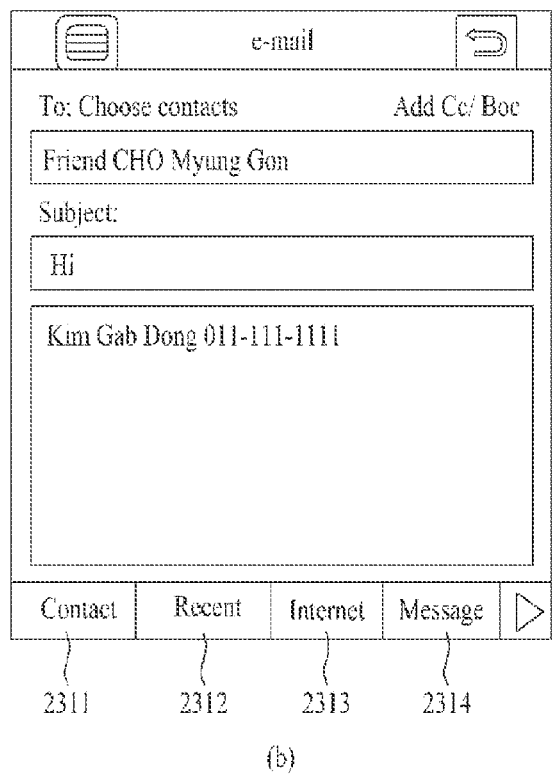
(b)

MOBILE TERMINAL AND METHOD OF CONTROLLING APPLICATION EXECUTION IN A MOBILE TERMINAL

Pursuant to 35 U.S.C. §119(a), this application claims the benefit of earlier filing date and right of priority to Korean Application No. 10-2009-0094259, filed on Oct. 5, 2009, the contents of which are hereby incorporated by reference herein in its entirety.

FIELD OF THE INVENTION

The present invention relates to a mobile terminal, and more particularly, to a mobile terminal and method of controlling execution of applications in a mobile terminal. Although the present invention is suitable for a wide scope of applications, it is particularly suitable for a mobile terminal capable of implementing a multitasking function for simultaneously executing a plurality of applications together.

DISCUSSION OF THE RELATED ART

Generally, terminals can be classified into mobile/portable terminals and stationary terminals. The mobile terminals can be classified into handheld terminals and vehicle mounted terminals according to the user's direct portability. As functions of the mobile terminal are diversified, the mobile terminals are implemented as multimedia players provided with composite functions such as capturing photos or moving pictures, playback of music or moving picture files, game playing, and broadcast reception.

A mobile terminal according to the related art executes a plurality of applications by multitasking and executes a first application in a foreground while executing a second application in a background. However, the related art fails to provide a method of facilitating corresponding information to be shared with a plurality of applications when multitasking.

SUMMARY OF THE INVENTION

Accordingly, the present invention is directed to a mobile terminal and method of controlling application execution therein that substantially obviates one or more problems due to limitations and disadvantages of the related art. An object of the present invention is to provide a mobile terminal and method of controlling application execution therein, by which corresponding information can be quickly and conveniently shared with a plurality of applications on multitasking.

Additional advantages, objects, and features of the invention will be set forth in part in the description that follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes in one aspect a mobile terminal includes a controller and a touchscreen. The controller is configured to execute a first application providing first information corresponding to an execution status of the first application and a second application providing second information. The touchscreen is configured to display an execution picture of the first application and an execution notification indicator of the second application and to receive a first touch and drag action from the execution notification indicator of the second application to the execution picture of the first application. The controller is further configured to add the second information to the first information in response to the first touch and drag action.

In another aspect, a mobile terminal includes a controller configured to execute a first application and a second application, and a touchscreen configured to display an execution picture of the first application and an execution notification indicator of the second application and to receive a touch and drag action from the execution picture of the first application to the execution notification indicator of the second application. The controller is further configured to add specific information included in the execution picture of the first application to information of the second application corresponding to the touch and drag action.

In another aspect, a method of controlling execution of an application in a mobile terminal includes executing a first application providing first information corresponding to an execution status of the first application and a second application providing second information via a controller, displaying an execution picture of the first application and an execution notification indicator of the second application on a touchscreen, receiving a first touch and drag action on the touchscreen from the execution notification indicator to the execution picture, displaying the second information on the touchscreen during the first touch and drag action, and adding the second information to the first information in response to the first touch and drag action.

In another aspect, a method of controlling execution of an application in a mobile terminal includes executing a first application and a second application via a controller, displaying an execution picture of the first application and an execution notification indicator of the second application on a touchscreen, receiving a touch and drag action on the touchscreen from the execution picture of the first application to the execution notification indicator of the second application, and adding specific information included in the execution picture of the first application to information of the second application corresponding to the touch and drag action.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3A and 3B are front diagrams of a mobile terminal according to one embodiment of the present invention for explaining an operational status of the mobile terminal.

FIG. 4 is a flowchart for a method of controlling application execution in a mobile terminal according to one embodiment of the present invention.

FIGS. 5A to 5C are diagrams of screen configurations for a process for adding Internet relevant information to an email according to the present invention.

FIGS. 6A to 6D are diagrams of screen configurations for a process for adding phonebook relevant information to an email according to the present invention.

FIGS. 7A and 7B are diagrams of screen configurations for a process for adding voice recording data to an email according to the present invention.

FIGS. 8A to 8C are diagrams of screen configurations for a process for adding phonebook relevant information to a message chat according to the present invention.

FIGS. 9A to 9C are diagrams of screen configurations for a process for adding photo information to a message chat according to the present invention.

FIGS. 10A to 10D are diagrams of screen configurations for a process for adding schedule information to a message according to the present invention.

FIGS. 11A to 11D are diagrams of screen configurations for a process for adding position information to a message according to the present invention.

FIGS. 12A to 12C are diagrams of screen configurations for a process for adding MP3 file information to an IMS chat according to the present invention.

FIGS. 13A to 13C are diagrams of screen configurations for a process for adding phonebook relevant information to an IMS chat according to the present invention.

FIGS. 14A and 14B are diagrams of screen configurations for a process for adding photographed image information to an IMS chat according to the present invention.

FIGS. 15A and 15B are diagrams of screen configurations for a process for adding Internet relevant information to a microblog message according to the present invention.

FIGS. 16A and 16B are diagrams of screen configurations for a process for adding TV relevant information to a microblog message according to the present invention.

FIGS. 17A and 17B are diagrams of screen configurations for a process for adding message relevant information/photo information to a phonebook according to the present invention.

FIGS. 18A and 18B are diagrams of screen configurations for a process for adding MP3 file information to an Internet page according to the present invention.

FIGS. 19A and 19B are diagrams of screen configurations for a process for adding Internet relevant information to a photo album according to the present invention.

FIGS. 21A and 21B are diagrams of screen configurations for a process for adding Internet relevant information to a bookmark according to the present invention.

FIGS. 23A to 23D are diagrams of screen configurations for a process for adding information to an execution picture according to the present invention.

DETAILED DESCRIPTION OF THE INVENTION

Reference will now be made in detail to the present invention, examples of which are illustrated in the accompanying drawings. Wherever possible, the same reference numbers will be used throughout the drawings to refer to the same or like parts. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Mobile terminals described herein can include a mobile phone, a smart phone, a laptop computer, a digital broadcast terminal, a PDA (personal digital assistants), a PMP (portable multimedia player), and a navigation system. Except a case applicable to a mobile terminal only, it is apparent to those of ordinary skill in the art that the configurations described herein are also applicable to stationary terminals, such as digital TVs and desktop computers.

Figure 1:
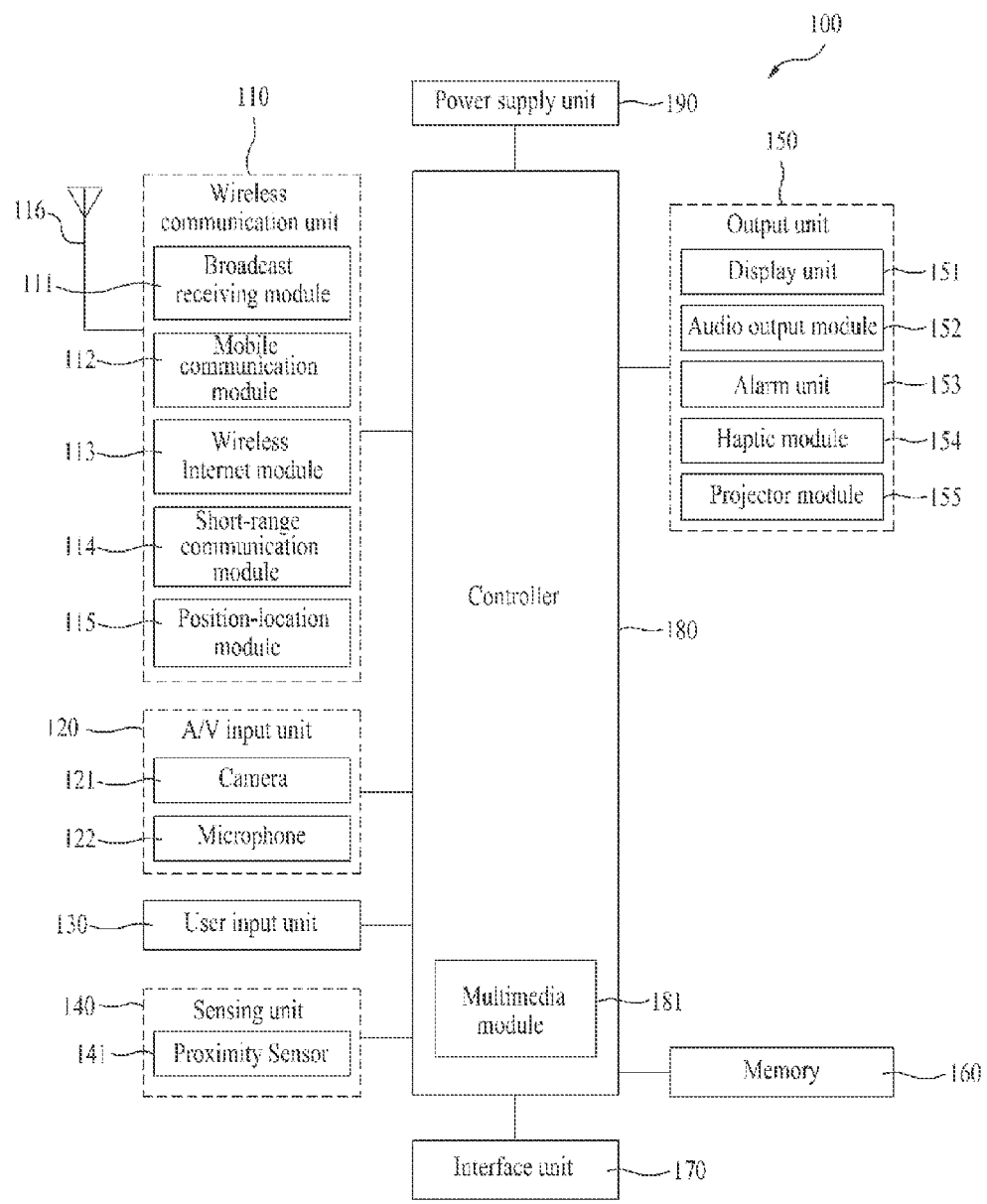
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180 and a power supply unit 190. Although FIG. 1 shows the mobile terminal 100 having various components, it is understood that implementing all of the illustrated components is not a requirement. More or fewer components may alternatively be implemented.

The wireless communication unit 110 may include one or more components that permit wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing server via a broadcast channel. The broadcast channel may include a satellite channel and/or a terrestrial channel. The broadcast signal and/or broadcast associated information received by the broadcast receiving module 111 may be stored in a suitable storage device, such as in the memory 160.

The external broadcast managing server generally refers to a server that generates and transmits a broadcast signal and/or broadcast associated information or a server that is provided with a previously generated broadcast signal and/or broadcast associated information. The broadcast managing server then transmits the provided signal or information to the mobile terminal 100.

The broadcast signal may be implemented as a TV broadcast signal, a radio broadcast signal, a data broadcast signal, or other known type of signal. If desired, the broadcast signal may include a broadcast signal combined with a TV or radio broadcast signal.

The broadcast associated information includes information associated with a broadcast channel, a broadcast program, or a broadcast service provider. The broadcast associated information can be provided via a mobile communication network, in which case the broadcast associated information can be received by the mobile communication module 112.

The broadcast associated information can be implemented in various forms. For example, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. For example, such broadcasting systems include digital multimedia broadcasting-terrestrial (DMB- T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-explained digital broadcasting systems.

The mobile communication module 112 transmits/receives wireless signals to/from one or more network entities (e.g., base station, external terminal or server). Such wireless signals may represent, for example, audio, video, and data according to text/multimedia message transceivings.

The wireless Internet module 113 supports Internet access for the mobile terminal 100. The wireless Internet module 113 may be internally or externally coupled to the mobile terminal 100. The wireless Internet technology can include WLAN (Wireless LAN), Wi-Fi, Wibro (Wireless broadband), Wimax (World Interoperability for Microwave Access), HSDPA (High Speed Downlink Packet Access), or other types of known wireless Internet technology.

The short-range communication module 114 facilitates relatively short-range communications. Suitable technologies for implementing the short-range communication module 114 include radio frequency identification (RFID), infrared data association (IrDA), ultra-wideband (UWB), as well at the networking technologies commonly referred to as Bluetooth™ and ZigBee®.

The position-location module 115 identifies or otherwise obtains the location of the mobile terminal 100. If desired, the position location module 115 may be implemented with a global positioning system (GPS) module.

With continued reference to FIG. 1, the audio/video (A/V) input unit 120 may be configured to provide audio or video signal input to the mobile terminal 100. As shown, the A/V input unit 120 includes a camera 121 and a microphone 122.

The camera 121 receives and processes image frames of still pictures or video, which are obtained by an image sensor in a video call mode or a photographing mode. The processed image frames can be displayed on a display unit 151. The image frames processed by the camera 121 can be stored in the memory 160 or can be externally transmitted via the wireless communication unit 110. Optionally, at least two cameras 121 can be provided in the mobile terminal 100 according to an environment of use.

The microphone 122 receives an external audio signal while the mobile terminal 100 is in a particular mode, such as phone call mode, recording mode or voice recognition mode. The external audio signal is processed and converted into electric audio data. The processed audio data is transformed into a format transmittable to a mobile communication base station via the mobile communication module 112 when in a call mode. The microphone 122 typically includes assorted noise removing algorithms to remove noise generated in the course of receiving the external audio signal.

Figure 2A:
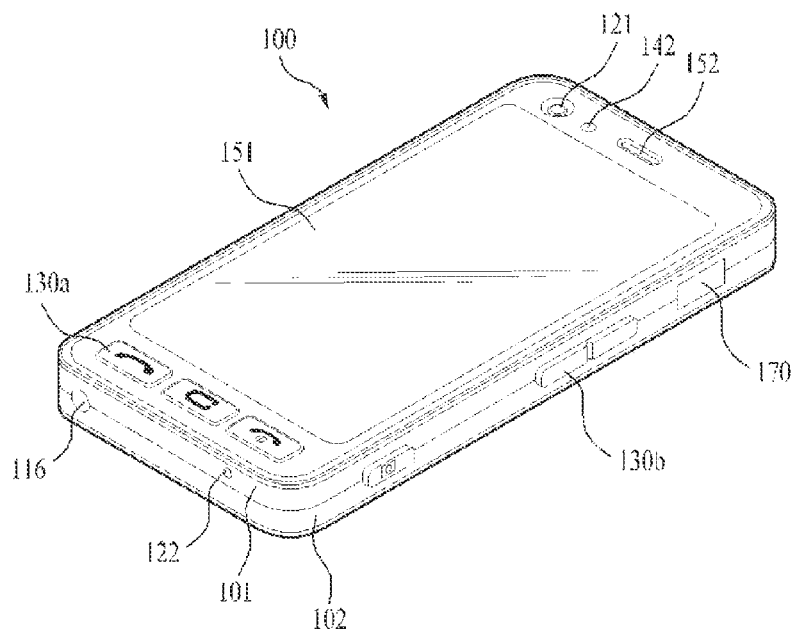
FIG. 2A is a front perspective diagram of a mobile terminal according to one embodiment of the present invention.

The user input unit 130 generates input data in response to user manipulation of an associated input device or devices. Examples of such input devices include a keypad, a dome switch, a touchpad (e.g., static pressure/capacitance), a jog wheel, and a jog switch. As depicted in FIG. 2A, the user input unit 130 may include a user inputs 130a and 130b.

The sensing unit 140 provides sensing signals for controlling operations of the mobile terminal 100 using status measurements of various aspects of the mobile terminal 100. The sensing unit 140 may include a proximity sensor 141. For example, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation of the mobile terminal 100 or acceleration/deceleration of the mobile terminal 100.

As an example, the mobile terminal 100 may be configured as a slide-type mobile terminal. In this configuration, the sensing unit 140 may sense whether a sliding portion of the mobile terminal is open or closed. Other examples include the sensing unit 140 sensing the presence or absence of power provided by the power supply 190 and the presence or absence of a coupling or other connection between the interface unit 170 and an external device.

The output unit 150 generates outputs relevant to the senses of sight, hearing, and touch. The output unit 150 may include the display unit 151, an audio output module 152, an alarm unit 153, a haptic module 154, and a projector module 155.

The display unit 151 is typically implemented to visually display (output) information associated with the mobile terminal 100. For example, if the mobile terminal 100 is operating in a phone call mode, the display 151 will generally provide a user interface (UI) or graphical user interface (GUI) that includes information associated with placing, conducting, and terminating a phone call. As another example, if the mobile terminal 100 is in a video call mode or a photographing mode, the display unit 151 may additionally or alternatively display images that are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented as a transparent or optical transmittive type, hereafter referred to as a transparent display. A TOLED (transparent OLED) is a representative example of the transparent display.

A rear configuration of the display unit 151 can also be implemented in the optical transmittive type. In this configuration, a user is able to see an object at the rear of the terminal body via the area occupied by the display unit 151 of the terminal body.

At least two display units 151 can be provided in the mobile terminal 100. For example, a plurality of display units 151 can be arranged on a single face of the mobile terminal 100 spaced apart from each other or built in one body. Alternatively, a plurality of display units 151 can be arranged on different faces of the mobile terminal 100.

If the display unit 151 and a sensor for detecting a touch action (hereinafter called 'touch sensor') configures a mutual layer structure (hereinafter called 'touchscreen'), the display unit 151 may be used as both an input device and an output device. In this case, the touch sensor can be configured as a touch film, a touch sheet, or a touchpad.

The touch sensor can be configured to convert a pressure applied to a specific portion of the display unit 151 or a variation of a capacitance generated from a specific portion of the display unit 151 to an electric input signal. Moreover, the touch sensor is able to detect a pressure of a touch as well as a touched position or magnitude of the touch.

If a touch input is made to the touch sensor, signal(s) corresponding to the touch is transferred to a touch controller. The touch controller processes the signal(s) and then transfers the processed signal(s) to the controller 180. Therefore, the controller 180 is able to determine whether a prescribed portion of the display unit 151 is touched.

Referring again to FIG. 1, a proximity sensor 141 can be provided to an internal area of the mobile terminal 100 enclosed by the touchscreen or around the touchscreen. The proximity sensor 141 is a sensor that detects a presence or non-presence of an object approaching a prescribed detecting surface or an object existing around the proximity sensor using an electromagnetic field strength or infrared ray without mechanical contact. Hence, the proximity sensor 141 has greater durability than a contact type sensor and also has greater utility than the contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, or other type of known proximity sensor. If the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action in which a pointer approaches without contacting the touchscreen, yet is recognized as being located on the touchscreen, is named 'proximity touch'. An action in which a pointer actually touches the touchscreen is named 'contact touch'. The position on the touchscreen proximity-touched by the pointer refers to the position of the pointer that vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touchscreen.

The audio output module 152 functions in various modes including a call-receiving mode, a call-placing mode, a recording mode, a voice recognition mode, or a broadcast reception mode to output audio data that is received from the wireless communication unit 110 or is stored in the memory 160. During operation, the audio output module 152 outputs audio relating to a particular function (e.g., call received, message received). The audio output module 152 is often implemented using one or more speakers, buzzers, other audio producing devices, and combinations thereof.

The alarm unit 153 outputs a signal for announcing the occurrence of a particular event associated with the mobile terminal 100. Typical events include a call received event, a message received event and a touch input received event. The alarm unit 153 is able to output a signal for announcing the event occurrence via vibration as well as a video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative tactile effect generated by the haptic module 154. Strength and pattern of the vibration generated by the haptic module 154 are controllable. For example, different vibrations can be output by being synthesized together or can be output in sequence.

The haptic module 154 may generate various tactile effects in addition to vibration. For example, the haptic module 154 may generate an effect attributed to the arrangement of pins vertically moving against a contact skin surface, an effect attributed to injection/suction power of air though an injection/suction hole, an effect attributed to the skimming over a skin surface, an effect attributed to contact with an electrode, an effect attributed to an electrostatic force, an effect attributed to a representation of hot/cold sense using an endothermic or exothermic device, or other known tactile effects.

The haptic module 154 can be implemented to enable a user to sense the tactile effect through a muscle sense of finger or arm as well as to transfer the tactile effect through a direct contact. Optionally, at least two haptic modules 154 can be provided in the mobile terminal 100 in accordance with the corresponding configuration type of the mobile terminal 100.

The projector module 155 is an element for performing an image projector function using the mobile terminal 100. The projector module 155 displays an image, which is identical to or partially different from an image displayed on the display unit 151, on an external screen or wall according to a control signal of the controller 180.

The projector module 155 can include a light source (not shown) generating light (e.g., laser) for projecting an image externally, an image producing means (not shown) for producing an image to output externally using the light generated from the light source, and a lens (not shown) for enlarging the image output externally at a predetermined focus distance. The projector module 155 can further include a device for adjusting a direction of the projected image by mechanically moving the lens or the entire projector module.

The projector module 155 can be classified as a CRT (cathode ray tube) module, an LCD (liquid crystal display) module, a DLP (digital light processing) module or other type of known projector module according to a type of the display means. In particular, the DLP module is operated by a mechanism for enabling the light generated from the light source to reflect on a DMD (digital micro-mirror device) chip and can be advantageous for limiting the size of the projector module 151.

Preferably, the projector module 155 can be provided in a lengthwise direction of a lateral side, front side or back side of the mobile terminal 100. It is understood that the projector module 155 can be provided on any portion of the mobile terminal 100 according to necessity.

The memory 160 is generally used to store various types of data to support the processing, control, and storage requirements of the mobile terminal 100. Examples of such data include program instructions for applications operating on the mobile terminal 100, contact data, phonebook data, messages, audio, still pictures, and moving pictures.

A recent use history or a cumulative use frequency of each data (e.g., use frequency for each phonebook, each message or each multimedia) can be stored in the memory 160. Moreover, data for various patterns of vibration and/or sound output in response to a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory), or other similar memory or data storage device. The mobile terminal 100 may operate in association with web storage for performing a storage function of the memory 160 on the Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or other known port types.

The identity module is the chip for storing various types of information for authenticating a use authority of the mobile terminal 100 and can include User Identify Module (UIM), Subscriber Identity Module (SIM) and/or Universal Subscriber Identity Module (USIM). A device having the identity module (hereinafter called an 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications and video calls. The controller 180 may include a multimedia module 181 that provides multimedia playback. The multimedia module 181 may be configured as part of the controller 180 or implemented as a separate component. The controller 180 may also perform a pattern recognizing process for recognizing a writing input as characters and a picture drawing input as images performed on the touchscreen.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

FIG. 2A is a front perspective diagram of a mobile terminal 100 according to one embodiment of the present invention. The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. The case can be divided into a front case 101 and a rear case 102. Various electric/electronic parts are loaded in a space provided between the front and rear cases 101 and 102. Optionally, at least one middle case can be further provided between the front and rear cases 101 and 102. The cases 101 and 102 can be formed by injection molding of synthetic resin or can be formed of a metallic material, such as stainless steel (STS) or titanium (Ti).

A display unit 151, an audio output unit 152, a camera 121, user input units 130a and 130b, a microphone 122 and/or an interface unit 170 can be provided on the terminal body, and more particularly, on the front case 101.

The display unit 151 occupies most of a main face of the front case 101. The audio output unit 152 and the camera 121 are provided to an area adjacent to one of two end portions of the display unit 151, while the user input unit 130a and the microphone 122 are provided to an area adjacent to the other, opposite end portion of the display unit 151. The user input unit 130b and the interface unit 170 can be provided at lateral sides of the front and rear cases 101 and 102.

The input unit 130 may be manipulated to receive a command for controlling an operation of the terminal 100. The input unit 130 may include a plurality of manipulating units 130a and 130b. The manipulating units 130a and 130b can be named a manipulating portion and may adopt any mechanism of a tactile manner that enables a user to perform a manipulation action by experiencing a tactile feeling.

Content input by the first or second manipulating unit 130a or 130b can be set to be different. For example, commands such as start, end and scroll are input via the first manipulating unit 130a. Commands for adjusting volume of sound output from the audio output unit 152 and for a switching the display unit 151 to a touch recognizing mode can be input via the second manipulating unit 130b.

Figure 2B:
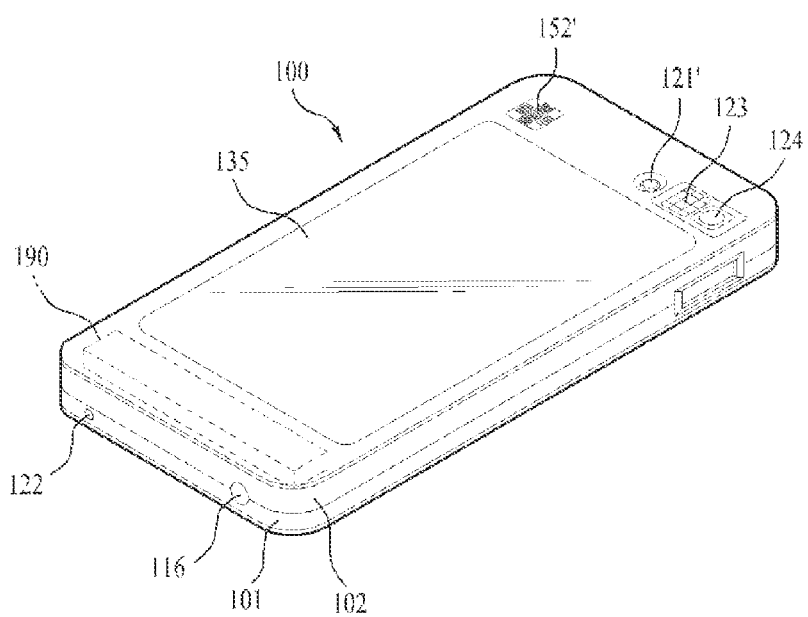
FIG. 2B is a rear perspective diagram of a mobile terminal according to one embodiment of the present invention.

FIG. 2B is a rear perspective diagram of the mobile terminal 100 shown in FIG. 2A. Referring to FIG. 2B, an additional camera 121' can be provided at a rear side of the terminal body, and more particularly, on the rear case 102. The camera 121' on the rear case 102 has a photographing direction that is substantially opposite to that of the camera 121 on the front case 101 shown in FIG. 2A and the cameras 121 and 121' may have different pixel densities.

The camera 121 on the front case 101 may have a low pixel density for capturing and transmitting a picture of the user's face for a video call, while the camera 121' on the rear case 102 may have a high pixel density for capturing a general subject for photography without transmitting the captured subject. Each of the cameras 121 and 121' can be configured to be rotated or popped up from the terminal body.

A flash 123 and a mirror 124 may be disposed adjacent to the camera 121'. The flash 123 projects light toward a subject when photographing the subject using the camera 121'. When a user attempts to take a picture of himself/herself (self-photography) using the camera 121', the mirror 124 enables the user to view his/her face reflected by the mirror 124.

An additional audio output unit 152' can be disposed at the rear side of the terminal body. The additional audio output unit 152' facilitates a stereo function together with the audio output unit 152 illustrated in FIG. 2A and may be used for implementation of a speakerphone mode when communicating via the mobile terminal 100.

A broadcast signal receiving antenna 116 can be provided at an end of the terminal body in addition to the antenna for communication. The antenna 116 incorporated into the broadcast receiving module 111 shown in FIG. 1 can be retractable within the terminal body.

A power supply unit 190 for supplying power to the mobile terminal 100 is provided in the terminal body. The power supply unit 190 can be configured to be built within the terminal body or to be detachably connected to the terminal body.

A touchpad 135 for detecting a touch input can be disposed at the rear case 102. The touchpad 135 can be a light transmittive type, similar to the display unit 151. If the display unit 151 is configured to output visual information from both its front and rear faces, it recognizes the visual information via the touchpad 135 as well. The information output from the front and rear faces can be entirely controlled by the touchpad 135. Alternatively, a display is provided at the touchpad 135 so that a touchscreen can be disposed at the rear case 102.

The touchpad 135 is activated by interconnecting with the display unit 151 of the front case 101. The touchpad 135 can be disposed at the rear of the display unit 151 and in parallel thereto. The touchpad 135 can be of a size equal to or smaller than that of the display unit 151.

An interconnected operational mechanism between the display unit 151 and a touchpad 135 is explained with reference to FIGS. 3A and 3B. FIGS. 3A and 3B are front-view diagrams of a mobile terminal 100 according to one embodiment of the present invention for explaining an operational state thereof.

Various types of visual information can be displayed on the display unit 151. The information can be displayed as characters, numerals, symbols, graphics and/or icons.

In order to input the information, at least one of the characters, numerals, symbols, graphics and icons is represented as a single predetermined array to be implemented in a keypad formation. This keypad formation can be so-called 'soft keys'. FIG. 3A depicts a touch applied to a soft key input through a front face of a terminal body.

The display unit 151 is operable through an entire area or by being divided into a plurality of regions. In the latter case, a plurality of the regions can be configured to be interoperable.

For example, an output window 151a and an input window 151b are displayed on the display unit 151. A soft key 151c representing a digit for inputting a phone number or other information is displayed on the input window 151b. If the soft key 151c is touched, a digit corresponding to the touched soft key is displayed on the output window 151a. If a first manipulating unit 130a is manipulated, a call connection for the phone number displayed on the output window 151a is attempted.

FIG. 3B depicts a touch being applied to a soft key input through a rear face of a terminal body. FIG. 3A shows the terminal body arranged vertically (portrait), while FIG. 3B shows the terminal body arranged horizontally (landscape). The display unit 151 can be configured to change an output picture according to the arranged direction of the terminal body.

FIG. 3B shows a text input mode activated in the mobile terminal 100. An output window 151a' and an input window 151b' are displayed on the display unit 151. A plurality of soft keys 151c' representing at least characters, symbols or digits can be arranged in the input window 151b'. The soft keys 151c' can be arranged in the QWERTY key formation.

If the soft keys 151c' are touched through the touchpad 135 as in FIG. 2B, the characters, symbols and digits corresponding to the touched soft keys are displayed on the output window 151a'. The touch input via the touchpad 135 is advantageous since blocking the soft keys 151c' by a finger during a touch can be prevented, as compared to the touch input via the display unit 151. If the display unit 151 and the touchpad 135 are configured as transparent, the user is able to visually see his/her fingers located at the rear side of the terminal body. Hence, more accurate touch inputs are possible.

The display unit 151 or the touchpad 135 can be configured to receive a touch input by scrolling. A user scrolls the display unit 151 or the touchpad 135 to shift a cursor or pointer located at an entity (e.g., an icon) displayed on the display unit 151. Furthermore, when a finger is shifted on the display unit 151 or the touchpad 135, a path of the shifted finger can be displayed visually on the display unit 151. This may be useful in editing an image displayed on the display unit 151.

When both the display unit (touchscreen) 151 and the touchpad 135 are touched together within a predetermined time range, one function of the mobile terminal 100 can be executed. The simultaneous touch may occur when the terminal body is held by a user using a thumb and a first finger (clamping). The above function can include activation or deactivation for the display unit 151 or the touchpad 135.

A mobile terminal 100 described in this disclosure can include at least one of the elements shown in FIG. 1. The mobile terminal 100 includes a touchscreen 151 for receiving a touch action input, such as a touch and drag action, by a user and for displaying information corresponding to the touch and drag action. For example, the touchscreen can be configured such that the touchpad 135, which is an example of the user input unit 130, and the display unit 151 are provided in a layered structure.

An application described in this disclosure refers to a terminal function that can be executed by the mobile terminal 100. For example, the application can include one of a message, a phonebook, an Internet page, a video call, a navigation system, a microblog message, such as a Twitter® message, a voice recording, a scheduling management page, an instant messaging service (IMS) and/or a camera.

A mobile terminal 100 according to the present invention may run a plurality of applications simultaneously. This is referred to in the following description as multitasking. For example, when multitasking of first and second applications is performed, both first and second execution pictures of the first and second applications are displayed. Alternatively, the second application can be performed in a background while the execution picture of the first application is displayed.

In the following description, a method of controlling application execution in a mobile terminal 100 according to the present invention is explained in detail with reference to the accompanying drawings. FIG. 4 is a flowchart for a method of controlling application execution in a mobile terminal 100 according to the present invention.

Referring to FIG. 4, the mobile terminal 100 executes a first application and a second application under the control of the controller 180 [S410]. As an example, a multitasking operation is performed with the first and second applications.

For example, the first application is executed in a foreground and the second application is executed in a background. Alternatively, both of the first and second applications can be executed in the foreground or in the background.

Each of the first and second applications may include more than one application. In particular, the application executed in the foreground may include more than one application and the application executed in the background may include more than one application.

The first application can include an information sharing application capable of sharing information with other terminals. For example, the information sharing application can include one of a message, a video call, a microblog (such as Twitter®), an IMS (instant messaging service) or an email.

As an example, the first application can be executed in the foreground and the second application can be executed in the background. The mobile terminal 100 displays an execution picture (hereinafter called a 'first execution picture') of the first application executed in the foreground and an execution notification indicator (hereinafter called a 'second execution notification indicator') of the second application executed in the background on the touchscreen 151 under the control of the controller 180 [S420].

The execution notification indicator can refer to the indicator that indicates that the corresponding application is executed as the background. For example, the execution notification indicator can be displayed as one of an icon, a text, an image, a video or animation.

When a plurality of applications is executed as the background, the execution notification indicator corresponding to each of a plurality of applications executed as the background can be displayed. In the following description, an application control process (hereinafter called a 'first control process') according to a touch and drag action from the second execution notification indicator to the first execution picture and an application control process (hereinafter called a 'second control process') according to a touch and drag action from the first execution picture to the second execution notification indicator are described separately.

The mobile terminal 100 receives an input of a touch and drag action from the second execution notification indicator to the first execution picture via the touchscreen 151 [S431]. A user inputs a touch and drag action from a random point of the second execution notification indicator to a random point of the first execution picture. The user then inputs a touch and drag action from a random point of the second execution notification indicator to a random point of a specific information input region in the first execution picture. Alternatively, a simultaneous or sequential touch of the second execution notification indicator and the first execution picture can be input as well as the touch and drag action.

If the display unit 151 and the touchpad 135 are provided in a same plane instead of in the layered structure (or if the touchpad is provided separate from the touchscreen), the mobile terminal 100 displays an indicator (e.g., a cursor) moving from the second execution notification indicator to the first execution picture to correspond to the user's touch and drag action performed on the touchpad 135. Moreover, the mobile terminal 100 displays an indicator (e.g., a cursor) moving from the second execution notification indicator to the first execution picture to correspond to a direction key manipulation of one of various types. The mobile terminal 100 generates an input signal equal to the former input signal attributed to the touch and drag action in the inputting step [S431] according to the above-mentioned display of the moving indicator.

The mobile terminal 100 displays information (hereinafter called 'second information') provided by the second application during the touch and drag action of the inputting step [S431] under the control of the controller 180 [S433]. More particularly, the mobile terminal 100 displays the second information movably with reference to a point of the touchscreen 151 touched during the touch and drag action. A displayed position of the second information changes as the point touched changes during the touch and drag action.

The display of the second information [S433] provides a user with additional target information for the first application before the addition of the second information to the first application. Therefore, the display of the second information is discriminated from a second information display after completion of the addition of the second information to the first application.

When displaying the second information [S433], if particular information in the second information that is to be added to the first application is specified, the specified information is displayed under the control of the controller 180. If the particular information in the second information that is to be added to the first application is not specified, the mobile terminal 100 displays information of the second information that may be added to the first application.

When displaying the second information [S433], if a touch and drag action to a specific information input region in the first execution picture is input, the mobile terminal 100 displays information in the second information corresponding to the specific information input region under the control of the controller 180.

The mobile terminal 100 adds the second information to first information provided by the first application in response to the touch and drag action in the inputting step [S431] under the control of the controller 180 [S435]. The second information corresponds to an execution state of the first application. In the adding step [S435], if information in the second information that is to be added to the first application is specified, the mobile terminal 100 adds the specified information that is displayed in the displaying step [S433] to the first information.

In this way, the mobile terminal 100 performs the adding step [S435] if an addition command action for the specified information is received via the user input unit 130. For example, the addition command action can include a termination of a touch and drag action, another touch and drag action after termination of the touch and drag action, or activation of a key displayed on the touchscreen 151, such as an 'OK' key, after termination of the touch and drag action.

In the adding step [S435], if information in the second information that is to be added to the first application is not specified, a specific portion of the second information is selected from the displayed second information that may be added to the first application. The selected specific portion of the second information can be added to the first information.

In the adding step [S435], if a touch and drag action to a specific information input region in the first execution picture is input, information corresponding to the specific information input region in the second information can be added to the first information. The mobile terminal 100 displays a first execution picture including the second information added to the first information in the adding step [S435] via the touchscreen 151 under the control of the controller 180.

Subsequently, the mobile terminal 100 determines whether the first application is an information sharing application under the control of the controller 180 [S437]. If the first application is determined to be an information sharing application, the mobile terminal 100 transmits the second information added to the first information in the adding step [S435] to another terminal via the wireless communication unit 110 under the control of the controller 180 [S439].

Figure 5A:
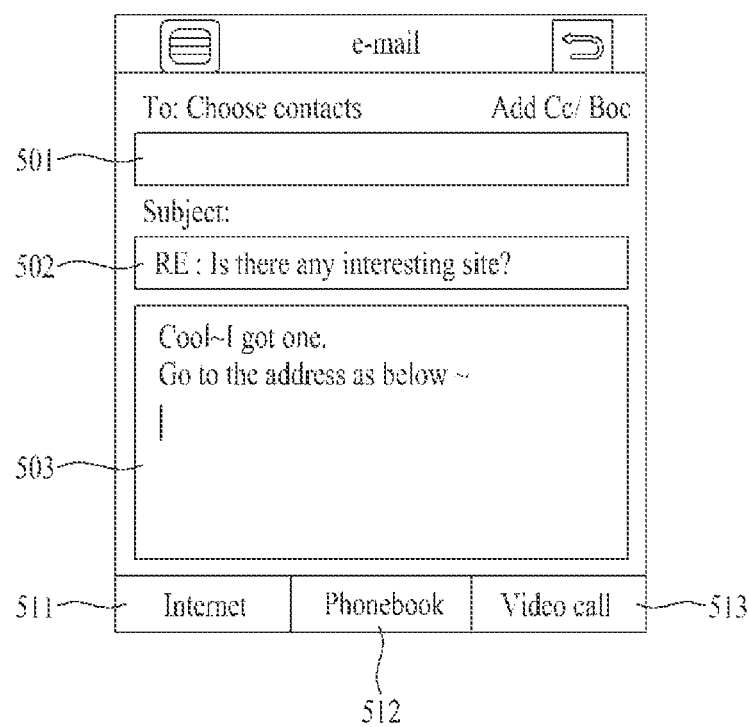

In the following description, an information adding process according to the touch and drag action to the first execution picture from the second execution notification indicator is explained in detail with reference to the accompanying drawings. FIGS. 5A to 5C are diagrams of screen configurations for a process for adding Internet relevant information to an email according to a touch and drag action from an Internet execution notification indicator to an email execution picture. In FIGS. 5A to 5C, an example of the first application is an email and an example of the second application is the Internet.

The mobile terminal 100 displays execution notification indicators of an Internet 511, a phonebook 512 and a video call 513, which are the applications executed as backgrounds, on prescribed regions of a screen, as illustrated in FIG. 5A. The mobile terminal 100 also displays an email writing picture, which includes an address region 501, a title region 502 and a content region 503, as an email execution picture, as illustrated in FIG. 5A.

When a touch and drag action is received from the Internet execution notification indicator 511 to the email writing picture, and more particularly to the content region 503, the mobile terminal 100 moves and displays address information 521 of a currently accessed Internet site with reference to a point touched on the touchscreen 151 during the touch and drag action, as illustrated in FIG. 5B(a). In this way, an Internet site name, an Internet site representative picture and/or a currently open webpage can be moved and displayed as well as the address information of the currently accessed Internet site.

If the touch and drag action is terminated, which is one of the addition command actions, the mobile terminal 100 adds the address information 521 of the currently accessed Internet site as a content of the email, as illustrated in FIG. 5B(b). The position of the address information 521 can be the termination point of the touch and drag action. The address information 521 added as the content of the email creates an Internet link.

Alternatively, when an input of a touch and drag action is received from the Internet execution notification indicator 511 to the email writing picture, and more particularly to the content region 503, the mobile terminal 100 moves and displays an Internet site list 522 with reference to a point touched on the touchscreen 151 during the touch and drag action, as illustrated in FIG. 5C(a). For example, the Internet site list 522 can include one of a list of one or more currently accessed Internet sites, a list of Internet sites accessed for a predetermined period of time and a list of Internet sites accessed according to a count of times visited. The Internet site list 522 can include address information, a name, a representative webpage and/or a last accessed webpage.

If a specific Internet site 522-1 is selected from the Internet site list 522, as illustrated in FIG. 5C(b), the mobile terminal 100 adds address information of the selected specific Internet site 522-1 as content of the email, as in FIG. 5B(b).

FIGS. 6A to 6D are diagrams of screen configurations for a process for adding phonebook information to an email according to a touch and drag action from a phonebook execution notification indicator to an email execution picture. In FIGS. 6A to 6D, an example of the first application is an email and an example of the second application is a phonebook.

Figure 6A:
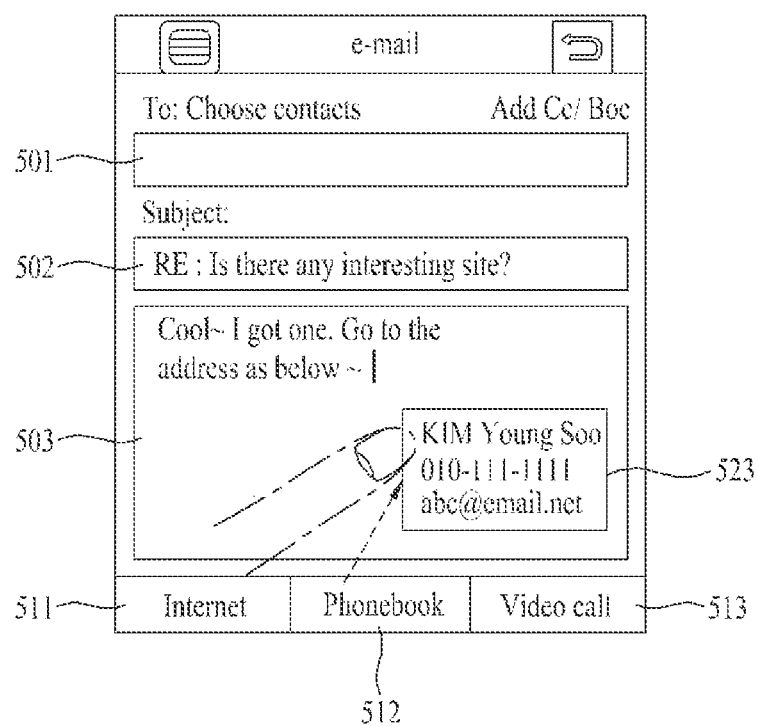

When an input of a touch and drag action is received from a phonebook execution notification indicator 512 to an email writing picture, the mobile terminal 100 moves and displays pre-designated correspondent party information 523 with reference to a point touched on the touchscreen 151 during the touch and drag action, as illustrated in FIG. 6A. The correspondent party information can include photo information, name information and/or email address information, which are registered at a phonebook.

If a termination point of the touch and drag action shown in FIG. 6A is an address region 501, the mobile terminal 100 adds the email address information in the correspondent party information 523 to a receiving side address of a currently written email and displays the added email address information on the address region 501, as illustrated in FIG. 6B(a). If a termination point of the touch and drag action shown in FIG. 6A is a content region 503, the mobile terminal 100 adds the correspondent party information 523 to content of a currently written email and displays the added correspondent party information on the content region 503, as illustrated in FIG. 6B(b).

Figure 6C:
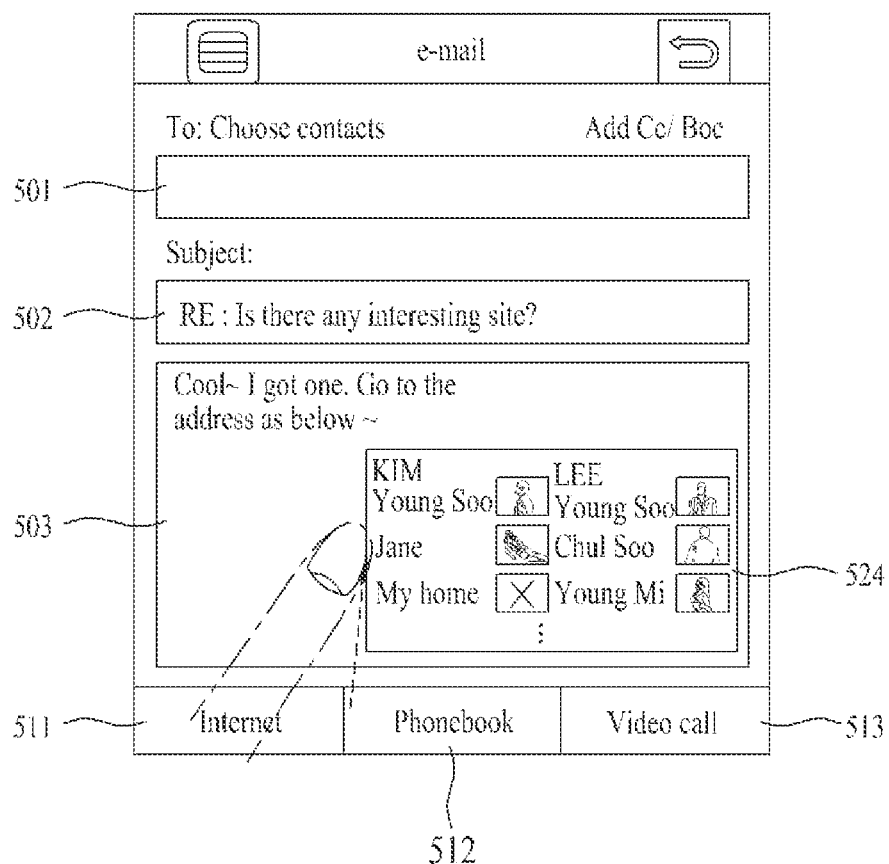

When an input of a touch and drag action is received from a phonebook execution notification indicator 512 to an email writing picture, the mobile terminal 100 moves and displays a correspondent party information list 524 with reference to a point touched on the touchscreen 151 during the touch and drag action, as illustrated in FIG. 6C. The correspondent party information list can include photo information, name information and/or email address information, which are registered in a phonebook.

If a termination point of the touch and drag action shown in FIG. 6C is an address region 501, the mobile terminal 100 displays a correspondent party information list 525, as illustrated in FIG. 6D(a), constructed with the email address information in the correspondent party information, adds specific correspondent party email address information 525-1 selected from the correspondent party information list 525 to a receiving side address of the currently written email, and displays the added receiving side email address in the address region 501, as illustrated in FIG. 6D(b).

FIGS. 7A and 7B are diagrams of screen configurations for a process for adding voice recording data to an email according to a touch and drag action from a voice recording execution notification indicator to an email execution picture. In FIGS. 7A and 7B, an example of the first application is an email and an example of the second application is a voice recording.

The mobile terminal 100 displays execution notification indicators of a voice recording 711, a phonebook 712 and a video call 713, which are applications executed as backgrounds, on prescribed regions of a screen, as illustrated in FIG. 7A(a). The mobile terminal 100 also displays an email writing picture, which includes an address region 701, a title region 702 and a content region 703, as an email execution picture, as illustrated in FIG. 7A(a).

When an input of a touch and drag action is received from the voice recording execution notification indicator 711 to the email writing picture, and more particularly to the content region 703, the mobile terminal 100 moves and displays a voice recording icon 721 with reference to a point touched on the touchscreen 151 during the touch and drag action, as illustrated in FIG. 7A(b). If the touch and drag action is terminated, the mobile terminal 100 displays a voice recoding execution picture 722 as a popup and records a voice input by a user through a microphone, as illustrated in FIG. 7B(a). Subsequently, the mobile terminal 100 creates a voice file corresponding to the user voice recorded in FIG. 7B(a) and attaches the created voice file as an attachment file of the currently written email, as illustrated in FIG. 7B (b).

Figure 8A:
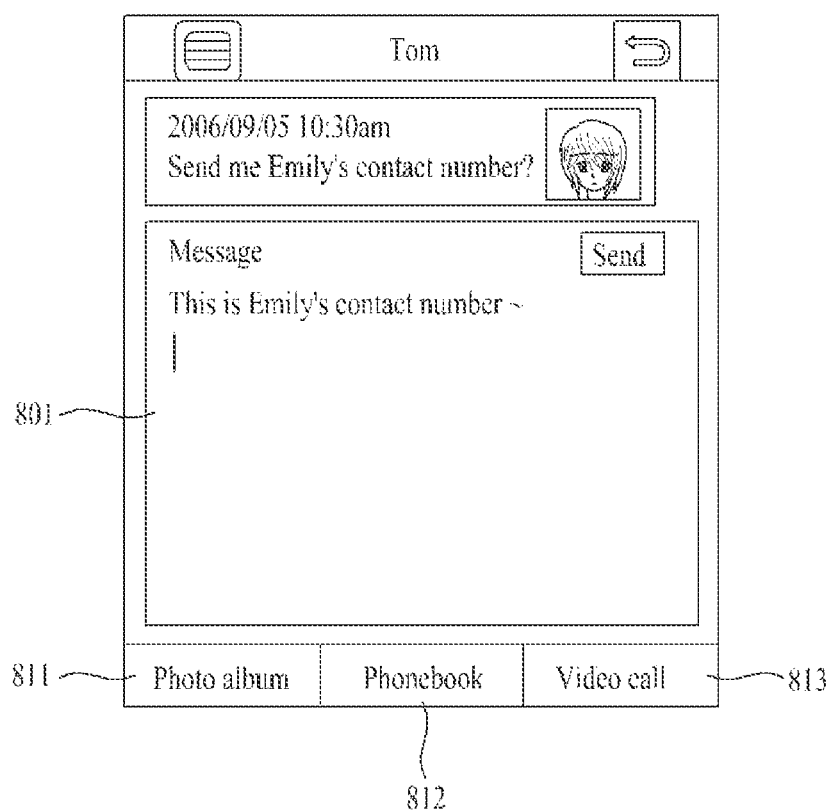

FIGS. 8A to 8C are diagrams of screen configurations for a process for adding phonebook relevant information to a message chat according to a touch and drag action from a phonebook execution notification indicator to a message chat execution picture. In FIGS. 8A to 8C, an example of the first application is a message chat and an example of the second application is a phonebook.

The mobile terminal 100 displays execution notification indicators of a photo album 811, a phonebook 812 and a video call 813, which are the applications currently executed as backgrounds, on prescribed regions of a screen, as illustrated in FIG. 8A. The mobile terminal 100 also displays a message chat picture, which includes an incoming message region and an outgoing message region 801, as a message chat execution picture, as illustrated in FIG. 8A.

When an input of a touch and drag action is received from the phonebook execution notification indicator 812 to the outgoing message region 801, the mobile terminal 100 moves and displays pre-designated correspondent party information 821 with reference to a point touched on the touchscreen 151 during the touch and drag action, as illustrated in FIG. 8B(a). The correspondent party information can include photo information, name information and/or email address information, which are registered in a phonebook. If the touch and drag action shown in FIG. 8B(a) is terminated, the mobile terminal 100 adds the correspondent party information 821 to content of a currently written email and displays the added correspondent party information at the outgoing message region 801, as illustrated in FIG. 8B(b).

When an input of a touch and drag action is received from the phonebook execution notification indicator 812 to the outgoing message region 801, the mobile terminal 100 moves and displays a correspondent party information list 822 with reference to a point touched on the touchscreen during the touch and drag action, as illustrated in FIG. 8C(a). The correspondent party information list can include photo information, name information and/or email address information, which are registered in the phonebook. If the touch and drag action shown in FIG. 8C(a) is terminated, the mobile terminal 100 enables specific correspondent party information 822-1 to be selected from the correspondent party information list 822, as illustrated in FIG. 8C(b), adds the selected specific correspondent party information to a content of the currently written email, and displays the added information on the outgoing message region 801, as in FIG. 8B(b).

Figure 9A:
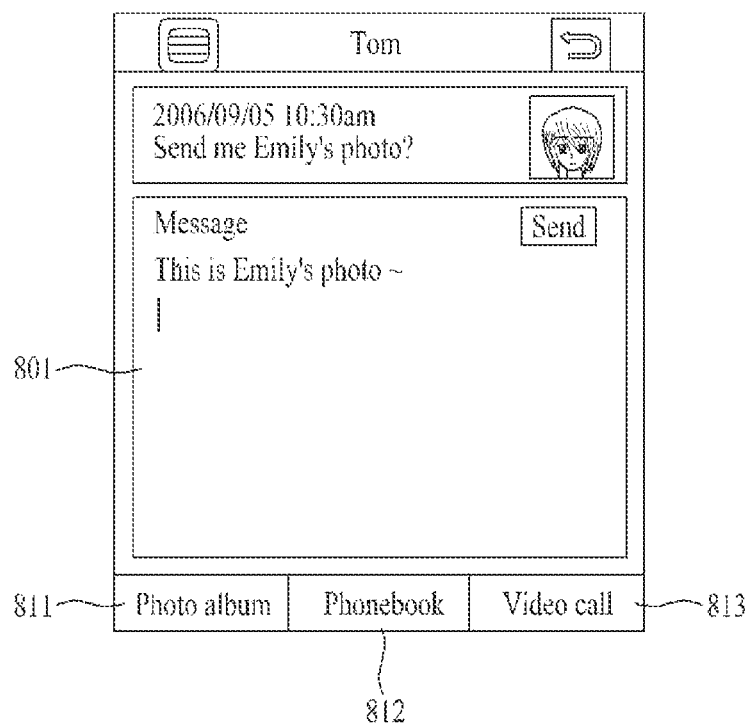

FIGS. 9A to 9C are diagrams of screen configurations for a process for adding photo information to a message chat according to a touch and drag action from a photo album execution notification indicator to a message chat execution picture. In FIGS. 9A to 9C, an example of the first application is a message chat and an example of the second application is a photo album.

The mobile terminal 100 displays execution notification indicators 811, 812 and 813, which are the applications currently executed as backgrounds, on prescribed regions of a screen. The mobile terminal 100 also displays a message chat picture, which includes an outgoing message region 801, as a message chat execution picture, as illustrated in FIG. 9A.

If an input of a touch and drag action is received from the photo album execution notification indicator 811 to the outgoing message region 801, the mobile terminal 100 moves and displays a pre-designated photo 823 with reference to a point touched on the touchscreen during the touch and drag action, as illustrated in FIG. 9B(a). If the touch and drag action shown in FIG. 9B(a) is terminated, the mobile terminal 100 adds the moved and displayed photo 823 to a content of a currently written message and displays file information 824 of the added photo at the outgoing message region 801, as illustrated in FIG. 9B(b).

When an input of a touch and drag action is received from the photo album execution notification indicator 811 to the outgoing message region 801, the mobile terminal 100 moves and displays a photo list 825 with reference to a point touched on the touchscreen 151 during the touch and drag action, as illustrated in FIG. 9C(a). If the touch and drag action shown in FIG. 9C(a) is terminated, the mobile terminal 100 enables a specific photo 825-1 to be selected from the photo list 825, as illustrated in FIG. 9C(b), and adds the selected photo to content of the currently written message, as in FIG. 9B(b).

FIGS. 10A to 10D are diagrams of screen configurations for a process for adding schedule information to a message according to a touch and drag action from a schedule management execution notification indicator to a message writing execution picture. In FIGS. 10A to 10D, an example of the first application is message writing and an example of the second application is schedule management.

The mobile terminal 100 displays execution notification indicators 1011, 1012 and 1013, which are the applications currently executed as backgrounds, on prescribed regions of a screen. The mobile terminal 100 also displays a message writing picture, which includes a content region 1001, a recipient information input region 1002 and an attachment file region 1003, for example of a message writing execution picture, as illustrated in FIG. 10A.

If an input of a touch and drag action is received from the schedule management execution indicator 1012 to the content region 1011, the mobile terminal 100 moves and displays pre-designated schedule information 1021 with reference to a point touched on the touchscreen 151 during the touch and drag action, as illustrated in FIGS. 10A(a) and 10A(b). The pre-designated schedule information is directly designated by a user or can include schedule information of a specific day (e.g., today or a commemoration day). The schedule information can also include day and time, place, participant and/or schedule content.

Figure 10B:
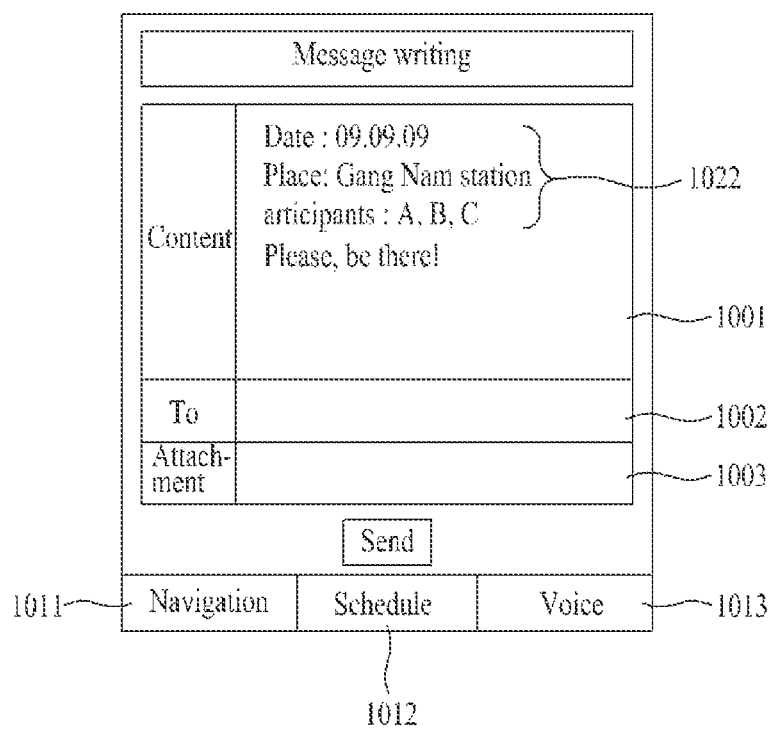

If the touch and drag action shown in FIG. 10A is terminated, the mobile terminal 100 adds the moved and displayed schedule information 1021 to content 1022 of a currently written message and displays it on the message content region 1001, as illustrated in FIG. 10B. If a termination point of the touch and drag action is the attachment file region 1003, the moved and displayed schedule information 1021 can be added as an attachment file of the currently written message.

When an input of a touch and drag action is received from the schedule management execution notification indicator 1012 to the content region 1001, the mobile terminal 100 moves and displays a schedule list 1023 with reference to a point touched on the touchscreen 151 during the touch and drag action, as illustrated in FIGS. 10C(a) and 10C(b). The schedule list can include at least one schedule information for a predetermined period of time. The schedule list can include schedule information in which a recipient of the currently written message is designated as a participant.

Figure 10D:
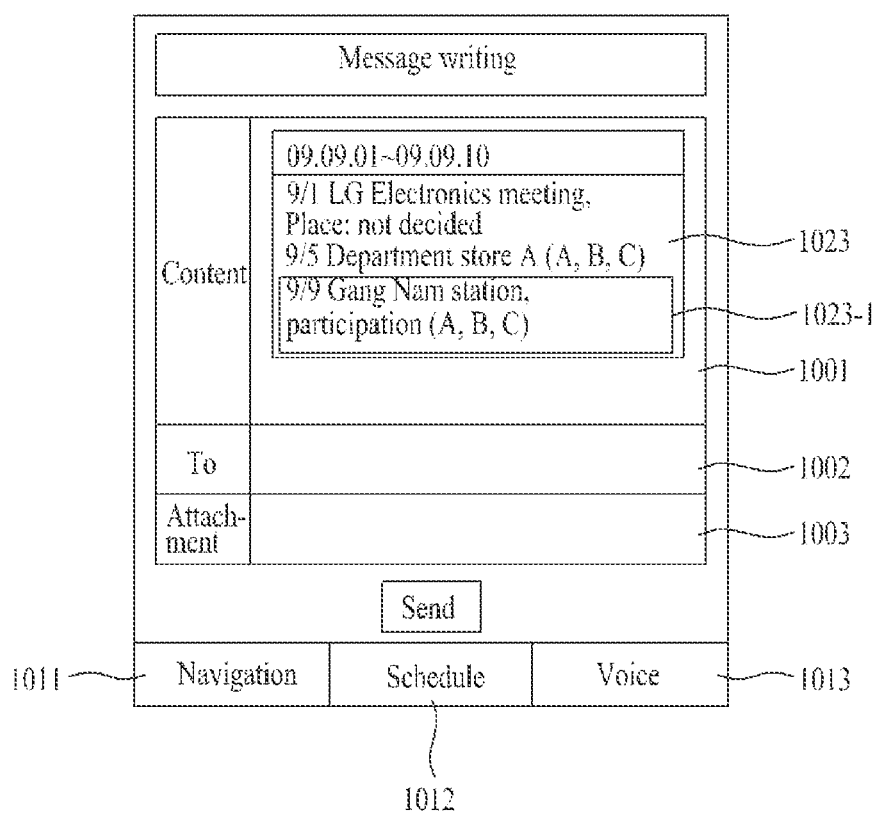

If the touch and drag action shown in FIG. 10C is terminated, the mobile terminal 100 enables specific schedule information 1023-1 to be selected from the schedule list 1023, as illustrated in FIG. 10D. When the specific schedule information 1023-1 is selected, the mobile terminal 100 adds the selected schedule information 1023-1 to content of the currently written message, as in FIG. 10B.

FIGS. 11A to 11D are diagrams of screen configurations for a process for adding position information to a message according to a touch and drag action from a navigation execution notification indicator to a message writing execution picture. In FIGS. 11A to 11D, an example of the first application is a message and an example of the second application is navigation.

When an input of a touch and drag action is received from a navigation execution notification indicator 1011 to a content region 1001 in a message writing picture, the mobile terminal 100 moves and displays specific location information 1121 with reference to a point touched on the touchscreen 151 during the touch and drag action, as illustrated in FIGS. 11A(a) and 11A(b). The specific location information can include a current location of the mobile terminal 100, a destination location and/or route information. For example, the specific location information can be represented as a map image and/or a text.

Figure 11B:
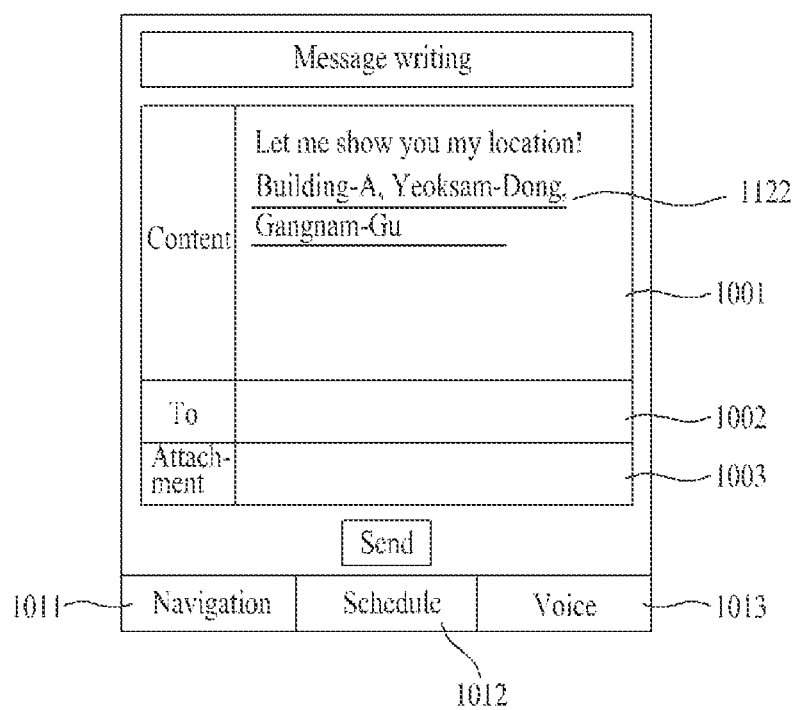

If the touch and drag action is terminated, the mobile terminal 100 adds the moved and displayed specific location information 1121 to content 1122 of the currently written message and displays it on the message content region 1001, as illustrated in FIG. 11B. If a termination point of the touch and drag action from the navigation execution notification indicator 1011 is an attachment file region 1003, as illustrated in FIG. 11C(a), the mobile terminal 100 adds the moved and displayed specific location information 1123 as an attachment file 1124 of the currently written message, as illustrated in FIG. 11C(b).

If a termination point of the touch and drag action from the navigation execution notification indicator 1011 is the attachment file region 1003, the mobile terminal 100 moves and displays a map list (e.g., an image type 1125 shown in FIG. 11D(a) or a text type 1126 shown in FIG. 11D(b)), which includes at least one location information. If the touch and drag action is terminated, a specific location information 1126-1 can be selected from the map list 1126, as illustrated in FIG. 11D(b).

The selected specific location information can be added to the content of the currently written message, as in FIG. 11C(b). For example, current location information of the mobile terminal 100, destination location information, route information and/or user-selected location information can be included in the map list.

Figure 12B:
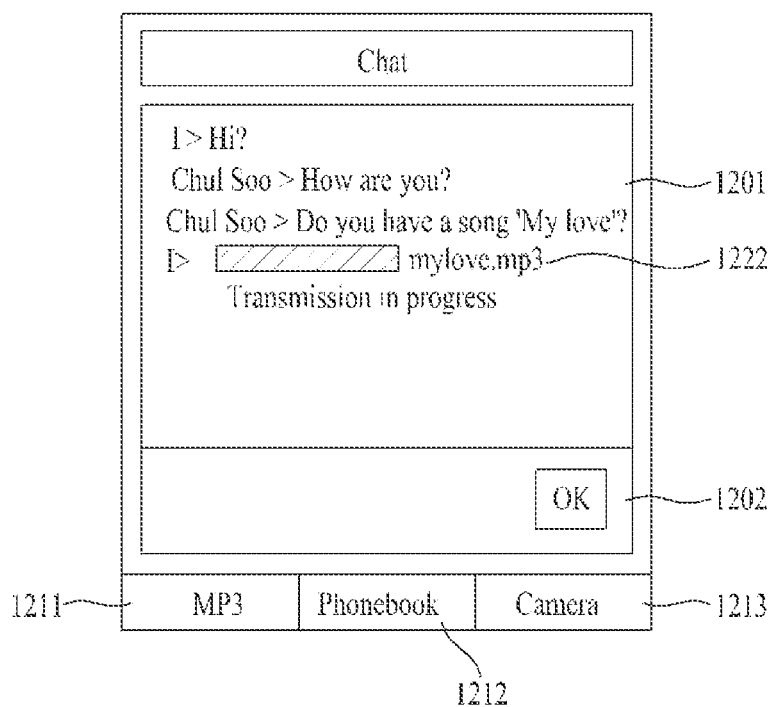

FIGS. 12A to 12C are diagrams of screen configurations for displaying a process for adding MP3 file information to an IMS chat according to a touch and drag action from an MP3 execution notification indicator to an IMS chat execution picture. In FIGS. 12A to 12C, an example of the first application is an IMS and an example of the second application is an MP3.

The mobile terminal 100 displays execution notification indicators 1211, 1212 and 1213, which are the applications currently executed as backgrounds, on prescribed regions of a screen. The mobile terminal 100 also displays an IMS chat window, which includes a chat display region 1201 and a chat input region 1202 of an IMS chat execution picture, as illustrated in FIG. 12A(a).

If an input of a touch and drag action is received from the MP3 execution notification indicator 1211 to the chat input region 1202, the mobile terminal 100 moves and displays specific audio file information with reference to a point touched on the touchscreen 151 during the touch and drag action. For example, the specific audio file information can include a name of a specific audio file, downloadable URL information, album information, singer/composer/lyricist information and/or lyrics information. The specific audio file can include a currently played audio file, an audio file having a high playback frequency, a recently played audio file or an audio file designated by a user.

If the touch and drag action shown in FIG. 12A(a) is terminated, the mobile terminal 100 adds the moved and displayed specific audio file information to the chat content and displays it on the chat input region 1202, as illustrated in FIG. 12A(b). If a send ('OK') key is selected in the state shown in FIG. 12A(b), the mobile terminal 100 transmits the specific audio file corresponding to the specific audio file information to a chat correspondent party and displays a transmission notification text 1222 of the specific audio file on the chat display region 1201, as illustrated in FIG. 12B.

When an input of a touch and drag action is received from the MP3 execution notification indicator 1211 to the chat input region 1202, the mobile terminal 100 displays an audio file list 1223 with reference to a point touched on the touchscreen 151 during the touch and drag action, as illustrated in FIG. 12C(a). If a specific audio file 1223-1 is selected from the displayed audio file list 1223, as illustrated in FIG. 12C(b), the mobile terminal 100 adds information of the selected specific audio file 1223-1 to the chat content and displays it on the chat input region 1202, as illustrated in FIG. 12A(b).

Figure 13B:
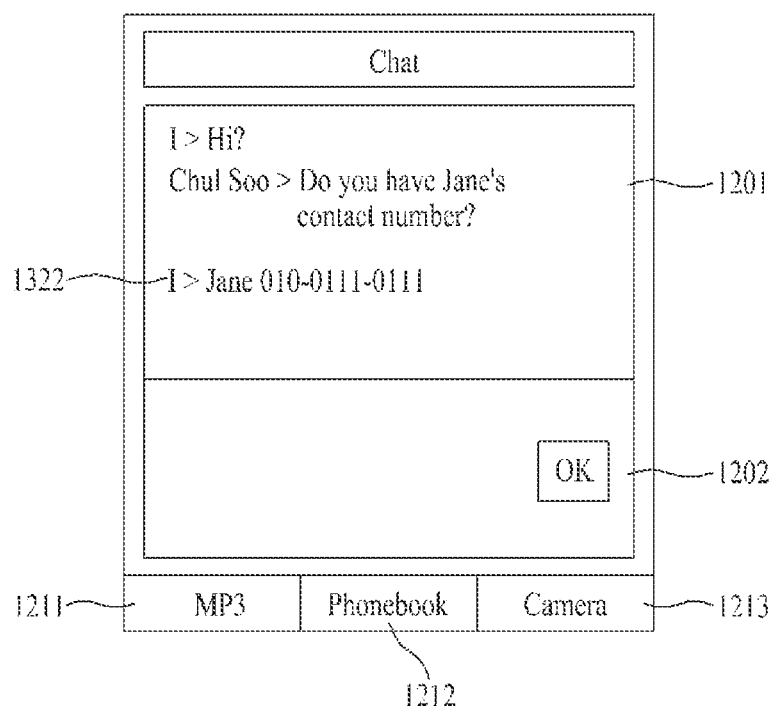

FIGS. 13A to 13C are diagrams of screen configurations for a process for adding phonebook relevant information to an IMS chat according to a touch and drag action from a phonebook execution notification indicator to an IMS chat execution picture. In FIGS. 13A to 13C, an example of the first application is an IMS and an example of the second application is a phonebook.

When an input of a touch and drag action is received from a phonebook execution notification indicator 1212 to a chat region 1202, the mobile terminal 100 moves and displays specific correspondent party information 1321 with reference to a point touched on the touchscreen 151 during the touch and drag action, as illustrated in FIG. 13A(a). The specific correspondent party information can include a phone number, an email address, birthday information and/or photo information of a specific correspondent party registered at a phonebook.

If the touch and drag action shown in FIG. 13A(a) is terminated, the mobile terminal 100 adds the specific correspondent party information 1321 to the chat content and displays it on the chat input region 1202, as illustrated in FIG. 13A(b). If a send ('OK') key is selected in the state shown in FIG. 13A(b), the mobile terminal 100 transmits the specific correspondent party information to a chat correspondent party and displays a transmission notification text 1322 of the specific correspondent party information on the chat display region 1201, as illustrated in FIG. 13B.

When an input of a touch and drag action is received from the MP3 execution notification indicator 1211 to the chat input region 1202, the mobile terminal 100 displays a correspondent party information list 1323 with reference to a point touched on the touchscreen 151 during the touch and drag action, as illustrated in FIG. 13C(a). If specific correspondent party information 1323-1 is selected from the displayed correspondent party information list 1323, as illustrated in FIG. 13C(b), the mobile terminal 100 adds the selected specific correspondent party information 1323-1 to the chat content and displays it on the chat input region 1202, as in FIG. 13A(b).

FIGS. 14A and 14B are diagrams of screen configurations for a process for adding photographed image information to an IMS chat according to a touch and drag action from a camera execution notification indicator to an IMS chat execution picture. In FIGS. 14A and 14B, an example of the first application is an IMS and an example of the second application is a camera.

When an input of a touch and drag action is received from a camera execution notification indicator 1213 to a chat region 1202, the mobile terminal 100 moves and displays a camera icon 1421 with reference to a point touched on the touchscreen 151 during the touch and drag action, as illustrated in FIG. 14A(a). If the touch and drag action shown in FIG. 14A(a) is terminated, the mobile terminal 100 sets a photographing standby mode by activating a camera photographing mode, as illustrated in FIG. 14A(b). The mobile terminal 100 can photograph a specific subject using the camera in the mode.

The mobile terminal 100 creates an image file using a picture (e.g., a still picture or a moving picture) photographed in FIG. 14A(b) and displays file information of the created image file on the chat input region 1202, as illustrated in FIG. 14B(a). If a send ('OK') key is selected in the state shown in FIG. 14B(a), the mobile terminal 100 transmits the image file corresponding to the file information displayed in the chat input region 1202 to a chat correspondent party and displays a transmission notification text 1423 on the chat display region 1201, as illustrated in FIG. 14B(b). The embodiment described with reference to FIG. 14A and FIG. 14B is possible even if the camera is not executed as the background.

Figure 15B:
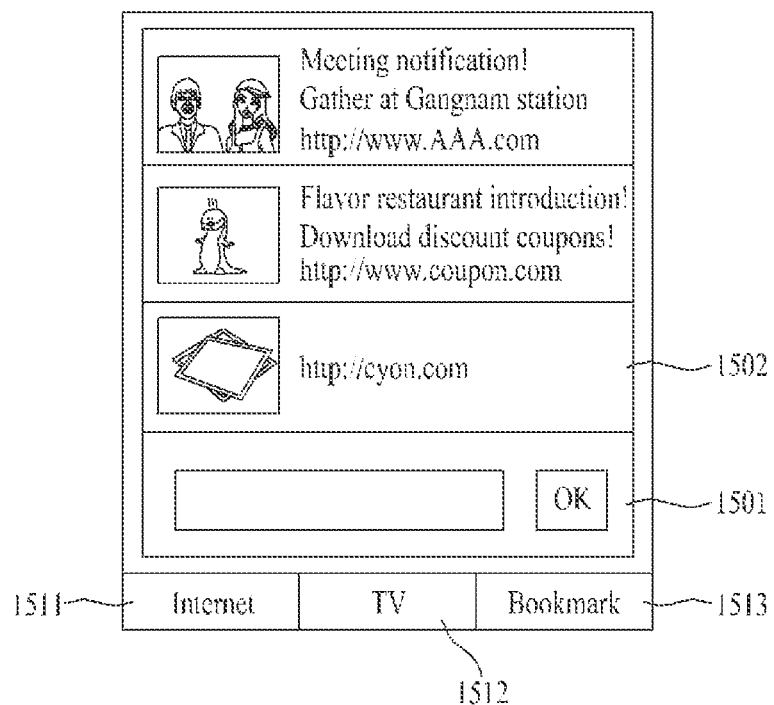

FIG. 15A and FIG. 15B are diagrams of screen configurations for a process for adding Internet relevant information to a microblog message, such as a Twitter® message, according to a touch and drag action from an Internet execution notification indicator to a Twitter® execution picture. In FIG. 15A and FIG. 15B, an example of the first application is a Twitter® and an example of the second application is Internet.

When displaying a Twitter® execution picture including an information sharing region and an information input region 1501, the mobile terminal 100 displays execution notification indicators 1511, 1512 and 1513 of applications that are being executed as backgrounds on prescribed regions of a screen, as illustrated in FIG. 15A(a). If an input of a touch and drag action is received from the Internet execution notification indicator 1511 to the information input region 1501, the mobile terminal 100 moves and displays specific Internet site information (e.g., address information) with reference to a point touched on the touchscreen 151 during the touch and drag action.

If the touch and drag action shown in FIG. 15A(a) is terminated, the mobile terminal 100 adds the moved and displayed specific Internet site information to input information and displays it on the information input region 1501, as illustrated in FIG. 15A(b). If a send ('OK') key is selected in FIG. 15A(b), the mobile terminal 100 transmits the specific Internet site information displayed on the information input region 1501 to a Twitter® managing server and displays the specific Internet site information on the information sharing region 1502, as illustrated in FIG. 15B.

The specific Internet site information can be shared with other terminals using the Twitter® service. The mobile terminal 100 moves and displays an Internet site list and shares information of a specific Internet site selected from the Internet site list with other terminals using a Twitter® service (not shown in the drawings).

Figure 16B:
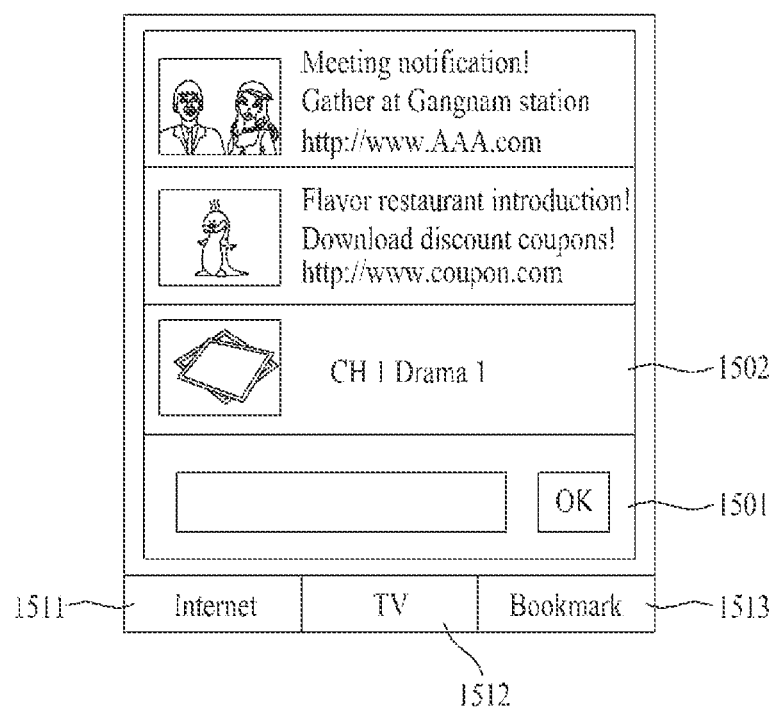

FIGS. 16A and 16B are diagrams of screen configurations for a process for adding TV relevant information to a microblog message, such as a Twitter® message, according to a touch and drag action from a TV execution notification indicator to a Twitter® execution picture. In FIG. 16A and FIG. 16B, an example of the first application is a Twitter® and an example of the second application is a TV.

When an input of a touch and drag action is received from a TV execution notification indicator 1512 to the information input region 1501, the mobile terminal 100 moves and displays specific broadcast information with reference to a point touched on the touchscreen 151 during the touch and drag action, as illustrated in FIG. 16A(a). The specific broadcast information can include a number or name of a specific broadcast channel or a number, name, character information, synopsis information and/or broadcast time information of a specific broadcast program. The broadcast channel or program corresponding to the specific broadcast information can be designated by a user in advance.

If the touch and drag action shown in FIG. 16A(a) is terminated, the mobile terminal 100 adds the moved and displayed specific broadcast information to input information and displays it on the information input region 1501, as illustrated in FIG. 16A(b). If a send ('OK') key is selected in FIG. 16A(b), the mobile terminal 100 transmits the specific broadcast information displayed on the information input region 1501 to a Twitter® managing server and displays the specific broadcast information on the information sharing region 1502, as illustrated in FIG. 16B.

Therefore, the specific broadcast information can be shared with other terminals using a Twitter® service. The mobile terminal 100 moves and displays a broadcast information list and shares information of specific broadcast information selected from the broadcast information list with other terminals using a Twitter® service (not shown in the drawings).

FIGS. 17A and 17B are diagrams of screen configurations for displaying a process for adding message relevant information/photo information to a phonebook according to a touch and drag action from a message/photo album execution notification indicator to a phonebook execution picture. When an input of a touch and drag action is received from a message execution notification indicator 1711 to a correspondent party information list picture (e.g., a phonebook execution picture), the mobile terminal 100 moves and displays recipient information 1721 of a currently written message with reference to a point touched on the touchscreen during the touch and drag action, as illustrated in FIG. 17A(a). If the touch and drag action shown in FIG. 17A(a) is terminated, the mobile terminal 100 automatically stores the moved and displayed recipient information 1721 in a phonebook or determines whether to store it according to a user selection, as illustrated in FIG. 17A(b).

When an input of a touch and drag action is received from a photo album execution notification indicator 1712 to specific correspondent party information 1701 in a correspondent party information list picture, the mobile terminal 100 moves and displays a photo list 1723 including at least one photo stored in a photo album with reference to a point touched on the touchscreen 151 during the touch and drag action, as illustrated in FIG. 17B(a). If the touch and drag action shown in FIG. 17B(a) is terminated, the mobile terminal 100 enables a specific photo 1723-1 to be selected from the photo list 1723 by a user and stores the selected specific photo 1723-1 as the specific correspondent party information 1701, as illustrated in FIG. 17B(b). If a specific photo is designated in advance, the pre-designated specific photo can be stored as the specific correspondent party information 1701 (not shown in the drawings).

Figure 18B:
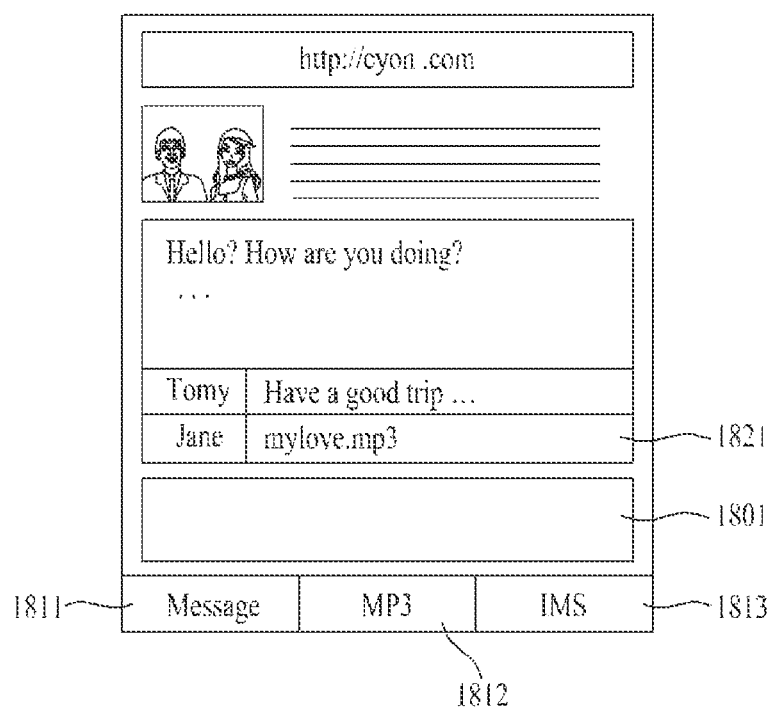

FIGS. 18A and 18B are diagrams of screen configurations for a process for adding MP3 file information to an Internet application according to a touch and drag action from an MP3 execution notification indicator to an Internet execution picture. The mobile terminal 100 accesses a specific Internet site and displays execution notification indicators 1811, 1812 and 1813 of applications, which are being executed as backgrounds. The mobile terminal 100 also displays a webpage (e.g., an Internet execution picture), as illustrated in FIG. 18A(a).

When an input of a touch and drag action is received from the MP3 execution notification indicator 1812 to a replay input region 1801 in the webpage, the mobile terminal 100 moves and displays file information of a currently played audio file to correspond to the touch and drag action, as illustrated in FIG. 18A(a). If the touch and drag action shown in FIG. 18A (a) is terminated, the mobile terminal 100 displays the file information of the currently played audio file on the reply input region 1801, as illustrated in FIG. 18A(b). If a send ('OK') key is selected in FIG. 18A(b), the mobile terminal 100 transmits the file information displayed on the reply input region 1801 or the audio file corresponding to the displayed filed information to an Internet server as a reply 1821, as illustrated in FIG. 18B.

Referring again to FIG. 4, a second control process is explained in detail. The mobile terminal 100 receives an input of a touch and drag action from the first execution picture to the second execution notification indicator via the touchscreen [S441]. The user can input the touch and drag action from a random point of the first execution picture or a random point of the specific information input region in the first execution picture to the second execution notification indicator. Alternatively, a simultaneous or sequential touch to the first execution picture and the second execution notification indicator can be input instead of the touch and drag action.

The mobile terminal 100 displays an indicator (e.g., a cursor) moving from the first execution picture to the second execution notification indicator in response to a touch and drag action on the touchpad 135 or manipulation of a direction key, instead of in response to the touch and drag action on the display unit 151 (or the touchscreen). In this way, the mobile terminal 100 generates an input signal that is equivalent to the input signal attributed to the touch and drag action [S441].

The mobile terminal 100 displays specific information included in the first execution picture during the touch and drag action under the control of the controller 180 [S443]. In particular, the mobile terminal 100 moves and displays the specific information with reference to a point touched during the touch and drag action.

The mobile terminal 100 displays the specific information corresponding to a touched point, such as a touched start point of the touch and drag action, in the first execution picture under the control of the controller 180. When displaying the specific information [S443], if a touch and drag action to the specific information input region in the first execution picture is input, the mobile terminal 100 displays the information displayed on the specific information input region under the control of the controller 180.

Subsequently, the mobile terminal 100 adds the displayed specific information included in the first execution picture to second information corresponding to the touch and drag action under the control of the controller 180 [S445]. The mobile terminal 100 performs the adding step [S445] if an 'addition' command action for the specific information via the user input unit 130 is received, as described previously.

In the adding step [S445], when an input of a touch and drag action is received from the specific information input region in the first execution picture, the mobile terminal 100 adds the displayed information displayed on the specific information input region to the second information. If the specific information is added to the second information in the adding step [S445], the mobile terminal 100 outputs notification information indicating that the specific information is added to the second information or displays an execution picture of the second application, which includes the specific information added to the second information, on the touchscreen 151 under the control of the controller 180.

The mobile terminal 100 determines whether the second application is an information sharing application under the control of the controller 180 [S447]. If the second application is determined to be an information sharing application, the mobile terminal 100 transmits the specific information added to the second information to another terminal via the wireless communication unit 110 under the control of the controller 180 [S449].

Figure 19A:
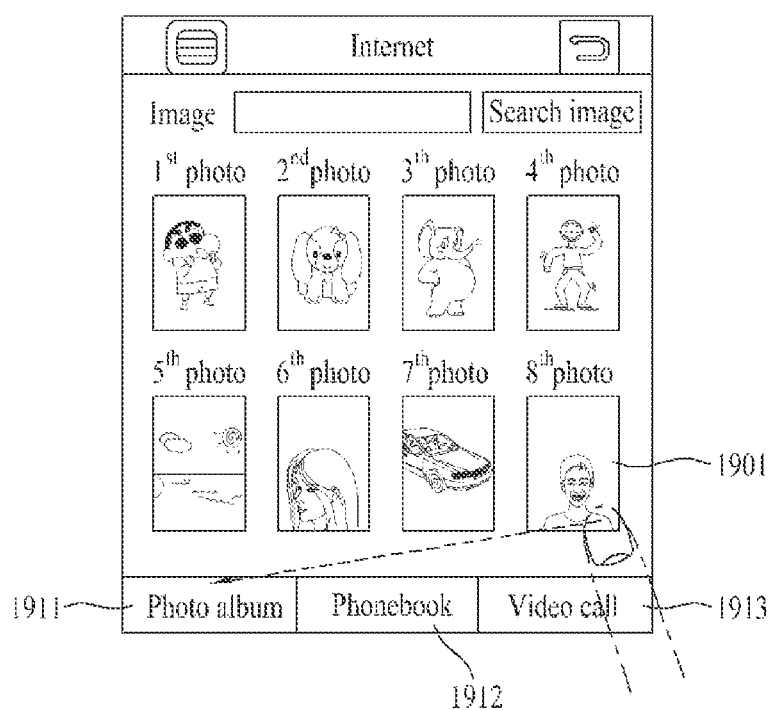

In the following description, an information adding process according to a touch and drag action from the first execution picture to the second execution notification indicator is explained in detail with reference to the accompanying drawings. FIGS. 19A and 19B are diagrams of screen configurations for a process for adding Internet relevant information to a photo album according to a touch and drag action from an Internet execution picture to a photo album execution notification indicator. In FIGS. 19A and 19B, an example of the first application is an Internet application and an example of the second application is a photo album.

The mobile terminal 100 receives a touch and drag action from a specific image 1901 included in an Internet site access picture to a photo album execution notification indicator 1911, as illustrated in FIG. 19A. The specific image 1901 can be moved and displayed to correspond to the touch and drag action. If the touch and drag action shown in FIG. 19A is terminated, the mobile terminal 100 automatically stores the specific image 1901 in a photo album, as illustrated in FIG. 19B(a), or displays a photo list stored in the photo album by executing the photo album in a foreground such that the specific image 1901 is discriminated on the photo list, as illustrated in FIG. 19B(b).

Figure 20A:
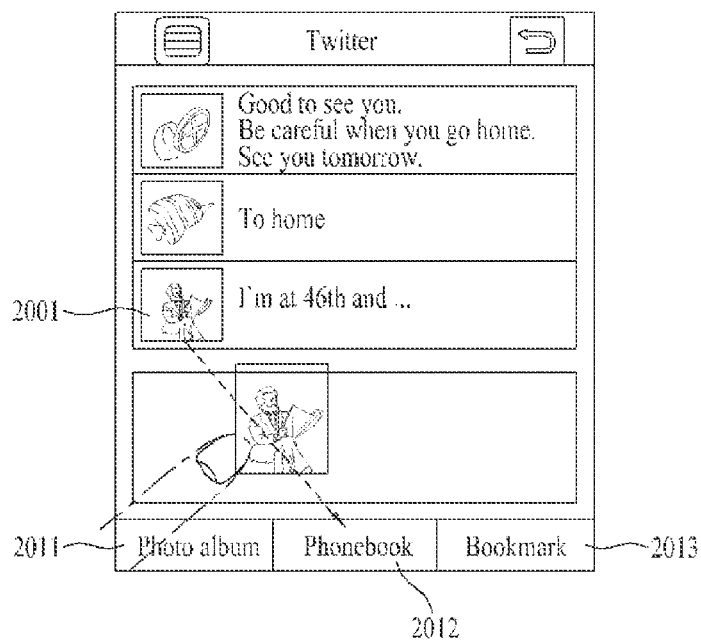
FIGS. 20A and 20B are diagrams of screen configurations for a process for adding microblog relevant information to a phonebook according to the present invention.
Figure 20B:
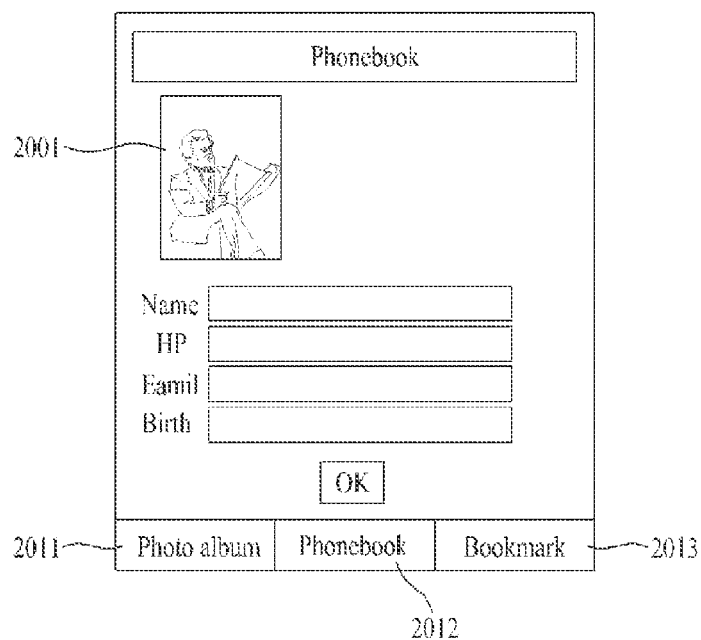

FIGS. 20A and 20B are diagrams of screen configurations for a process for adding Twitter® relevant information to a phonebook according to a touch and drag action from a Twitter® execution picture to a phonebook execution notification indicator. In FIGS. 20A and 20B, an example of the first application is a Twitter® application and an example of the second application is a phonebook.

The mobile terminal 100 receives a touch and drag action from image information 2001 of specific correspondent party information displayed on an information sharing region in a Twitter® execution picture to a phonebook execution notification indicator 2012, as illustrated in FIG. 20A. The image information 2001 can be moved and displayed to correspond to the touch and drag action.

If the touch and drag action shown in FIG. 20A is completed, the mobile terminal 100 executes a phonebook application in the foreground. The mobile terminal 100 displays a phonebook registration picture, in which the image information 2001 is set to an image for a registration in the phonebook, as illustrated in FIG. 20B, or updates image information of a pre-registered specific correspondent party using the image information 2001 (not shown in the drawing). When Internet address information or general text information of specific correspondent party information is touched and dragged to a bookmark execution notification indicator or a memo execution notification indicator, the Internet address information or the general text information can be additional information of a bookmark or a memo (not shown in the drawings).

Figure 21A:
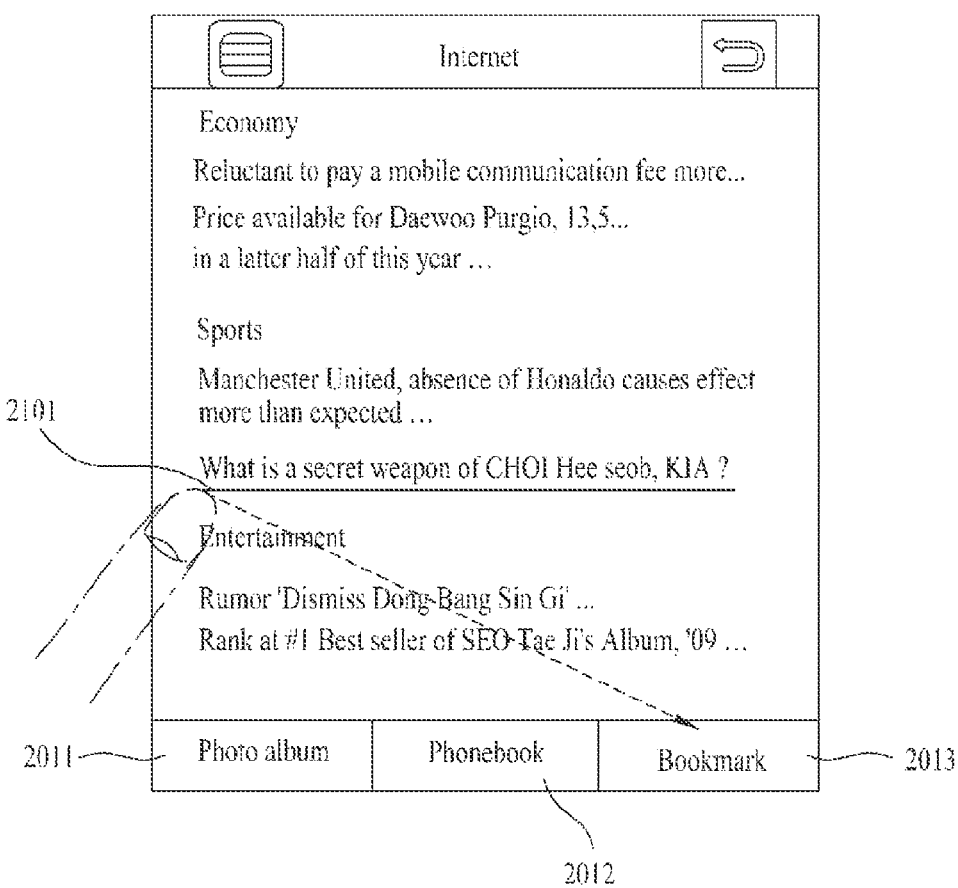

FIGS. 21A and 21B are diagrams of screen configurations for a process for adding Internet relevant information to a bookmark according to a touch and drag action from an Internet execution picture to a bookmark execution notification indicator. In FIGS. 21A and 21B, an example of the first application is an Internet application and an example of the second application is a bookmark.

The mobile terminal 100 receives a touch and drag action from specific link information 2101 included in an Internet site access picture to a bookmark execution notification indicator 2013, as illustrated in FIG. 21A. The specific link information 2101 can be moved and displayed to correspond to the touch and drag action. If the touch and drag action shown in FIG. 21A is terminated, the mobile terminal 100 automatically stores the specific link information 2101 in a bookmark, as illustrated in FIG. 21B(a), or displays a link information list stored in the bookmark by executing the bookmark as a foreground such that specific link information 2122 is discriminatively displayed, as illustrated in FIG. 21B(b).

Figure 22A:
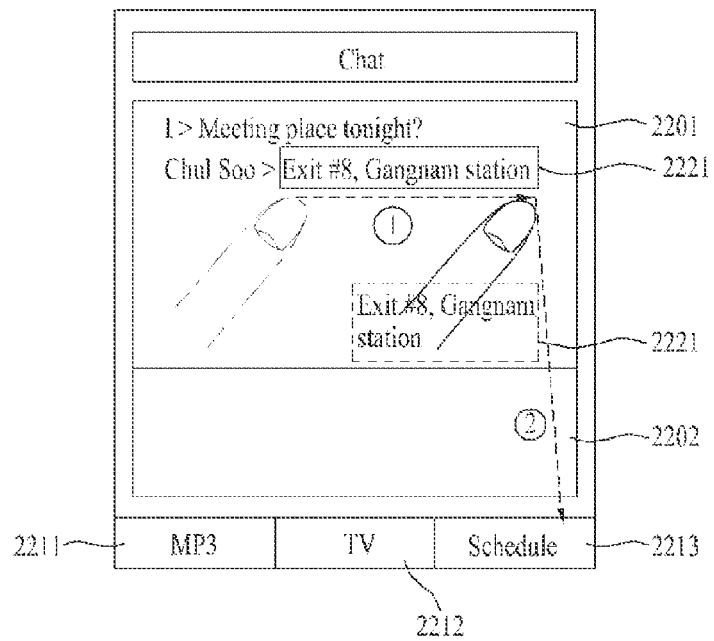
FIGS. 22A and 22B are diagrams of screen configurations for a process for adding IMS chat information to a schedule management page according to the present invention.
Figure 22B:
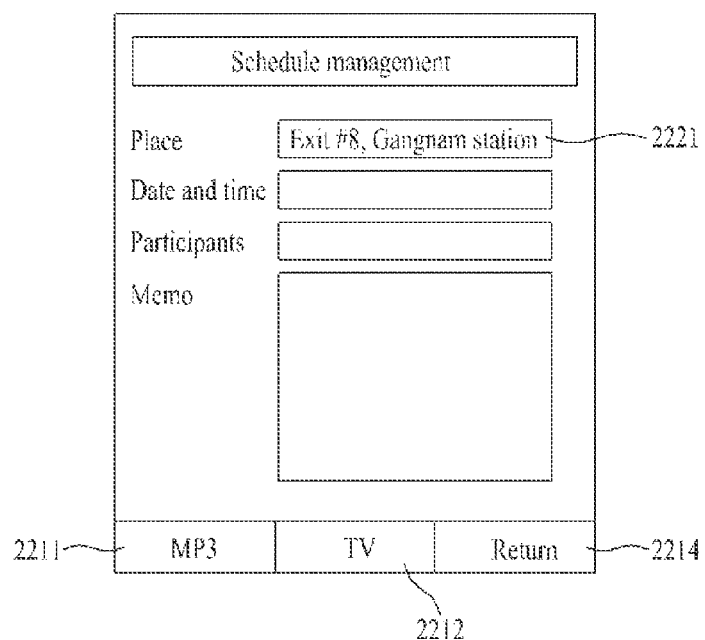

FIGS. 22A and 22B are diagrams of screen configurations for a process for adding IMS chat information to a schedule management according to a touch and drag action from an IMS chat execution picture to a schedule management execution notification indicator. In FIGS. 22A and 22B, an example of the first application is an IMS and an example of the second application is a schedule management.

The mobile terminal 100 designates a specific chat content of a chat display region 2201 in an IMS chat window using a touch and drag action (1) and receives a touch and drag action (2) from the designated specific chat content 2221 to a schedule execution notification indicator 2213, as illustrated in FIG. 22A. If the touch and drag action (2) is terminated, the mobile terminal 100 executes a schedule management application in a foreground and displays a schedule management setting picture in which the specific chat content is included as the schedule information, as illustrated in FIG. 22B.

According to the present invention, the mobile terminal 100 receives an application list providing command signal via the user input unit 130. The touchscreen displays an application list including at least one executable application and receives a touch and drag action from a specific application in the application list to a first execution picture, under the control of the controller 180. The controller 180 adds the information provided by the selected specific information to first information to correspond to an execution status of a first application.

Even if a specific application is not an application currently executed as a background (e.g., a non-executed application), the mobile terminal 100 adds information provided by the specific application as information of an application currently executed in a foreground. This is explained in detail with reference to FIGS. 23A and 23B as follows. In FIGS. 23A and 23B, an example of the first application is an email.

If a key region ('More') corresponding to an executable application view is selected while an email writing picture is displayed, as illustrated in FIG. 23A(a), the mobile terminal 100 displays an application list constructed with executable applications 2311 to 2318, as illustrated in FIG. 23A(b). The application list can include applications executable with an email regardless of whether they are currently executed. For example, the application included in the application list can be displayed using an indicator such as a name, an icon, an image and/or an animation.

When a touch and drag action is received at an email writing picture from a contact number indicator 2311 included in the application list, as illustrated in FIG. 23B(a), the mobile terminal 100 moves and displays the contact number indicator 2311 or specific contact number information corresponding to the touch and drag action, as illustrated in FIG. 23B(b). If the touch and drag action shown in FIG. 23B(b) is terminated, the mobile terminal 100 attaches a contact number list as an attachment file 2321 of a currently written email, as illustrated in FIG. 23C(a), or adds the contact number list to an email content 2322, as illustrated in FIG. 23C(b). Alternatively, if the touch and drag action shown in FIG. 23B(b) is terminated, the mobile terminal 100 displays a contact number list 2323, as illustrated in FIG. 23D(a), and adds a specific contact number selected from the contact number list 2323 to email content, as illustrated in FIG. 23D(b).

The described application execution controlling methods can be implemented in a program recorded medium as computer-readable codes. The computer-readable media include all types of recording devices in which data readable by a computer system are stored. The computer-readable media include ROM, RAM, CD-ROM, magnetic tapes, floppy discs and/or optical data storage devices and also include carrier-wave type implementations (e.g., transmission via Internet).

The described mobile terminal and application execution controlling method therein can be configured by selectively combining the embodiments entirely or partially to enable various modifications instead of being limited to the configurations and methods of the above-described embodiments. Accordingly, the present invention provides several effects and/or advantages.

The present invention facilitates quickly adding information provided by an application currently executed in a background to information provided by an application currently executed in a foreground. The present invention also facilitates quickly adding information provided by an application currently executed in a foreground to information provided by an application currently executed in a background. The present invention adds information provided by an application currently executed in a background to information provided by an application currently executed in a foreground according to an information input region corresponding to a termination point of a touch and drag action.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a controller configured to execute a first application providing first information in a foreground and a second application providing second information in a background, wherein the first application is an information sharing application allowing transmission of the first information to another terminal;
   a wireless communication unit configured to transmit the first information to another terminal in response to an input received via the first application; and
   a touchscreen controlled by the controller and configured to:
   display an execution picture of the first application at a first area of the touchscreen, the execution picture comprising at least a content region for displaying the first information and an address region for displaying recipient information corresponding to another terminal;
   display an execution notification indicator at a second area of the touchscreen that does not overlap with the first area while the content region and the address region are displayed, the execution notification indicator identified by a name of the second application and indicating that the second application is executed in the background, while not displaying an execution picture of the second application;

display the second information at a first position of the touchscreen touched during a first touch and drag action from the execution notification indicator to the content region, the displayed second information comprising a list including at least first contact information and second contact information such that at least the first contact information or the second contact information is selectable from the list, wherein the first information is displayed prior to receiving the first touch and drag action, but the second information is not displayed prior to receiving the first touch and drag action while the execution picture of the first application is displayed;

display the first contact information selected from the list in the content region such that the first information and the first contact information in the content region are transmitted together to another terminal;

display the second information comprising the list at a second position of the touchscreen touched during a second touch and drag action from the execution notification indicator to the address region; and display the second contact information selected from the list in the address region such that the first information and the first contact information are transmitted to another terminal corresponding to the second contact information, wherein the controller is further configured to:

cause the touchscreen to display a plurality of execution notification indicators at the second area of the touchscreen when a plurality of applications are executed in the background, each of the plurality of execution notification indicators corresponding to one of the plurality of applications such that one or more touch and drag actions are originated from any number of the plurality of execution notification indicators to allow displaying of additional information associated with the number of the plurality of execution notification indicators in at least the content region; and cause the wireless communication unit to transmit the additional information displayed in the content region to another terminal.

2. The mobile terminal of claim 1, further comprising a user input unit configured to receive a command signal for providing an application list, wherein:

the touchscreen is further configured to display the application list including at least one executable application and to receive a third touch and drag action from a specific application included in the application list to the execution picture of the first application; and the controller is further configured to add specific information provided by the specific application to the first information.

3. The mobile terminal of claim 1, wherein:

the touchscreen is further configured to receive a third touch and drag action from the execution picture of the first application to the execution notification indicator; and the controller is further configured to add a specific portion of the first information included in the execution picture of the first application to the second information in response to the second touch and drag action.

4. The mobile terminal of claim 3, wherein the specific portion of the first information comprises information corresponding to a point touched in the execution picture of the first application at which the third touch and drag action begins.

5. A method of controlling execution of an application in a mobile terminal, the method comprising:

executing, via a controller, a first application providing first information and a second application providing second information, wherein the first application is an information sharing application allowing transmission of the first information to another terminal;

displaying, on a touchscreen, an execution picture of the first application being executed in a foreground at a first area of the touchscreen, the execution picture comprising at least a content region for displaying the first information and an address region for displaying recipient information corresponding to another terminal;

displaying an execution notification indicator at a second area of the touchscreen that does not overlap with the first area while the content region and the address region are displayed, the execution notification indicator identified by a name of the second application and indicating that the second application is executed in a background while not displaying an execution picture of the second application on the touchscreen;

displaying the second information at a first position of the touchscreen touched during a first touch and drag action from the execution notification indicator to the content region, the displayed second information comprising a list including at least first contact information and second contact information such that at least the first contact information or the second contact information is selectable from the list, wherein the first information is displayed prior to receiving the first touch and drag action, but the second information is not displayed prior to receiving the first touch and drag action while the execution picture of the first application is displayed; and displaying the first contact information selected from the list in the content region such that the first information and the first contact information in the content region are transmitted together to another terminal;

displaying the second information comprising the list at a second position of the touchscreen touched during a second touch and drag action from the execution notification indicator to the address region;

displaying the second contact information selected from the list in the address region such that the first information and the first contact information are transmitted to another terminal corresponding to the second contact information;

displaying a plurality of execution notification indicators at the second area of the touchscreen when a plurality of applications are executed in the background, each of the plurality of execution notification indicators corresponding to one of the plurality of applications such that one or more touch and drag actions are originated from any number of the plurality of execution notification indicators to allow displaying of additional information associated with the number of the plurality of execution notification indicators in at least the content region; and transmitting the additional information displayed in the content region to another terminal.

6. The method of claim 5, further comprising:

receiving a third touch and drag action on the touchscreen from the execution picture of the first application to the execution notification indicator; and adding a specific portion of the first information included in the execution picture of the first application to the second information.

* * * * *